US007698465B2

(12) United States Patent
Lamport

(10) Patent No.: US 7,698,465 B2
(45) Date of Patent: Apr. 13, 2010

(54) GENERALIZED PAXOS

(75) Inventor: Leslie B. Lamport, Pala Alto, CA (US)

(73) Assignee: Microsoft Corporation, Redmond, WA (US)

( * ) Notice: Subject to any disclaimer, the term of this patent is extended or adjusted under 35 U.S.C. 154(b) by 1541 days.

(21) Appl. No.: 10/996,351

(22) Filed: Nov. 23, 2004

(65) Prior Publication Data

US 2006/0136781 A1 Jun. 22, 2006

(51) Int. Cl.
*G06F 15/16* (2006.01)
(52) U.S. Cl. ............... 709/245; 709/230; 709/231; 710/10; 710/11; 707/101; 707/102
(58) Field of Classification Search .......... 709/230, 709/231, 245; 707/101, 102; 710/10, 11
See application file for complete search history.

(56) References Cited

U.S. PATENT DOCUMENTS

| 5,261,085 | A | 11/1993 | Lamport | 395/575 |
| 6,353,873 | B1 * | 3/2002 | Melchior | 711/108 |
| 6,470,346 | B2 * | 10/2002 | Morwood | 707/101 |
| 6,671,821 | B1 | 12/2003 | Castro et al. | |
| 6,691,171 | B1 * | 2/2004 | Liao | 709/245 |
| 6,779,112 | B1 * | 8/2004 | Guthery | 713/172 |

OTHER PUBLICATIONS

Boichat, R. et al., "Deconstructing Paxos", *ACM SIGACT News*, Mar. 2003, 34(1), 47-67.

Lamport, Leslie, *Time, Clocks, and the Ordering of Events in a Distributed System*, Communication of the ACM, 21(7):558-565, Jul. 1978.
Lamport, Leslie, *The Part-Time Parliament*, ACM Transactions on Computer Systems 16, 2, pp. 133-169, (May 1998). Also appeared as SRC Research Report 49.
Lamport, Leslie, *Paxos Made Simple*, ACM Sigact News (Distributed Computing Column), 32,4 (Whole No. 121) pp. 18-25, Dec. 2001.
Lampson, Butler W., *The ABCD's of Paxos*, Presented at Principles of Distributed Computing, 2001, as one of the papers celebrating Leslie Lamport's 60th Birthday, retrieved from http://research.microsoft.com/lampson/65-ABCDPaxos/Acrobat.pdf.
Castro, Miguel, et al., *Practical Byzantine Fault Tolerance*, appears in *Proceedings of the Third-Symposium on Operating Design and Implementation*, New Orleans, USA, Feb. 1999, pp. 1-14.

(Continued)

*Primary Examiner*—Jinsong Hu
(74) *Attorney, Agent, or Firm*—Woodcock Washburn LLP

(57) ABSTRACT

A distributed computing system can achieve a generalized consensus, enabling commands that commute to be selected in any order. A leader can learn of previously selected sequences of commands, and can propose a compatible sequence of commands. Devices can select a sequence of commands that is compatible with previously selected sequences. Additional commands can be selected by selecting a sequence of commands comprising a previously selected sequence and the additional commands. Further efficiencies can be realized if the devices receive proposals directly from clients. Two or more proposals arriving in varying orders at the various clients may be selected in varying orders. However, if those proposals commute, a generalized consensus nevertheless exists despite the variations, enabling the system to continue efficient operation. To conserve memory, a checkpoint command that does not commute with any other command can be used to secure a sequence of commands for archiving or deletion.

15 Claims, 57 Drawing Sheets

OTHER PUBLICATIONS

Castro, Miguel, et al., *Proactive Recovery in a Byzantine-Fault-Tolerant System*, appears in the Proceedings of the Fourth Symposium on Operating Systems Design and Implementation (OSDI '00), San Diego, USA, pp. 1-15, Oct. 2000.

Huang, Yennun, et al., *Software Rejuvenation: Analysis, Module and Applications*, Proc. International Symposium on Fault Tolerant Computing, pp. 381-390, 1995.

Bracha, Gabriel, *An Asynchronous ë(h -1)/3û-Resilient Consensus Protocol* this paper was presented at the *ACM Symposium on Principles of Distributed Computing*, pp. 154-162, 1984.

Keidar, Idit, et al., *Moshe: A Group Membership Service for WANs* to appear in *ACM Transactions on Computer Systems (TOCS)*, pp. 1-47; Aug. 2002.

Khazan, Roger, I., *A One-Round Algorithm for Virtually Synchronous Group Communication in Wide Area Networks*, PH.D. dissertation, Department of Electrical Engineering and Computer Science. MIT., May 22, 2002. Thesis Supervisors: Prof. Nancy A. Lynch and Dr. Idit Keidar. Retrieved from http://theroy.1cs.mit.edu/~roger/Research/Papers/khazan-phd.pdf.

Anceaume et al., *Converging Toward Decision Conditions, 6th International Conference on Principles of Distributed Systems*, France, pp. 53-63; (Dec. 11-13, 2002).

Mostefaoui et al., *IRISA Research Report* No. 1355 (Oct. 2000).

Brasileiro et al., *IRISA Research Report* No. 1321 (Apr. 2000).

Schneider, F.; *Implementing Fault-tolerant Services Using the State Machine Approach: A Tutorial; Computing Surveys*, 22(3):299-319, Sep. 1990.

Deswarte, Y. et al; *Intrusion Tolerance in Distributed Computing Systems; Proceedings of the 1991 IEEE Symposium on Research in Security and Privacy*; pp. 110-121, May 1991.

Canetti, R. et al.; *Fast Asynchronous Byzantine Agreement with Optimal Resilience; Proc. 25th Annual ACM Symposium on Theory of Computing (STOC)*, pp. 42-51, 1993.

Reiter, M; *How to Securely Replicate Services; ACM Transactions on Programming Languages and Systems*, vol. 16, No. 3, pp. 986-1009, May 1994.

Reiter, M. K.; *Secure Agreement Protocols: Reliable and Atomic Group Multicast in Rampart; Proceedings of the 2nd ACM Conference on Computer and Communications Security*, pp. 68-80, Fairfax, Virginia, Nov. 1994.

Gong, L. et al.; *Byzantine Agreement With Authentication: Observations and Applications in Tolerating Hybrid and Link Faults; Dependable Computing for Critical Applications—5*, pp. 79-90, IFIP WG 10.4, preliminary proceedings, 1995.

Reiter, M. K.; *The Rampart Toolkit for Building High-integrity services; Theory and Practice in Distributed Systems, International Workshop, Selected Papers, Lecture Notes in Computer Science*, vol. 938, K. P. Birman, F. Mattern, and A. Schiper, Eds., Springer-Verlag, Berlin, 99-110 , 1995.

Reiter, M. K.; *Distributing Trust With the Rampart Toolkit; Communications of the ACM*; 39, 4 pp. 71-74, Apr. 1996.

Malkhi, D. et al.; *A High-Throughput Secure Reliable Multicast Protocol; Proceedings of the 9th Computer Security Foundations Workshop*, Kenmore, Ireland, pp. 9-17, Jun. 1996.

Malkhi, D. et al.; *A High-Throughput Secure Reliable Multicast Protocol; Journal of Computer Security*. Also in *Proceedings of the 9th IEEE Computer Security Foundations Workshop*, pp. 9-17, Jun. 1996.

Malkhi, D. et al.; *Byzantine Quorum Systems; Proceedings of the 29th ACM Symposium on Theory of Computing*, May 1997.

Malkhi, D. et al.; *The Load and Availability of Byzantine Quorum Systems; Proceedings 16th ACM Symposium on Principles of Distributed Computing (PODC)*, pp. 249-257, Aug. 1997.

Kihlstrom, K. P. et al.; *Solving Consensus in a Byzantine Environment Using an Unreliable Fault Detector, Proceedings of the International Conference on Principles of Distributed Systems (OPODIS'97)*, Hermes, Chantilly, France, 61-76, 1997.

Kihlstrom, K. P. et al.; *The SecureRing Protocols for Securing Group Communication; Proceedings of the 31st Hawaii International Conference on System Sciences*, vol. 3, pp. 317-326, Jan. 1998.

Malkhi, D. et al.; *Secure and Scalable Replication in Phalanx; Proceedings of the 17th IEEE Symposium on Reliable Distributed Systems*; p. 51-58, West Lafayette, Indiana, USA, Oct. 1998.

Malkhi, D. et al.; *Byzantine Quorum Systems; Distributed Computing*; vol. 11, No. 4, p. 203-213, 1998.

Goldberg, A. et al.; *Towards an Archival Intermemory; International Forum on Research and Technology Advances in Digital Libraries*; IEEE, pp. 147-156, 1998.

Hartman, J.H. et al.; *The Swarm Scalable Storage System; 19th ICDCS*, pp. 74-81, 1999.

Guerraoui, Rachid et al.; *Reducing the Cost for Non-Blocking in Atomic Commitment*; Département d'Informatique, Ecole Polytechnique Federale de Lausanne, pp. 1-11, May 1996.

Hayashibara, Noahiro et al.; *Performance Comparison Between the Paxos and Chandra-Toueg Consensus Algorithms*; Département d'Informatique, Ecole Polytechnique Fedérale de Lausanne; Technical Report IC-2002-61, pp. 1-11, Aug. 2002.

Awerbuch, Baruch et al.; *Maintaining Database Consistency in Peer to Peer Networks*; Department of Computer Science, John Hopkins University; Technical Report CNDS-2002-1, pp. 1-14, Feb. 6th, 2002.

Birrell, Andrew D. et al.; *The Echo Distributed File System*; Digital Equipment Corp. Systems Research Center; Technical Report 111, pp. 1-22, Sep. 10, 1993.

Liskov, Barbara et al.; *Replication in the Harp File System*; Proceedings of the 13th Symposium on Operating System Principles, 13 pp., Oct. 1991.

Hisgen, Andy et al.; *New-Value Logging in the Echo Replicated File System*; Digital Equipment Corp. Systems Research Center, Research Report 104, pp. 1-39, Jun. 1993.

Long, Darrell D.E. et al.; *Voting with Regenerable Volatile Witnesses*; University of California Computer and Information Sciences; Technical Report, pp. 1-20, Apr. 1990.

Swart, Garret et al.; *Availability in the Echo File System*; Digital Equipment Corp. Systems Research Center, Research Report 112, pp. 1-43, Sep. 1993.

Adya, A., et al.; *FARSITE: Federated, Available, and Reliable Storage for an Incompletely Trusted Environment.; In Proc. 5th OSDI*, Boston, MA, pp. 1-14, Dec. 2002.

Castro, M., *Practical Byzantine Fault Tolerance*; Ph.D. Thesis Technical Report MIT-LCS-TR-817, MIT, Jan. 2001.

Chockler, G. V., et al., *Group Communication Specifications: A Comprehensive Study, ACM Computing Surveys*, pp. 33(4):427-469, Dec. 2001.

Deprisco, R., et al., *Revisiting the Paxos Algorithm; In Proc. 11th Int'l Workshop on Distributed Algorithms*, pp. 111-125, Sep. 1997.

Lamport, L., *Using Time Instead of Timeout for Fault Tolerance in Distributed Systems; ACM Transactions on Programming Languages and Systems (TOPLAS)*, pp. 6(2):264-280, Apr. 1984.

Lamport, L., et al., *Cheap Paxos; In Proc. International Conference on Dependable Systems and Networks (DSN)*, Florence, Italy, 2004.

Lynch, N., et al., *RAMBO: A Reconfigurable Atomic Memory Service for Dynamic Networks; In Proc. 16th International Symposium on Distributed Computing*, Toulouse, France, pp. 173-190, Oct. 2002.

Narasimhan, P., et al., *Replica Consistency of CORBA Objects in Partitionable Distributed Systems*, 1997.

Oki, B.M., *Viewstamped Replication for Highly Available Distributed Systems*; Ph.D. Thesis Technical Report MIT/LCS/TR-423, MIT, Aug. 1988.

Oki, B.M., et al., *Viewstamped Replication: A New Primary Copy Method to Support Highly-Available Distributed Systems; In Proc. 7th Symposium on Principles of Distributed Computing*, Aug. 1988, pp. 8-17.

Rodrigues, R., et al., BASE: *Using Abstractions to Improve Fault Tolerance; In Proc. 18th ACM Symposium on Operating System Principles*, Bantt, Canada, pp. 15-28, Oct. 2001.

Schneider, F.B., Synchronization in Distributed Programs; ACM Transactions on Programming Languages and Systems (TOPLAS; pp. 4(2):125-148.), Apr. 1982.

Yu, H., et al., Consistent and Automatic Replica Regeneration; In Proc. 1st NSDI, San Francisco, CA, pp. 323-236, 2004.

Pedone, F., et al., Handling Message Semantics with Generic Broadcast Protocols, Distributed Computing 15, pp. 97-107, 2002.

Cukier, M., et al., AQuA: An Adaptive Architecture that Provides Dependable Distributed Objects, In Proc. 17th Symposium on Reliable Distributed Systems, pp. 245-253, West Lafayette, IN, Oct. 1998.

Cukier, M., et al., AQuA: An Adaptive Architecture that Provides Dependable Distributed Objects, IEEE Transactions on Computers, vol. 52, No. 1, pp. 31-50, Jan. 2003.

Charron-Bost, Bernadette, et al., Uniform Consensus is Harder than Consensus (extended abstract), Technical Report DSC/2000/028, Switzerland, May 2000.

DePrisco, Robert, et al., Revisiting the Paxos Algorithm, Theroretical Computer Science, 243:35-91, 2000.

Fischer, Michael J., et al., Impossibility of Distributed Consensus with One Faulty Process, Journal of the ACM, 32(2):374-382, Apr. 1985.

Lamport, Leslie, Lower Bounds for Asynchronous Consensus, in Future Distributed Computing, vol. 2584 of Lecture Notes in Computer Science, pp. 22-23, Spring, 2003.

Keidar, Idit, et al.; On the Cost of Fault-Tolerant Consensus When There Are No Faults—A Tutorial; SIGACT News 32(2), Distributed Computing column, pp. 45-63; Jun. 2001.

Dwork, Cynthia, et al.; Consensus in the Presence Of Partial Synchrony; Journal of the ACM, 35(2):288-323, Apr. 1988.

Lampson, Butler W.; How to Build a Highly Available System Using Consensus; http://www.research.microsoft.com.

Lamport, Leslie; The Implementation of Reliable Distributed Multiprocess Systems; Computer Networks, 2:95-114, 1978.

Lamport, Leslie, et al.; The Byzantine Generals Problem; ACM Transactions on Programming Languages and Systems, vol. 4, No. 3, Jul. 1982, pp. 382-401.

Mazurkiewicz, A., Semantics of Concurrent Systems; A Modular Fixed-Point Trace Approach; Institute of Computer Science, Poland, pp. 353-375.

* cited by examiner

GENERALIZED PAXOS

FIELD OF THE INVENTION

This invention relates generally to distributed computing and, more particularly, relates to fault tolerant distributed computing that can achieve consensus without ordering commands that commute.

BACKGROUND

As personal computing devices become more powerful, containing increased storage space and processing capabilities, the average user consumes an increasingly smaller percentage of those resources in performing everyday tasks. Thus, many of today's personal computing devices are often not used to their full potential because their computing abilities greatly exceed the demands most users place upon them. An increasingly popular method of deriving use and value from the unused resources of powerful modern personal computing devices is a distributed computing system, in which the computing devices act in coordination with one another to provide more reliable access to data and computational resources.

In addition to providing a useful mechanism for using excess computing capacity, distributed systems can also be composed of dedicated inexpensive computing devices in order to achieve the performance and storage capabilities of a larger, more-expensive computing device. A further advantage of distributed systems is the ability to continue to operate in the face of physical difficulties that would cripple a single, larger computing device. Such difficulties could include: sustained power outages, inclement weather, flooding, terrorist activity, and the like.

To compensate for the increased risk that individual member computing devices may become disconnected from the network, turned off, suffer a system malfunction, or otherwise become unusable, redundancy can be used to allow the distributed computing system to remain operational. Thus, the information stored on any one personal computing device can be redundantly stored on at least one additional personal computing device, allowing the information to remain accessible, even if one of the personal computing devices fails.

A distributed computing system can practice complete redundancy, in which every device within the system performs identical tasks and stores identical information. Such a system can allow users to continue to perform useful operations even if all but one of the devices should fail. Alternatively, such a system can be used to allow multiple copies of the same information to be distributed throughout a geographic region. For example, a multi-national corporation can establish a world-wide distributed computing system.

However, distributed computing systems can be difficult to maintain due to the complexity of properly synchronizing the individual devices that comprise the system. Because timekeeping across individual processes can be difficult at best, a state machine approach is often used to coordinate activity among the individual devices. A state machine can be described by a set of states, a set of commands, a set of responses, and client commands that link each response/state pair to each command/state pair. A state machine can execute a command by changing its state and producing a response. Thus, a state machine can be completely described by its current state and the action it is about to perform, removing the need to use precise time-keeping.

The current state of a state machine is, therefore, dependent upon its previous state, the commands performed since then, and the order in which those commands were performed. To maintain synchronization between two or more state machines, a common initial state can be established, and each state machine can, beginning with the initial state, execute the identical commands in the identical order. Therefore, to synchronize one state machine to another, a determination of the commands performed by the other state machine needs to be made. The problem of synchronization, therefore, becomes a problem of determining the order of the commands performed, or, more specifically, determining the particular command performed for a given step.

One mechanism for determining which command is to be performed for a given step is known as the Paxos algorithm. In the Paxos algorithm, any of the individual devices can act as a leader and seek to propose a given client command for execution by every device in the system. Every such proposal can be sent with a proposal number to more easily track the proposals. Such proposal numbers need not bear any relation to the particular step for which the devices are attempting to agree upon a command to perform. Initially, the leader can suggest a proposal number for a proposal the leader intends to submit. Each of the remaining devices can then respond to the leader's suggestion of a proposal number with an indication of the last proposal they voted for, or an indication that they have not voted for any proposals. If, through the various responses, the leader does not learn of any other proposals that were voted for by the devices, the leader can propose that a given client command be executed by the devices, using the proposal number suggested in the earlier message. Each device can, at that stage, determine whether to vote for the action or reject it. A device should only reject an action if it has responded to another leader's suggestion of a higher proposal number. If a sufficient number of devices, known as a quorum, vote for the proposal, the proposed action is said to have been agreed upon, and each device performs the action and can transmit the results. In such a manner, each of the devices can perform actions in the same order, maintaining the same state among all of the devices.

Generally, the Paxos algorithm can be thought of in two phases, with an initial phase that allows a leader to learn of prior proposals that were voted on by the devices, as described above, and a second phase in which the leader can propose client commands for execution. Once the leader has learned of prior proposals, it need not repeat the first phase. Instead, the leader can continually repeat the second phase, proposing a series of client commands that can be executed by the distributed computing system in multiple steps. In such a manner, while each client command performed by the distributed computing system for each step can be thought of as one instance of the Paxos algorithm, the leader need not wait for the devices to vote on a proposed client command for a given step before proposing another client command for the next step.

The distributed computing system, as a whole, can be modeled as a state machine. Thus, a distributed computing system implementing complete redundancy can have each of the devices replicate the state of the overall system. Such a system requires that each device maintain the same state. If some devices believe that one client command was executed, while a second group of devices believes that a different client command was executed, the overall system no longer operates as a single state machine. To avoid such a situation, a majority of the devices can be generally required to select a proposed client command for execution by the system. Because any two groups of devices, each having a majority, must share at least one device, mechanisms, such as the Paxos algorithm, can be implemented that rely on the at least one common device to prevent two groups, each containing a majority of devices, from selecting different proposed client commands.

By requiring that every device execute the same commands in the same order, the Paxos algorithm achieves a synchronization among its constituent devices that may be more rigid than necessary at the cost of an increased number of message delays between a request by a client, and the response to that request by the distributed computing system. In many situations the same state can be reached regardless of the order in which various commands are performed. Such commands commute with one another, and for those situations, an algorithm that does not require an ordering of such commuting commands can enable a distributed computing system to respond to client commands with fewer message delays than the Paxos algorithm described generally above. For example, if a distributed computing system was used to maintain the balances of a bank's customers, different customers' actions are likely to be commands that commute with one another. Thus, if customer A issued a request to deposit $100 into her account at approximately the same time that customer B issued a request to withdraw $50 from his account, either command could be performed first, without affecting the final state. Consequently, a distributed computing system could continue to function properly even if some devices executed customer A's command first while the remaining devices executed customer B's command first.

Therefore, what is needed is a distributed computing system that can account for commands that commute and thereby introduce fewer message delays between receipt of a client's request and the transmission of the response to that client.

BRIEF SUMMARY OF THE INVENTION

Therefore, in one embodiment of the present invention, a system can implement a generalized Paxos algorithm enables constituent devices to agree upon on a series of commands, where series that differ only in the order of commands that commute can be considered equivalent.

In another embodiment, a generalized Paxos algorithm is presented in which a reduced number of message delays are introduced between the receipt of a client's request and the transmission of a response to the client. The reduced message delay generalized Paxos algorithm can continue proper operation even if the order of commuting commands selected by constituent devices is not identical.

In a further embodiment, an alternative reduced message delay generalized Paxos algorithm is presented in which individual constituent devices can correct conflicting states without requiring intervention from a leader device. The individual constituent devices can determine what a leader would do and can thereby resolve the conflict without the leader's intervention.

In a still further embodiment, a checkpoint command that does not commute with any other command can be used to archive a currently agreed upon state and enable an efficient allocation of memory storage resources among the devices implementing either the generalized Paxos algorithm or the reduced message delay generalized Paxos algorithm.

In a still further embodiment, command identifiers can be used to ensure that a command that was requested once is executed only once. The command identifiers can be consulted by any device that executes commands prior to executing a selected command, or it can be consulted by any device that votes for proposed commands prior to voting for a proposed command.

Although the description herein focuses primarily on the operation of computing devices in a distributed computing system, it will be appreciated that the description is equally applicable to processes running on a single computing device, such as on separate processors or in separate memory spaces. Thus, additional embodiments include the operation of the modified Paxos algorithm in multiple processor environments, whether the multiple processors are physically located in one or more computing devices, and in multiple virtual machine environment, whether the multiple virtual machines are being executed by one or more computing devices. Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION

Figure 1:
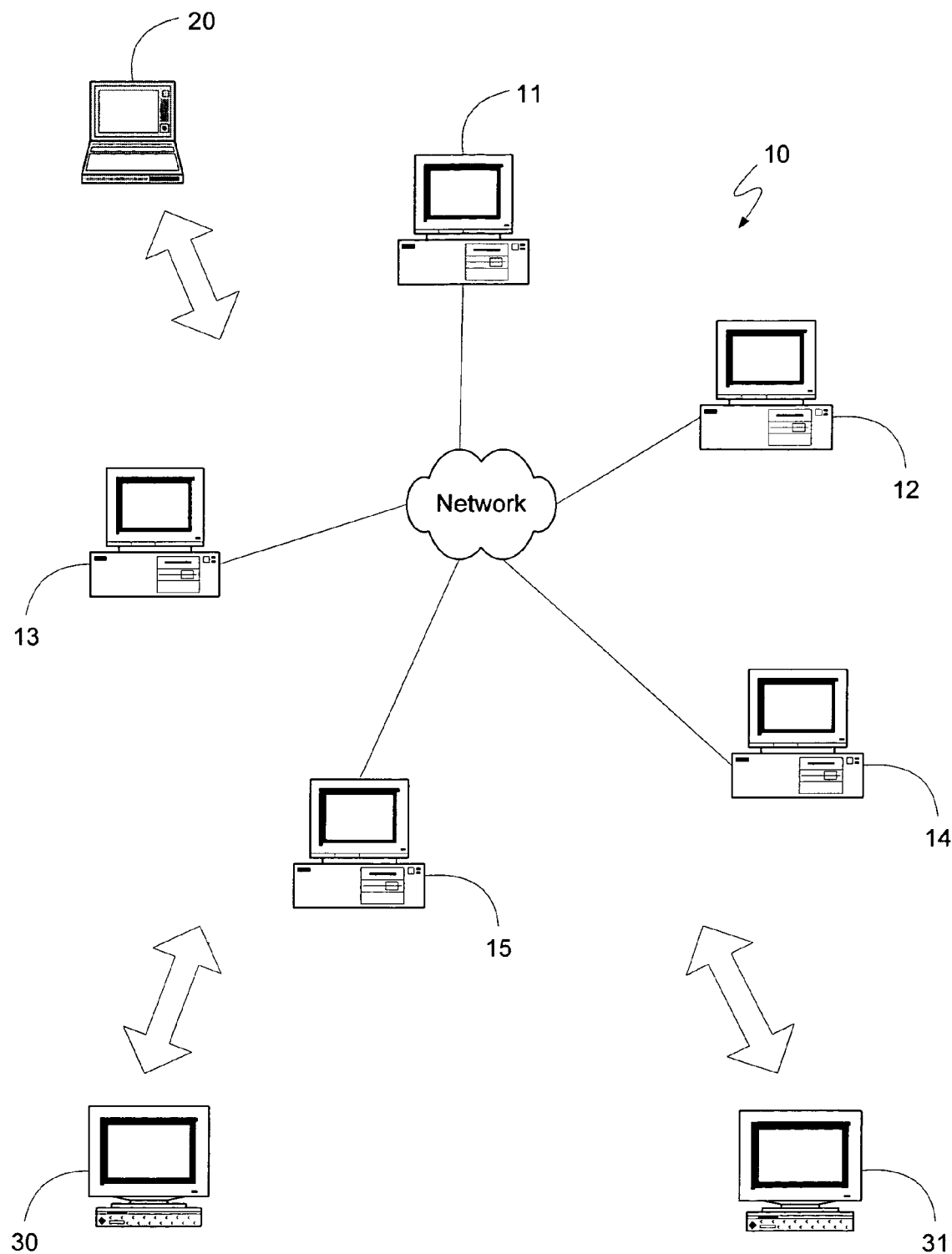
FIG. 1 is a block diagram generally illustrating an exemplary distributed computing system with which an embodiment of the present invention can be implemented.

A distributed computing system can comprise a number of individual personal computing devices, server computing devices, or other devices that have sufficient processor and storage abilities to participate in the system. The distributed computing system can aggregate the abilities of its constituent computing devices to either provide for greatly increased processing capabilities and storage space, or to implement redundancy, allowing multiple devices to provide access to the same information. Thus, one common usage for a distributed computing system is the aggregation of the unused processing capabilities and storage space of many different personal computing devices attached to a common network. Such a distributed computing system can maintain information regarding the system, such as which devices are currently part of the system and on which device a given set of information is stored. This information can be necessary for the devices to aggregate their capabilities and storage space and, as a result, each device may contain a copy. Synchronization of the information among the devices of the system can be facilitated through a state machine approach as described below.

Alternatively, an increasingly common use for distributed computing systems is that of a network server that can act as a central storage repository for various forms of information. Such a distributed system seeks to replicate the central store on all of its constituent devices so that every client seeking to communicate with the central storage can find a convenient and efficient device with which to communicate. Furthermore, because of the distributed nature of the system, local events such as power outages, floods, political unrest, and the like may only affect a few computing devices, allowing the overall system to continue to operate properly and provide clients access to information and other services.

Such a distributed computing system can be thought of as a state machine, with the future state of the machine defined by the current state and the action to be taken. Each constituent device of the distributed computing system can then independently execute the state machine of the overall system. The state-machine approach can be implemented asynchronously; so that precise synchrony across the constituent devices need not be maintained and synchronization between the devices can be achieved by setting an initial state for all of the devices and subsequently executing the same functions in the same order. A common method for maintaining synchronization is to allow the constituent devices of the distributed computing system to all agree upon the next function before executing that function, and to maintain a list of the functions that were executed. In such a manner, every device can be assured to have the same state.

A distributed computing system acting as a server can be especially useful for serving a large amount of information to a diverse set of clients, such as a central database for a multinational corporation, or a popular World Wide Web site. In such situations, a large number of clients can request information from the distributed computing system acting as a server. By implementing the server functionality across multiple devices, more clients can be serviced in parallel, thereby increasing the throughput of the overall system, and the server as a whole is far less prone to failure due to the increased redundancy.

One mechanism by which the constituent computing devices can agree upon the next function to execute is known as the Paxos algorithm. In the Paxos algorithm, as will be described further below, any device can act as a leader and transmit a suggestion for a proposal number to other devices within the distributed computing system. The other devices can respond with either an indication of the proposal having the largest proposal number for which that device has already voted or an indication that the device has not voted for any previous proposals. Once the leader receives the responses from the other devices, it can determine which function to propose and request a vote for a proposed function. Each device will vote for the proposal unless it has, at some time after the initial transmission of the proposal and prior to the requested vote, responded to a suggestion for a higher proposal number. If a quorum of devices votes for the proposal, then the proposal is accepted, and the leader can transmit a message to all of the devices requesting that they execute the agreed upon function.

Another mechanism by which the constituent computing devices of a distributed computing system can agree upon the next function to execute is known as the fast Paxos algorithm. The fast Paxos algorithm, as will be described further below, enables a device to vote for proposals it receives directly from clients, removing the need for a leader device in normal operation. Once a sufficient number of devices have voted for the proposal, the proposal is accepted and the results can be transmitted to the requesting client. By receiving requests directly from clients, the fast Paxos algorithm can, in normal operation, introduce one less message delay between the receipt of a client's request and the transmission of a response. However, because no leader device orders the requests, the constituent devices may not receive the same requests in the same order. This can especially be true if two requests were transmitted at approximately the same time. In such a case, some devices may select one function for the next system step, while other devices select the other function for the next system step. In the event that such a conflict occurs, the Paxos algorithm can be used to restore consensus but can result in further message delays.

However, if two or more requests need not be ordered with respect to one another, then the fast Paxos algorithm can continue efficient operation by allowing a more generalized agreement among the constituent devices. Often two requests that are transmitted at approximately the same time commute with one another. More specifically, the response to one request sent at approximately the same time as another request is not effected by the other request. For example, in a banking system customer A can issue a request to deposit $100 into her account at approximately the same time that customer B issues a request to withdraw $50 from his account. These two exemplary commands commute because customer B's request to withdraw $50 from his account does not change customer A's balance irrespective of whether customer B's request is performed before or after customer A's request. Consequently, a device that executes customer B's request first will provide the same results to both customer A and customer B as a device that executes customer A's request first.

A generalized Paxos algorithm can recognize that devices selecting commuting commands in any order remain synchronized. For example, a generalized Paxos algorithm can recognize that a device selecting customer A's request prior to customer B's request is in agreement with a device selecting customer B's request prior to customer A's request. Consequently, a generalized Paxos algorithm can seek to achieve agreement on a series of functions, executed as a series of steps, while the above mentioned Paxos algorithm required agreement on a step-by-step basis.

Operationally, as will be described in greater detail below, a generalized Paxos algorithm can be similar to the above mentioned Paxos algorithm. Specifically, any device can act as a leader and transmit a suggestion for a proposal number to other devices within the distributed computing system. The other devices can respond with either an indication of the proposals corresponding to the largest proposal number for which that device has already voted or an indication that the device has not voted for any previous proposals. Because a generalized Paxos algorithm seeks to achieve agreement on a series of functions, the responses to the leader's suggestion of a proposal number can include a series of previously voted for proposals corresponding to a single proposal number. Once the leader receives the responses from the other devices, it can determine which series of functions to propose and it can request a vote for that series. Each device will vote for the series unless it has, at some time after the initial transmission of the proposal and prior to the requested vote, responded to a suggestion for a higher proposal number. If a quorum of devices votes for the proposed series of functions, then the series is accepted, and the leader can transmit a message to all of the devices requesting that they execute the agreed upon function. The distributed computing system can select additional functions when the leader proposes, using the previous proposal number, a new series of functions. Each proposed series can include the previously selected series, and can add one or more new functions.

An alternative generalized Paxos algorithm can be based on the above mentioned fast Paxos algorithm, and can provide a more efficient mechanism by which the constituent computing devices of a distributed computing system can agree upon a series of functions. Thus, the generalized fast Paxos algorithm, as will be described further below, can enable a device to vote for proposals it receives directly from clients, removing the need for a leader device in normal operation. A device can vote for a client's proposal by voting for a series of proposals including previously voted for proposals and the new proposal. Once a sufficient number of devices have voted for a series of proposals that do not conflict with one another, that series, and all non-conflicting permutations of it, are considered to be accepted and the results can be transmitted to the requesting client. Because the devices can receive requests directly from clients, the generalized fast Paxos algorithm can, in normal operation, introduce one less message delay between the receipt of a client's request and the transmission of a response. Furthermore, because the generalized fast Paxos algorithm selects a series of functions, and accommodates different ordering of commuting functions, a conflict is not created merely because some devices receive and select one command first while other devices receive and select a different command that commutes with the first command. This can be especially useful, as will be shown in more detail below, because client requests sent at approximately the same time, which are the most likely to arrive in differing orders at various devices, are also most likely to commute. However, in the event that a conflict does occur, the generalized Paxos algorithm can be used to restore consensus, though it can also result in further message delays.

Distributed Computing Environment

Turning to the drawings, wherein like reference numerals refer to like elements, the invention is illustrated as being implemented by a distributed computing system, such as the exemplary distributed computing system 10 shown in FIG. 1. For ease of presentation only, the present invention will be described with reference to distributed computing systems such as system 10, which comprises computing devices 11 through 15, interconnected as shown in FIG. 1. As will be understood by those skilled in the art, the present invention is applicable to all distributed computing environments and is not intended to be limited in any way by the exemplary distributed computing system of FIG. 1, which has been simplified for presentation purposes.

FIG. 1 also illustrates a single client computing device 20, though the present invention is intended to operate in environments having any number of client computing devices. Client computing device 20 is illustrated as having a generic communicational connection to the distributed computing system 10. As will be known by those skilled in the art, such a communicational connection can use any communication medium and protocol, and can allow the client computing device 20 to communicate with one or more of the computing devices in the distributed computing system 10.

Additionally, FIG. 1 illustrates computing devices 30 and 31 that are not shown as part of the distributed computing system 10, but which also maintain a generic communicational connection to system 10. As above, the communicational connection can use any communication medium and protocol, and can allow the computing devices 30 and 31 to communicate with one or more of the computing devices in the distributed computing system 10. As will be described in further detail below, computing devices 30 and 31 can learn of the results of executions performed by the system 10 without being part of the system 10. Alternatively, computing devices 30 and 31 can learn of functions selected by the system 10 and can execute the function themselves, thereby independently maintaining the same state as the devices in the system 10.

Although not required, the invention will be described in the general context of computer-executable instructions, such as program modules, being executed by a computing device. Generally, program modules include routines, programs, objects, components, data structures, and the like that perform particular tasks or implement particular abstract data types. Moreover, those skilled in the art will appreciate that the invention may be practiced with many different computing devices, including hand-held devices, multi-processor systems, microprocessor based or programmable consumer electronics, network PCs, minicomputers, mainframe computers, and the like. As described above, the invention may also be practiced in distributed computing environments, such as distributed computing system 10, where tasks are performed by remote processing devices that are linked through a communications network. In a distributed computing environment, program modules may be located in both local and remote memory storage devices.

Figure 2:
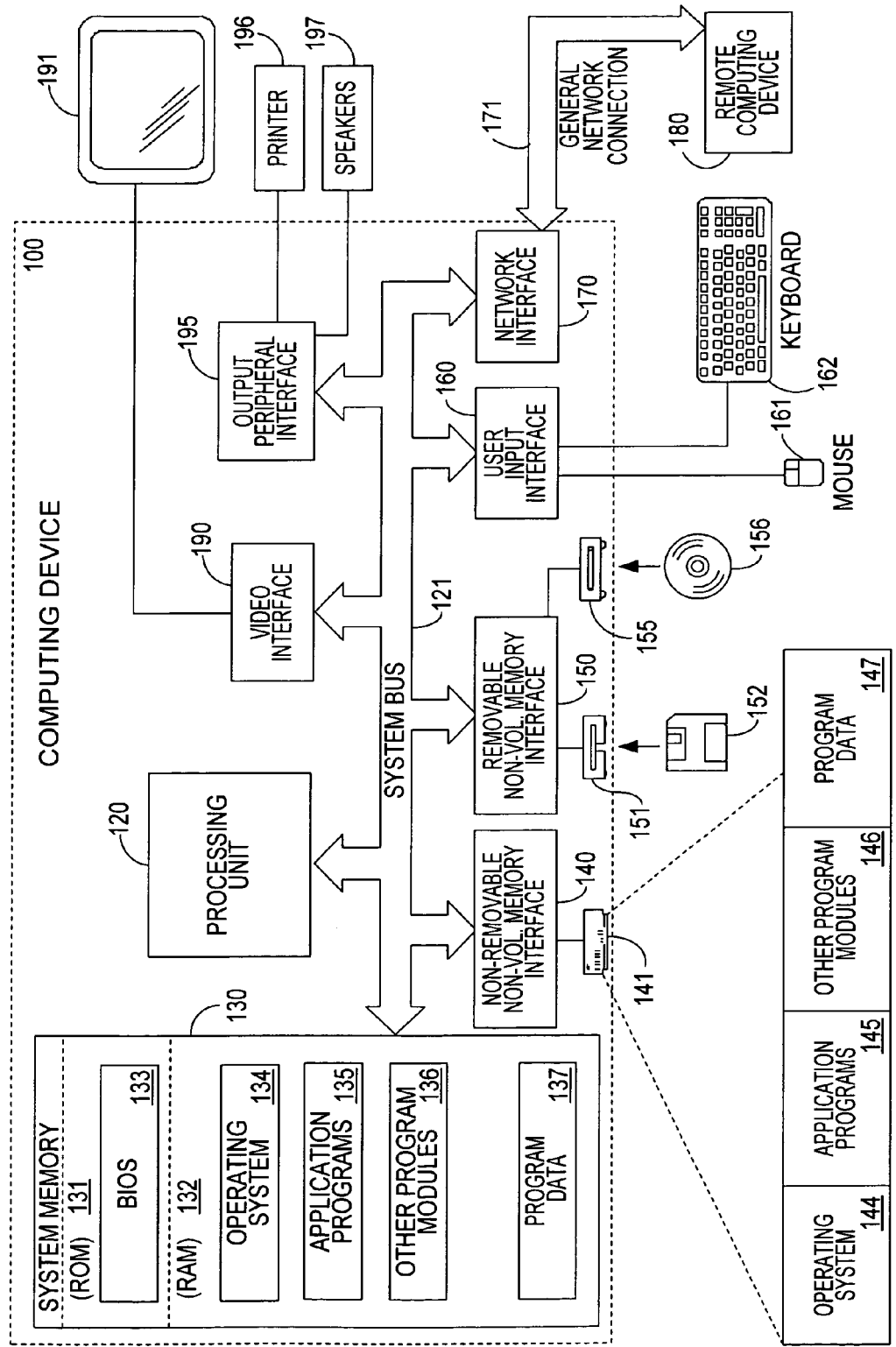
FIG. 2 is a block diagram generally illustrating an exemplary computing device with which an embodiment of the present invention can be implemented.

Turning to FIG. 2, an exemplary computing device 100 on which the invention may be implemented is shown. The computing device 100 is only one example of a suitable computing device and is not intended to suggest any limitation as to the scope of use or functionality of the invention. For example, the exemplary computing device 100 is not intended to exactly represent any of the computing devices 11-15, 20, or 30-31 illustrated in FIG. 1. The exemplary computing device 100 can implement one or more of these computing devices, such as through memory partitions, virtual machines, multiple processors, or similar programming techniques allowing one physical computing structure to perform the actions described below as attributed to multiple computing devices. Furthermore, the computing device 100 should not be interpreted as having any dependency or requirement relating to any one or combination of peripherals illustrated in FIG. 2.

The invention may be described in the general context of computer-executable instructions, such as program modules, being executed by a computer. Generally, program modules include routines, programs, objects, components, data structures, etc. that perform particular tasks or implement particular abstract data types. In distributed computing environments, tasks can be performed by remote processing devices that are linked through a communications network. In a distributed computing environment, program modules may be located in both local and remote computer storage media including memory storage devices.

Components of computer device 100 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus. Furthermore, the processing unit 120 can contain one or more physical processors.

Computing device 100 typically includes a variety of computer readable media. Computer readable media can be any available media that can be accessed by computing device 100 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2 illustrates operating system 134, application programs 135, other program modules 136, and program data 137.

The computing device 100 may also include other removable/non-removable, volatile/nonvolatile computer storage media. By way of example only, FIG. 2 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2, provide storage of computer readable instructions, data structures, program modules and other data for the computing device 100. In FIG. 2, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computing device 100 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computing device 100 can operate in a networked environment, such as that shown in FIG. 1, using logical connections to one or more remote computers. FIG. 2 illustrates a general network connection 171 to a remote computing device 180. The general network connection 171, and the network connections illustrated in FIG. 1, can be any of various different types of networks and network connections, including a Local Area Network (LAN), a Wide-Area Network (WAN), a wireless network, networks conforming to the Ethernet protocol, the Token-Ring protocol, or other logical, physical, or wireless networks including the Internet or the World Wide Web.

When used in a networking environment, the computing device 100 is connected to the general network connection 171 through a network interface or adapter 170, which can be a wired or wireless network interface card, a modem, or similar networking device. In a networked environment, program modules depicted relative to the computing device 100, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computing devices, unless indicated otherwise. As such, it will be understood that such acts and operations, which are at times referred to as being computer-executed, include the manipulation by the processing unit of the computing device of electrical signals representing data in a structured form. This manipulation transforms the data or maintains it at locations in the memory system of the computing device, which reconfigures or otherwise alters the operation of the computing device in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Overview

In accordance with the invention, a distributed computing system can implement a generalized fault tolerant algorithm by agreeing upon compatible series of functions, rather than a single function. The Paxos algorithm, which will be described in greater detail below, can provide a mechanism of implementing a distributed computing system that can tolerate a certain number of faults provided that more than twice that number of computing devices are used. A generalized Paxos algorithm, which will also be described in greater detail below, can utilize the mechanisms of the Paxos algorithm to provide fault tolerance, but can propose and select series of functions as opposed to a single function. More particularly, series of functions differing only in the relative order of commands that commute with one another can be considered to be compatible and a vote by a quorum of devices can be considered a selection of all such series of functions.

The fast Paxos algorithm, which will be described in greater detail below, provides a more efficient mechanism of implementing a distributed computing system that can tolerate a certain number of faults provided that more than three times that number of computing devices are used. Unlike the Paxos algorithm, the fast Paxos algorithm can receive requests directly from client devices, saving at least one message delay between the receipt of a client's request and the transmission of a response to that request. A generalized fast Paxos algorithm, which will be described in further detail below, can similarly receive requests directly from client devices. However, unlike the fast Paxos algorithm, a generalized fast Paxos algorithm can select series of functions in such a manner that if two or more requests arrive in varying orders at the devices implementing the algorithm, a consensus can still be achieved if the requests commute. If the requests do not commute, then the generalized Paxos algorithm can be used to achieve a consensus on a particular order.

Because both the generalized Paxos algorithm and the generalized fast Paxos algorithm achieve consensus on unbounded series of functions, a checkpoint function can be used to enable more efficient memory usage. Specifically, a checkpoint function can be a function that does not commute with any other function. As a result, a checkpoint function can mark a point at which the constituent devices can begin selecting new series of functions. The checkpoint function can be proposed by a leader device in the generalized Paxos algorithm, or by any client in the generalized fast Paxos algorithm.

Further detailed description of the algorithms contemplated by an embodiment of the present invention proceeds first with a description of state machines, followed by descriptions of embodiments of the Paxos and fast Paxos algorithms. Subsequently, detailed descriptions of embodiments of the generalized Paxos and generalized fast Paxos algorithms will be provided.

State Machines

In a distributed environment, such as distributed system 10 illustrated in FIG. 1, coordination among devices can be a difficult task. One mechanism for avoiding difficulties inherent in relying on time as a coordinating factor is to model the distributed computing system in terms of a state machine where the performance of a function moves the state machine from one state to another. Thus, a state machine can be described with reference to a set of states, a set of commands, a set of responses, and functions that link each response/state pair to each command/state pair. A client of a state machine can issue a command which requests that the state machine execute a function. The function can then change the state of the state machine and produce a response.

The individual devices that comprise the distributed computing system can each execute the state machine of the system. The devices can, therefore, be coordinated by determining an initial state and then executing the same functions in the same order from then on. A device can be synchronized by simply determining the last function the device executed, locating that function in an ordered list of functions executed by other devices, and then directing the device to perform the functions from the ordered list that the device has not yet performed. Such a state machine approach was initially proposed in the article "Time, Clocks, and the Ordering of Events in a Distributed System," by Leslie Lamport published in The Communications of the ACM, Volume 21, Number 7, July 1978, the contents of which are hereby incorporated by reference in their entirety to further explain or describe any teaching or suggestion contained within the present specification that is consistent with their disclosures.

Paxos Algorithm

By using a state machine approach, the synchronization of the constituent devices 11 through 15 of the distributed computing system 10, shown in FIG. 1, can be achieved by agreeing on the functions to be performed and the order in which to perform them. One method for agreeing upon a function to be performed is known as the Paxos algorithm. The Paxos algorithm allows the system 10 to operate properly even in the face of failures, where devices can stop operating without advanced warning. The Paxos algorithm requires that at least a quorum of devices agree to a function before the system as a whole performs that function. With the Paxos algorithm, a quorum can be a simple majority, or it can include more devices than that, depending upon the particular requirements of the system. However defined, a quorum can be sufficiently large such that any two quorums have at least one device in common.

To maintain consistency, the Paxos algorithm can require that the system 10 limit the performance of functions to a single function per step. Therefore, only a single function can be selected for a given step. Since any two quorums have at least one properly functioning device in common, the selection of no more than one step could be ensured by requiring that every device vote only for one proposal. However, if a number of devices simultaneously acted as leaders, such a requirement would cause a stalemate because it would be possible that none of the proposals was agreed to by a quorum, and yet none of the devices could vote for a proposal for a different function so that a quorum could eventually be reached.

The Paxos algorithm solves this problem through a multiphase process by which devices are allowed to change their votes, but leaders are constrained in the functions they propose. Using the Paxos algorithm, a leader can propose any function the leader chooses, unless the leader learns of a previously proposed function. If the leader has learned of at least one previously proposed function, that at least one device in the quorum has already voted for, the leader can propose the most recent of the previously proposed functions the leader has learned of. Each device need only track the most recent proposal that device voted for. If the device receives a proposal for which it has promised to vote, and it has not promised to vote for another proposal in the meantime, the device can cast a vote for the proposal. A device can only promise to vote for a proposal if the proposal has a larger proposal number than any other proposal the device has previously promised to vote for. The use of proposal numbers allows the system to achieve correct operation without the need to resort to complicated and expensive synchronization of clocks between the constituent devices. The most recent proposal will generally have the largest proposal number. If it does not, it can be ignored, as explained further below. When promising to vote for a proposal, the device can also transmit to the leader the highest proposal number, that is less than the current proposal number, for which the device has previously promised to vote. In such a manner the leader can always learn of previous proposals.

Figure 3A:
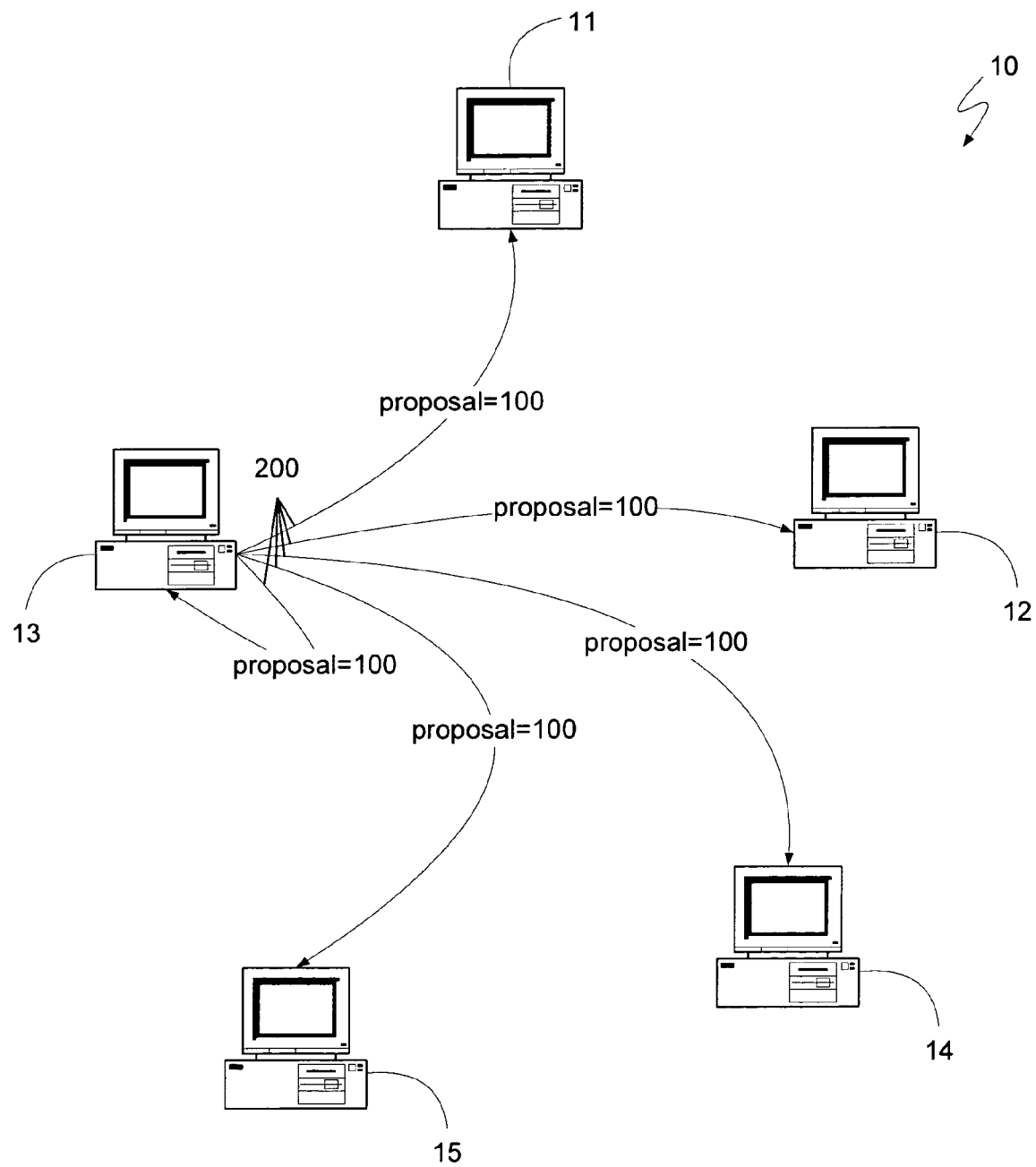
FIGS. 3*a-e* generally illustrate the operation of a consensus algorithm contemplated by an embodiment of the present invention.

Turning to FIG. 3a, the Paxos algorithm is explained in greater detail using the exemplary distributed computing system 10, comprising the five devices 11 through 15, shown. In such an environment, a quorum can be defined as any group of three or more devices because such a definition will ensure that every quorum has at least one device in common. As shown in FIG. 3a, device 13 can assume a leadership position and transmit message 200 to devices 11-12 and 14-15, suggesting a proposal number to be used for proposing a function to the devices 11-15. Because device 13 can act as both a device and a leader, it sends itself message 200, though such a transmission could be handled internally to the device and need not be physically transmitted. Device 13 can select an arbitrarily large proposal number in an effort to ensure that there are no previous proposals with larger proposal numbers. Furthermore, because device 13 itself may have voted on previous proposals, it can select a proposal number that is larger than any proposal device 13 is aware of.

Because proposals can be ordered based on their proposal numbers, it can be advantageous to prevent two or more devices from using the same proposal number for different proposals. Therefore, proposal numbers can be selected by devices using mechanisms based on unique device properties, such as a Media Access Control (MAC) address of the device sending the proposal. Alternatively, proposal numbers can be partitioned among the devices, requiring each device to select proposal numbers only from among its partition. One method for partitioning the proposal numbers would be to grant to the "$i^{th}$" device proposal numbers congruent to "i" modulo the number of devices in the system.

Because, as will be shown, the Paxos algorithm can operate even if a number of devices attempt to act as leaders, the mechanism by which a device assumes a leadership position is not important. Nevertheless, a mechanism that minimizes the chances that different devices can simultaneously believe they are the leader can increase the efficiency of the system. For example, mechanisms based on unique device properties, such as a MAC address, can reduce the chance of having more than one simultaneous leader. One such mechanism could simply select a properly functioning device with the smallest MAC address to be the next leader. In addition, a leader selection mechanism could prevent a device from attempting to become a leader if the device has already received a message from another device acting as a leader within a predetermined amount of time, to prevent a constant changing of the leadership device. Because constant leadership change can introduce inefficiencies into the operation of the system, the above described mechanisms can provide more efficient operation.

Figure 3B:
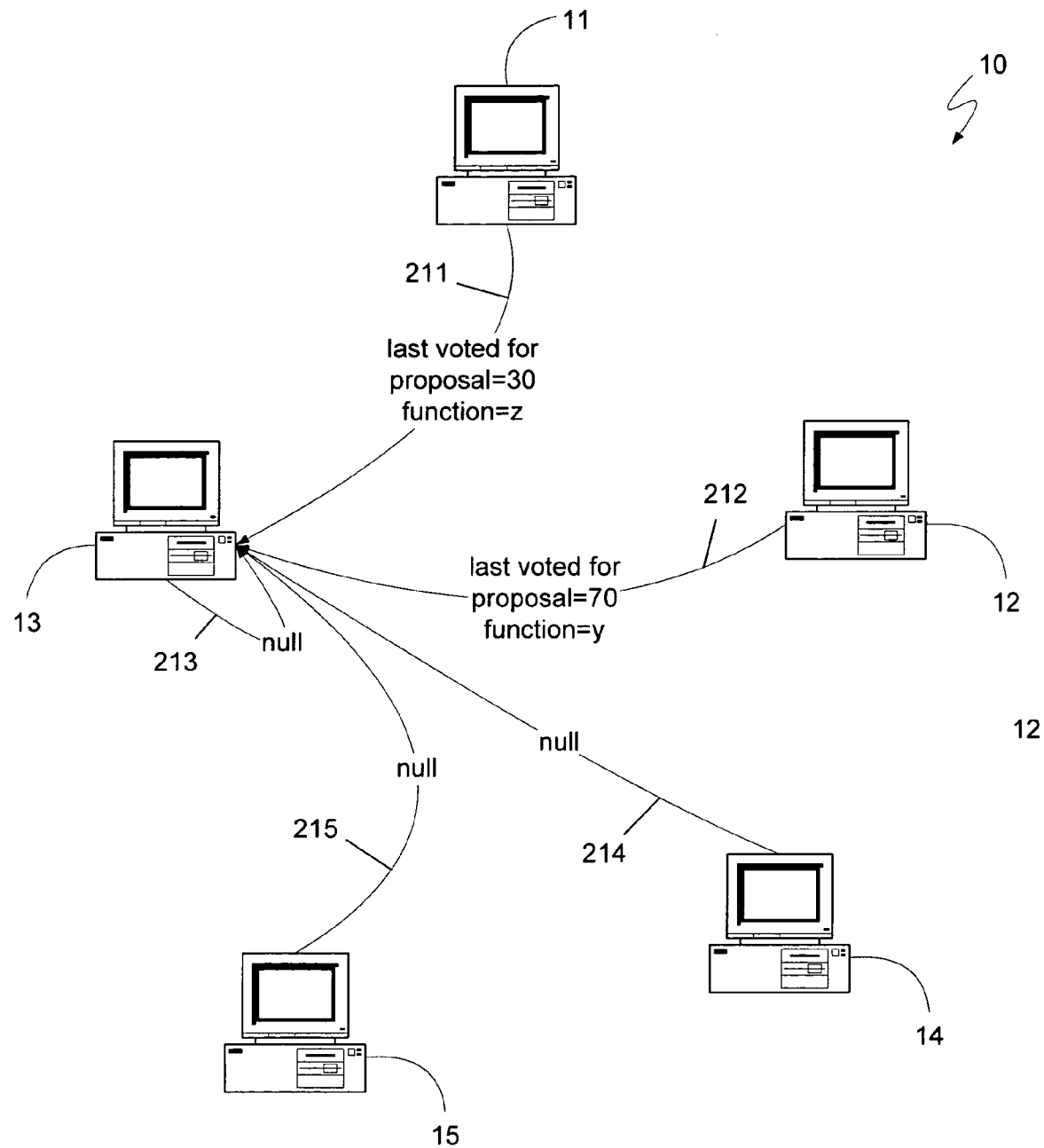

Turning to FIG. 3b, upon receipt of a message, such as message 200, suggesting a new proposal number, each of the devices 11-15 can respond with messages 211-215 indicating the largest proposal number, that is still less than the proposal number suggested by message 200, and the function proposed by that largest proposal number for which that device has cast a vote. If the device has cast a vote for a proposal number that is greater than the proposal number used by the leader, the device can ignore the message from the leader, or, as will be explained below, the device can respond with the last vote information despite the larger proposal number. In the exemplary condition shown in FIG. 3b, device 12 has previously voted for proposal number 70, which had proposed that the system 10 execute a function identified by the variable "y". Thus, in response to message 200, device 12 can send message 212 indicating that it last voted for proposal number 70, which proposed the execution of the function "y". Similarly, device 11 previously voted for proposal number 30, which had proposed that the system 10 execute a function identified by the variable "z". Message 211 can, therefore, convey this last vote information of device 11 back to device 13. Devices 13-15 may not have received any proposals and have, therefore, not previously cast a vote for any proposal. They can, therefore, return a null response as indicated by messages 213-215. Again, as above, messages sent from device 13 to itself can be handled internally by device 13, but are illustrated for explanatory purposes.

Figure 3C:
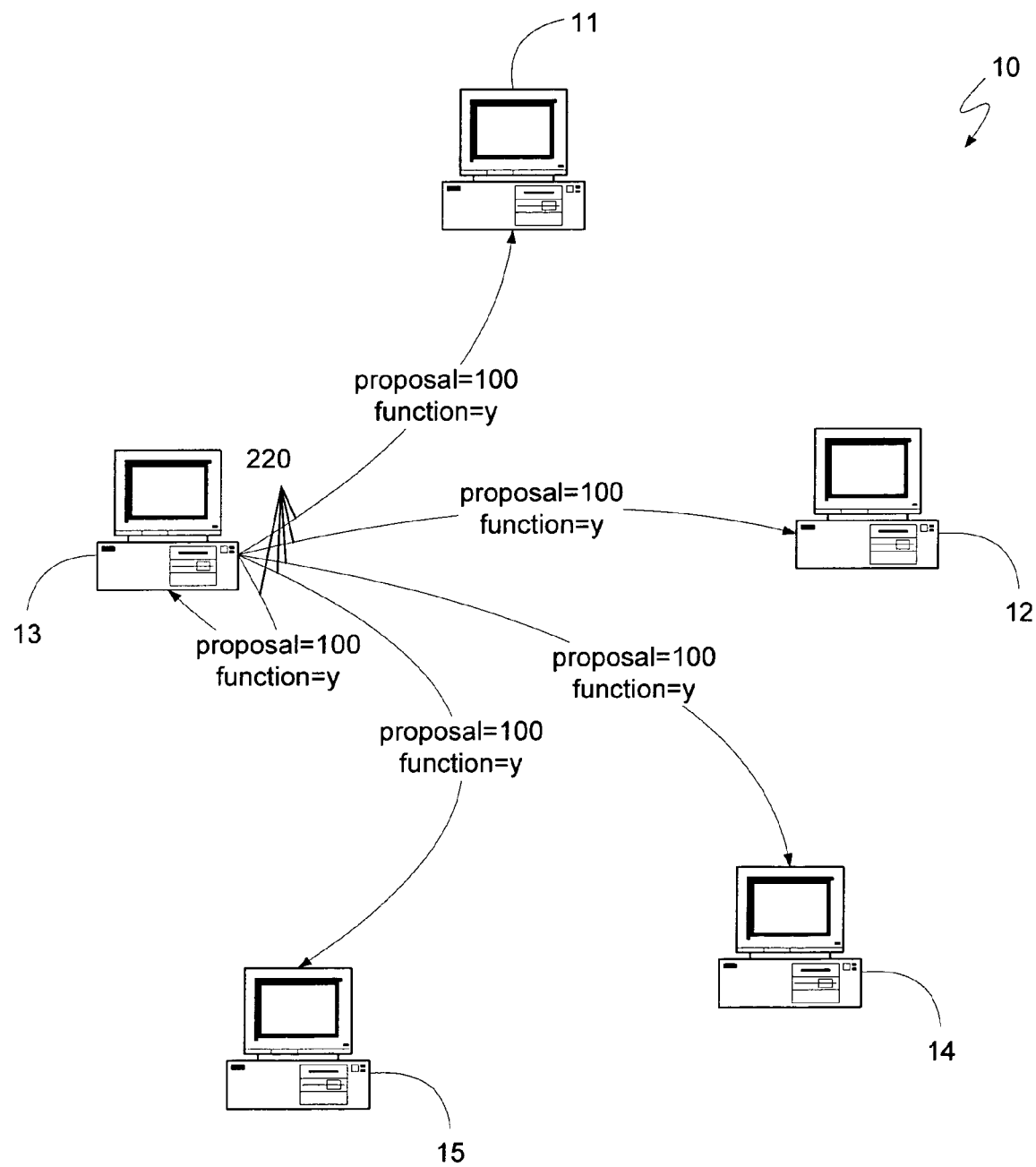

Turning to FIG. 3c, after the leader 13 receives messages 211-215, the leader can determine an appropriate function to propose such that the function proposed is equivalent to the function with the largest proposal number that was voted on by any member of the quorum. If none of the quorum members had voted on any previous proposal, then the leader is free to select whichever function the leader wishes to propose. Therefore, given the messages 211-215 illustrated in FIG. 3b, device 13 can select to solicit votes for the execution of function "y" as that function was voted for by device 12 as part of proposal number 70, which is the proposal with the largest proposal number of which the leader 13 has learned. However, because the system 10 illustrated in FIGS. 3a through 3e contains five devices, a quorum can be as few as three devices. Thus, it is sufficient for the leader 13 to select any three or more devices to act as a quorum. Consequently, a quorum selected by the leader 13 may not include the device 12. In such a case, the leader 13 need not propose the function "y" because device 12 is not a member of the selected quorum. Instead, the leader 13 can propose a function that was proposed with the largest proposal number that the devices in the leader selected quorum previously voted for. If none of the devices had previously voted for any proposals, the leader can propose any function it chooses.

Because the message 200, suggesting a proposal number, acts as a mechanism by which the leader 13 can determine an appropriate proposal number to select, and enables the leader to learn of all lower numbered proposals that were previously proposed, it can be necessary for the leader 13 to send multiple messages, such as message 200, increasingly suggesting larger proposal numbers if the earlier messages have too low a proposal number. Rather than requiring the leader to send a multitude of messages, each device can respond with the largest numbered proposal for which it has voted irrespective of whether the proposal number suggested by the leader is larger or smaller than the previously voted for proposal. In such a manner, the leader 13 can more efficiently learn of previous votes and can more accurately select a proposal number with which to propose a function.

Returning to FIG. 3c, the leader 13 is shown selecting a quorum consisting of all of the devices of the system 10, and transmitting a message 220 seeking a vote on the execution of function "y" by the system 10. Upon receipt of message 220, each device can determine whether to vote for function "y". A device can vote for a function so long as the device has not responded to a suggestion of a new proposal having a larger proposal number than the proposal for which the vote is currently being requested. Thus, for the example illustrated in FIG. 3c, if any of the devices 11-15 had received and responded to another suggestion for a new proposal, having a proposal number greater than 100, prior to receiving message 220 from the leader 13, then that device may not vote for the function for which a vote was solicited by message 220.

Figure 3D:
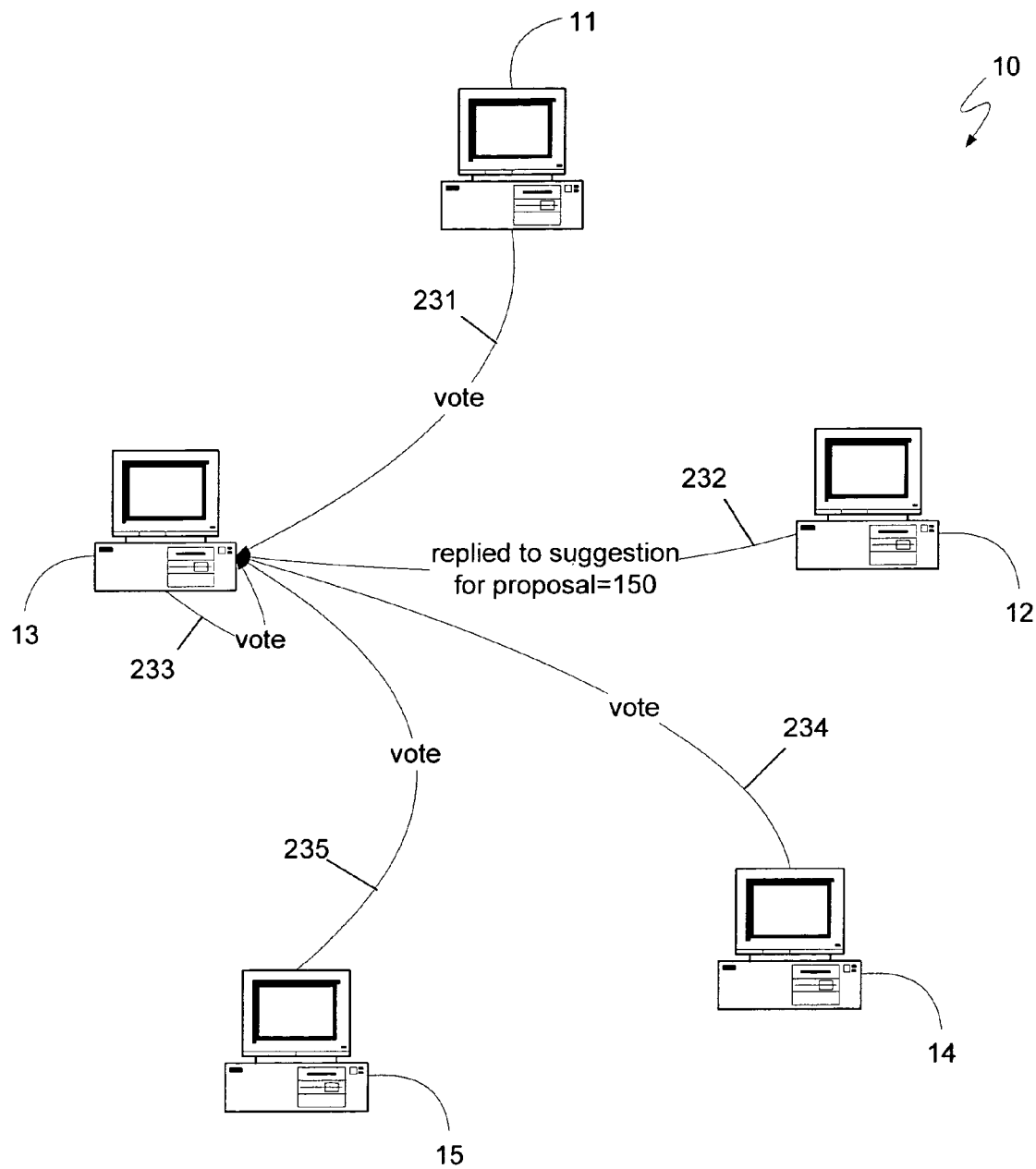

Turning to FIG. 3d, each of the devices 11-15 can independently determine that they have replied to no other suggestions for new proposals with proposal numbers greater than 100. Therefore, because the last suggestion for a new proposal to which they responded is not for a proposal with a larger number than the current proposal, devices 11 and 13-15 can vote for the proposal and indicate their votes in messages 231 and 233-235, respectively. As before, message 233 is shown for illustration purposes, and can be handled internally to device 13. Device 12, however, may have, sometime prior to the transmission of message 220, received and responded to a suggestion for a new proposal with a proposal number greater than 100. Therefore, upon receipt of message 220, device 12 can determine that it had already responded to a suggestion for a new proposal with a number greater than 100 and could not, therefore, vote for proposal 100. As a result, as shown in FIG. 3d, device 12 responds with message 232 informing the leader 13 that it has responded to suggestion for a proposal with a proposal number of 150. If leader 13 determines that it needs the vote of device 12, it can send another message, similar to message 220, except with a proposal number greater than 150. Alternatively, device 12 need not respond to message 220, and device 13 can, if it needs device 12's vote, attempt another vote with a proposal with an arbitrarily large proposal number. As can be seen, if device 12 does not indicate the larger proposal number to leader 13, the leader may have to guess and could waste resources guessing, through multiple messages, an appropriately large proposal number.

Figure 3E:
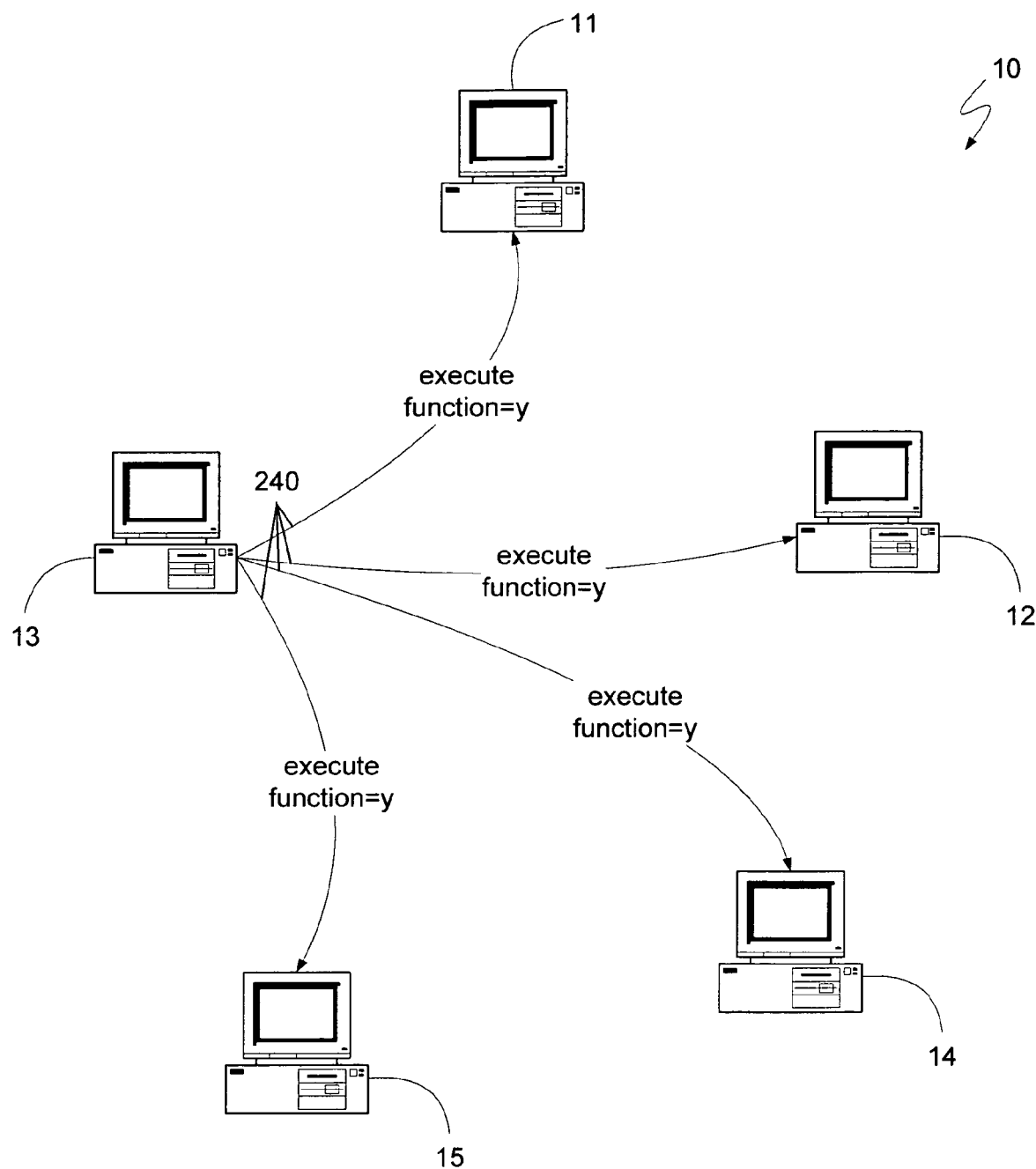

However, because devices 11 and 13-15 are more than sufficient to constitute a quorum, the leader 13 can determine that the proposal has been accepted, even without the vote of device 12, and can request, with message 240 as shown in FIG. 3e, that each of the devices 11-12 and 14-15 execute function "y". Device 13 can execute the function "y" upon determining that it was accepted, without waiting for the transmission of message 240. Consequently, device 13 need not, even internally, send message 240.

While devices 11 and 13-15 do constitute a quorum, it is not the same quorum to which leader 13 submitted the proposal to a vote, which included device 12. However, as described above, a leader need only receive votes from a quorum, and not necessary the same quorum to which the request was sent, to determine that the proposal has been accepted. The Paxos algorithm described above ensures that only a single function is selected and executed by the system 10 for any given step in its operation. For example, if another device that was previously non-operational, became operational and re-joined the system 10, it might try to propose a function different from "y" for the same step for which the system had selected and executed "y". If such a device sent a proposal with a proposal number less than 100, it could be ignored by devices 1 and 13-15, since they had already voted on proposal number 100 as shown in FIG. 3d. On the other hand, if the device sent a proposal with a proposal number greater than 100, such as proposal number 130, devices 11 and 13-15 would return a message indicating that they had voted for function "y" in proposal number 100. Device 12, because it may not have voted, as illustrated in FIG. 3d, might respond with message 212, indicating that it had voted for function "z" in proposal number 30.

The new device could then select the largest proposal among a quorum, which, by definition would include at least some of the devices 11-15, and submit the function proposed in that proposal for voting. Thus, for whatever proposal number above 100 that it chose, the new device would submit function "y" for a vote. Each device could then vote on that proposal following the algorithm set forth above. Either proposal 130 would be selected, which would not change the prior decision to execute the function "y" for the particular step, or it would fail because too many devices had, in the meantime, promised to vote for another proposal. However, as can be seen, once a proposal is passed, all other proposals will propose the same function, and, by definition, all of the devices can only vote for that same function. In such a manner the Paxos algorithm ensures that every device the system 10 executes the same function for a given step.

The application of the Paxos algorithm, described above, can enable a distributed computing system to select a function to execute for a given step. By repeating the operations described above, a distributed computing system can agree upon a series of functions to be performed as a series of steps, and can thereby form a continuously operating system. In such a manner the distributed computing system can receive requests from one or more clients, can execute those requests, and can return the results to the clients.

Figure 4A:
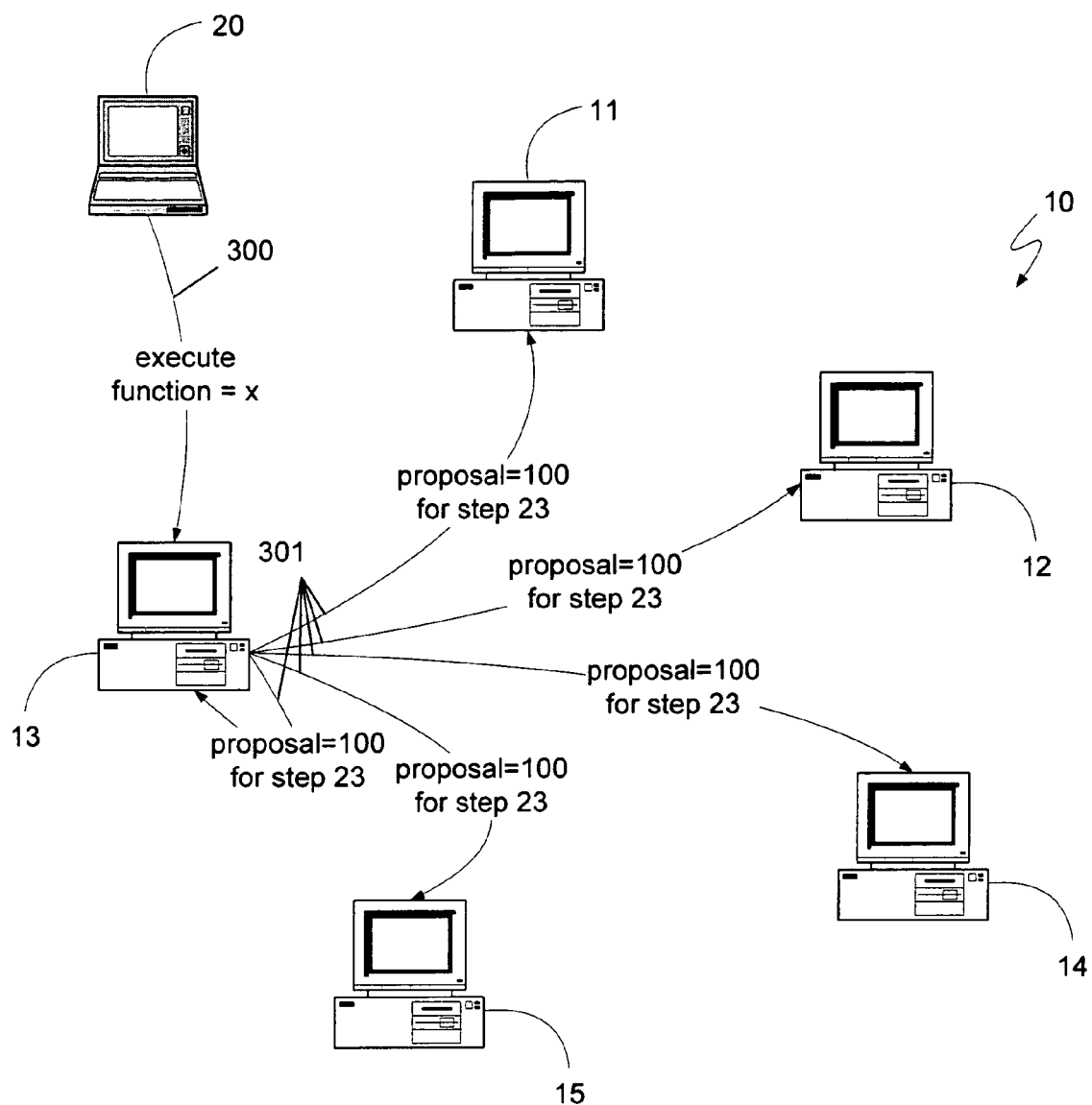
FIG. 4*a-g* generally illustrate one aspect of the operation of a multi-phase consensus algorithm contemplated by an embodiment of the present invention.
Figure 4A:

Turning to FIG. 4a, the system 10 can have already been operational for a number of steps. For example, in the exemplary system 10 illustrated in FIG. 4a, the most recently selected step can be step 24, and step 25 can be the current step. However, the device that was previously acting as a leader may have failed, or simply not received any client requests. Client 20 can send a request to execute a function, represented by the variable "x" in FIG. 4a, to device 13 using message 300, as shown. Device 13 can, according to any number of mechanisms, such as those described above, determine that it should attempt to become a leader. As such, device 13 can send message 301 suggesting the use of proposal number 100 for the next proposal, and including the step for which the proposal is being made. In the exemplary distributed computing system 10 of FIG. 4a, device 13 is not aware that steps 23 and 24 have already been decided upon by the other devices 11-12 and 14-15. Thus, message 301 indicates that it is suggesting a proposal numbered 100 for step 23.

To expedite the operation of the algorithm in a system executing multiple steps, a message, such as message 301, can be understood to suggest a proposal numbered 100 for all steps greater than or equal to step 23. In such a manner, the leader 13 need not continually transmit messages, such as message 301, until it learns of every step that has already been decided. Instead, the leader 13 can learn of the already selected steps through only a single message round trip, as will be shown.

Figure 4B:
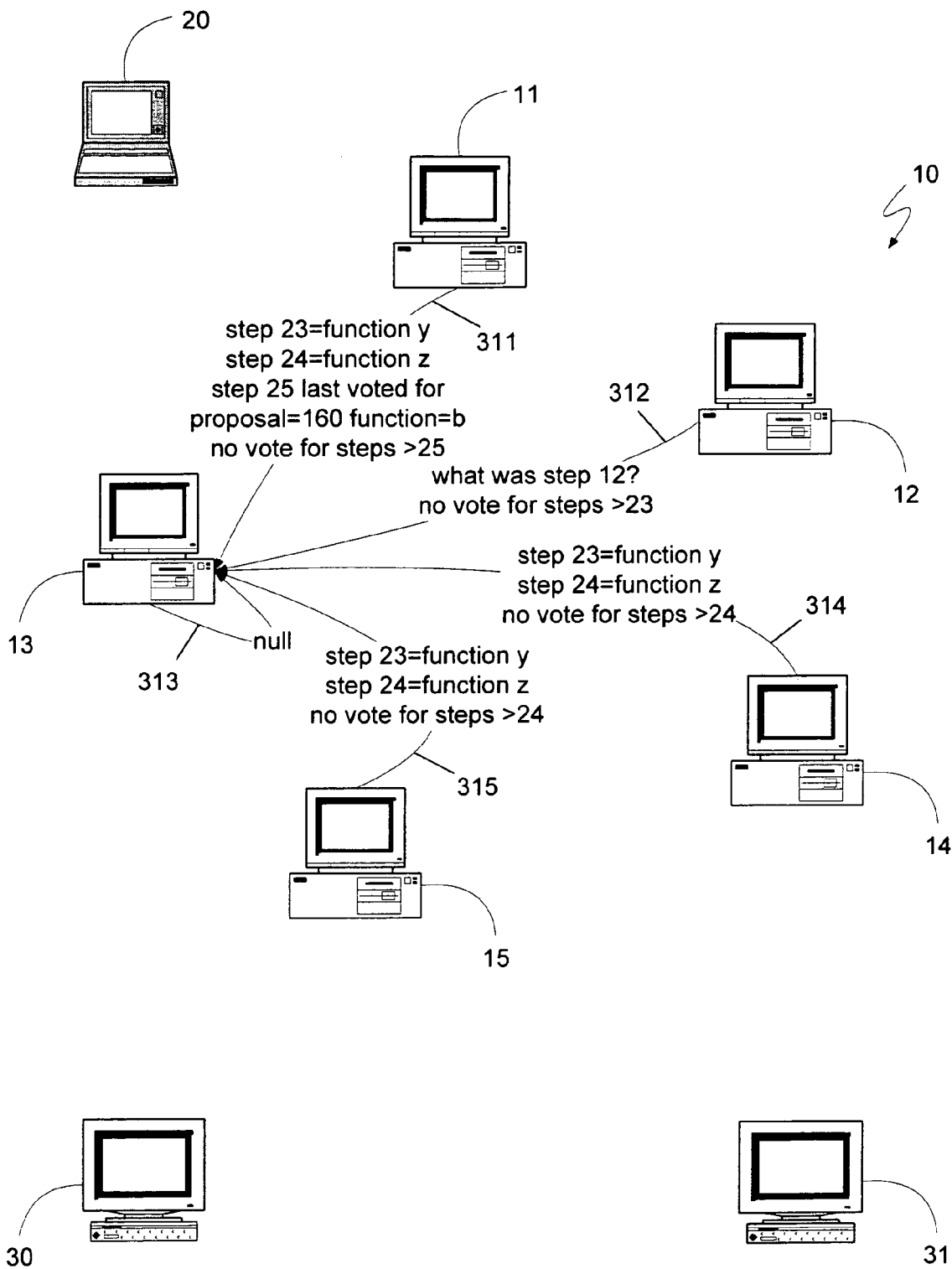

Turning to FIG. 4b, response messages 311-315 from the devices 11-15 of distributed computing system 10 are shown. Devices 11, 14, and 15, for example, have recorded that function "y" was selected for step 23 and function "z" was selected for step 24. Thus, upon receipt of message 301, devices 11, 14, and 15 can respond with messages 311, 314, and 315 indicating the functions they have stored as being selected for all steps greater than or equal to 23; in this case steps 23 and 24. In addition, devices 11, 14, and 15 can provide an indication of the proposals with the largest proposal numbers for which they have voted for steps greater than or equal to 25. Thus, in the example illustrated in FIG. 4b, message 311, can also indicate that device 11 did not vote for any proposals for steps greater than 25, and that it voted for proposal number 160, proposing function "b" for step 25. Messages 314 and 315, on the other hand, can indicate that devices 14 and 15 have not voted for any proposals for any step greater than step 24. To decrease the number of messages being transmitting within the system 10, devices need only respond with their highest proposal number votes if they do not know of a function that has been selected for the given step. Thus, because device 11 was aware that functions were selected for steps 23 and 24, but not step 25, it responded with the functions selected for steps 23 and 24 and the highest numbered proposal for which it voted for step 25.

As before, device 13 can act as both a leader and a voting device. As such, device 13 can send itself messages, such as message 301, and it can respond to itself with messages such as message 313. Such messages are shown in the figures for illustrative purposes only, as they would likely be transmitted internally to device 13. Furthermore, because device 13 can check what is the step with the largest step number for which it knows the function selected, and it can check what the largest proposal number is for the proposals for all steps above that which device 13 voted for, message 313 should rarely contain any information other than a null indicator.

The current state of a state machine may depend, not only on the functions that were selected, but on the order in which those functions are executed. Therefore, if a device does not know which function was selected for a given step, there may be situations in which that device should not execute any functions beyond that step or it will execute functions out of order and its state will be different from that of the distributed computing system. For example, some functions, such as functions that specify a new state unconditionally, are independent of the current state of the device. Such functions can be executed even if functions for steps having lower step numbers than the current step have not yet been executed. Similarly, functions for which the output can be computed without knowing all of the previous steps, such as writing to a database, can also be partially executed out of order to generate the output to be sent to the client. In general, however, a function should not be executed until all previous functions have been executed. Therefore, a device can always attempt to learn which functions were selected for a step that the device missed. When device 13 sends message 301, as shown in FIG. 4a, it is an implicit statement that device 13 believes that step 23 is the next step and that it has knowledge of the agreed upon functions through step 22. A device that is missing a function for a step below step 23, therefore, knows that device 13 has knowledge of all of the functions through step 22, and it can request that function from device 13.

Returning to FIG. 4b, device 12 does not know what function was selected for step 12. As a result, device 12 may have been unable to execute any functions since step 11, even though it may know the functions selected for steps 13-23. Thus, in message 312, device 12 can request the function for step 12 from the leader 13. In addition, device 12 can indicate that it has not voted on any proposals for steps numbered higher than step 23.

If a device has missed too many steps, it can be more efficient to simply inform the device of the current state rather than transmitting all of the functions for all of the steps it has missed. One mechanism for ensuring that a device does not miss too many steps is to enable each device, or a collection of devices, to periodically take a snapshot of the various parts of the state, or the whole state. The state of another device could, therefore, be updated by sending it the appropriate snapshot together with the functions that were selected since the latest snapshot. Additionally, by using checksums of individual parts of the state, the state of another device could be updated by just sending that other device the parts of the state that differ from its current copy. As will be clear to one skilled in the art, by hierarchically decomposing the state and using checksums of the decomposition at each level, the part of the state that changed can be determined efficiently with arbitrary precision.

As a result of receiving messages 311 through 313, the leader 13 can learn of the selected functions for steps 23 and 24, of which it did not previously know, attempt to determine the appropriate function to propose for step 25, and can attempt to update other devices that also have not already learned of the selected functions for all of the steps through step 25. Originally, the leader 13 suggested a proposal number of 100 in message 301, but device 11 responded with message 311 indicating that it had already voted for a proposal with a larger proposal number than 100 for step 25. Consequently, leader 13 can select a proposal number greater than the largest proposal number of which the leader is aware of and transmit another suggestion message such as message 320 shown in FIG. 4c. Alternatively, device 11 could have simply ignored the suggestion for proposal number 100 in message 301 because the proposal number was less than the proposal number of the proposal for which device 11 had already voted for. In such a case, the leader would have retried by increasing the proposal number in an attempt to account for devices that ignored the initial suggestion. As can be seen, if devices ignore suggestions for proposals with proposal numbers that are less than the proposal numbers of the proposals for which the devices had already voted, the leader may be forced to perform multiple retries, each time increasing the suggested proposal number. Such multiple messages can be inefficient. It may, therefore, be preferable for devices to respond to all suggestions for a new proposal number, even if the proposal number is less than the proposal numbers of the proposals for which the devices had already voted, because the leader can then determine, with greater precision, an appropriate proposal number to suggest, and can avoid multiple messages.

Figure 4C:
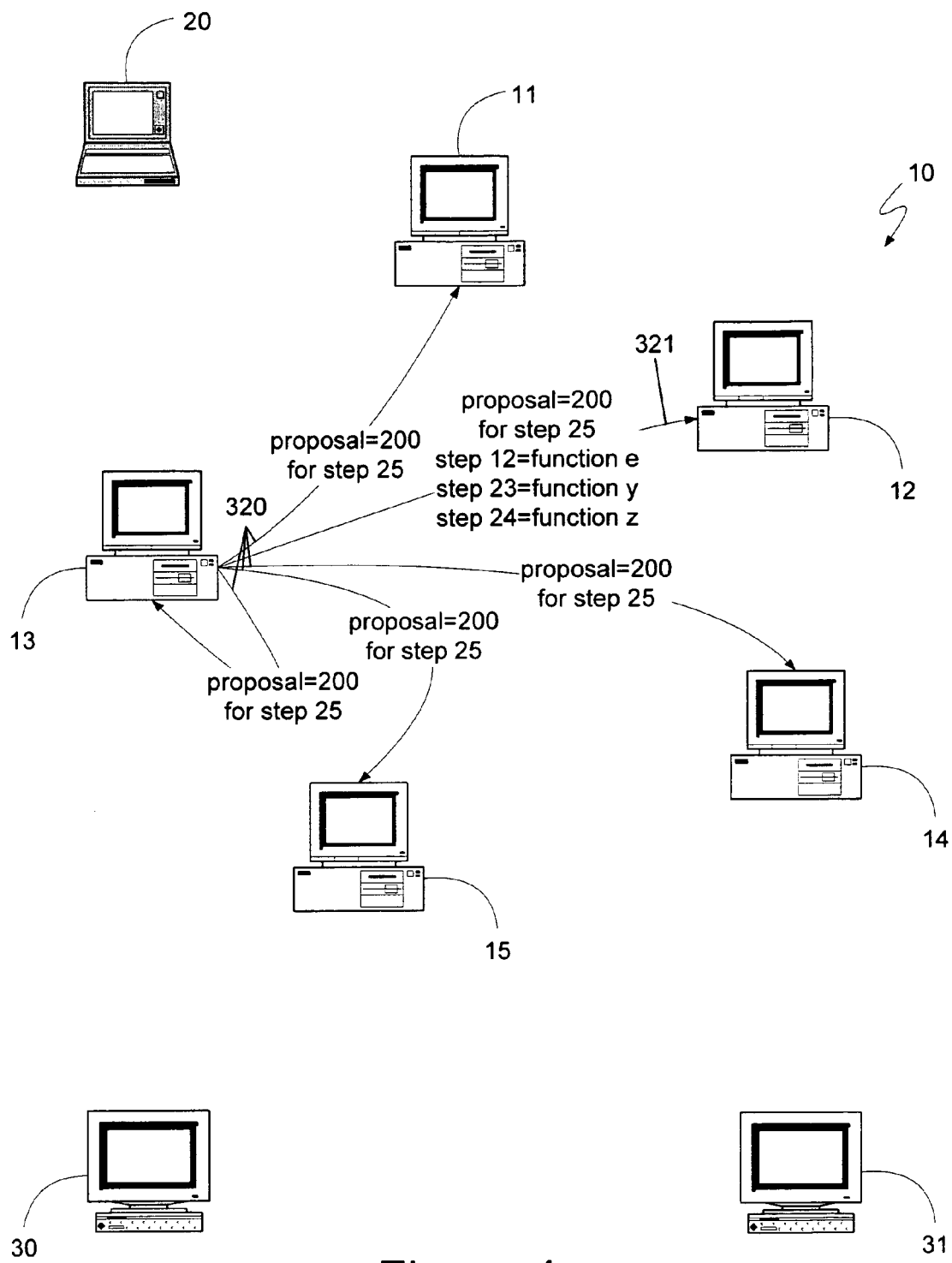

Turning to FIG. 4c, the leader 13 can suggest a larger proposal number, such as proposal number 200 as shown in message 320, in an attempt to suggest a proposal number that is larger than the number of any proposal which leader 13 has learned that a device has previously voted for. In addition, the leader 13 can also provide information regarding previously selected functions to any device that has not already aware of those selected up until step 25. Therefore, as shown, the leader 13 can also send a message 321, indicating to device 12 that a function represented by the variable "e" was selected for step 12, and that a function represented by the variable "z" was selected for step 24.

Figure 4D:
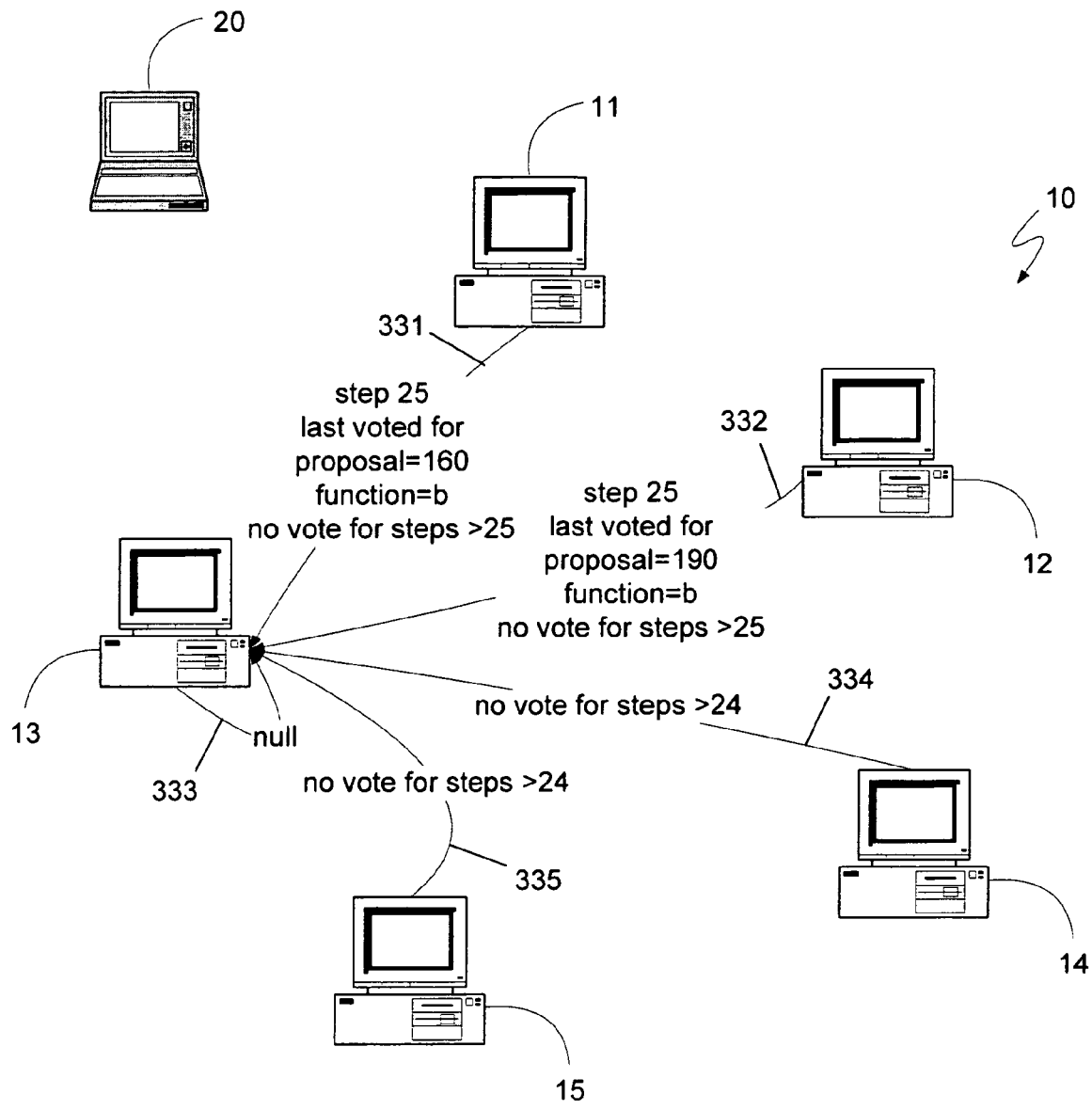

In FIG. 4d, then, the devices 11-15 can respond, in a manner similar to that shown above in FIG. 4b, with the exception that devices 11-15 need not inform device 13 of selected functions for steps 23 and 24, as device 13 has already learned of these steps and has sent proposal messages 320 and 321 referencing step 25. Furthermore, messages 331-335 can contain additional information, such as additional proposals for which the devices may have voted for. For example, device 12 may have, sometime between the transmission of message 312 and message 332, voted for a proposal with a proposal number 190. Consequently, message 312 can indicate that device 12 may not have previously cast a vote for any proposal for step 25, but message 332 can indicate that device 12 has voted for proposal 190 for step 25, though it has still not voted for any proposal for steps greater than 25. However, because each of the proposal numbers are less than the suggested proposal number the leader 13 sent in message 320, the leader can proceed to propose a function with the proposal number 200 specified in message 320.

Figure 4E:
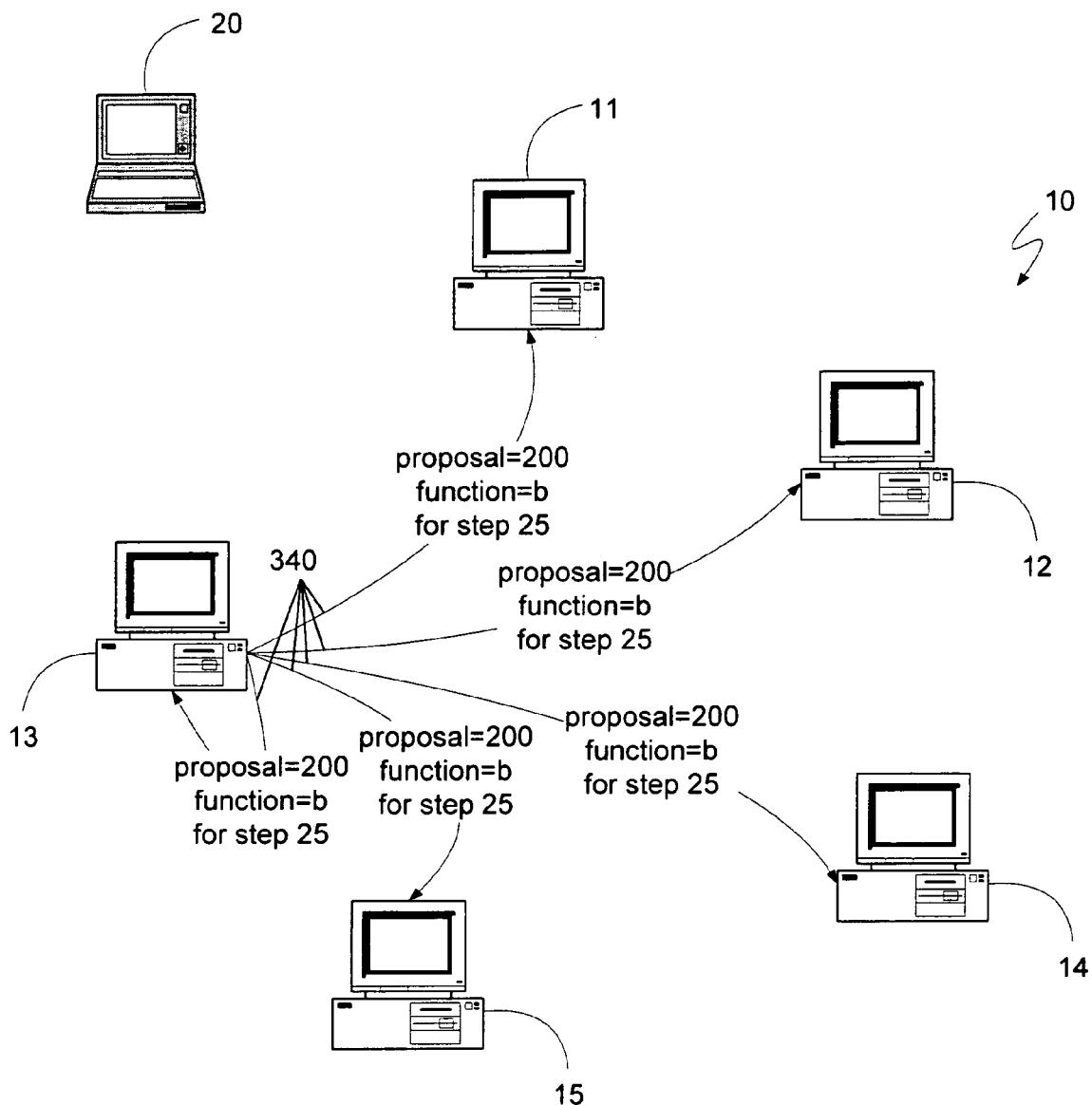
Figure 4E:
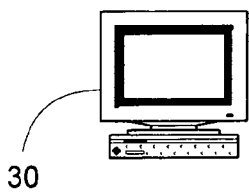
Figure 4E:
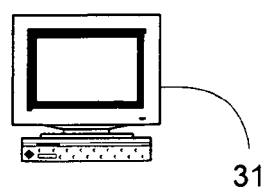

Turning to FIG. 4e, the leader 13 now has sufficient information with which to select a proposal to submit as proposal number 200, as illustrated by message 340, which requests that devices 11-15 vote on proposal 200, proposing that the system execute function "b" for step 25. As before, because devices 11 and 12, both members of the quorum, have previously voted for a proposal proposing the execution of function "b", and no other member of the quorum has voted for any larger numbered proposals, the leader 13 can propose a function "b" for proposal number 200, despite the fact that the client 20 requested the execution of function "x" in message 300. In such a manner, the Paxos algorithm insures that previous functions that were proposed but not completed, such as because of a failure of one or more devices or their communications, can be executed in the proper order.

Figure 4F:
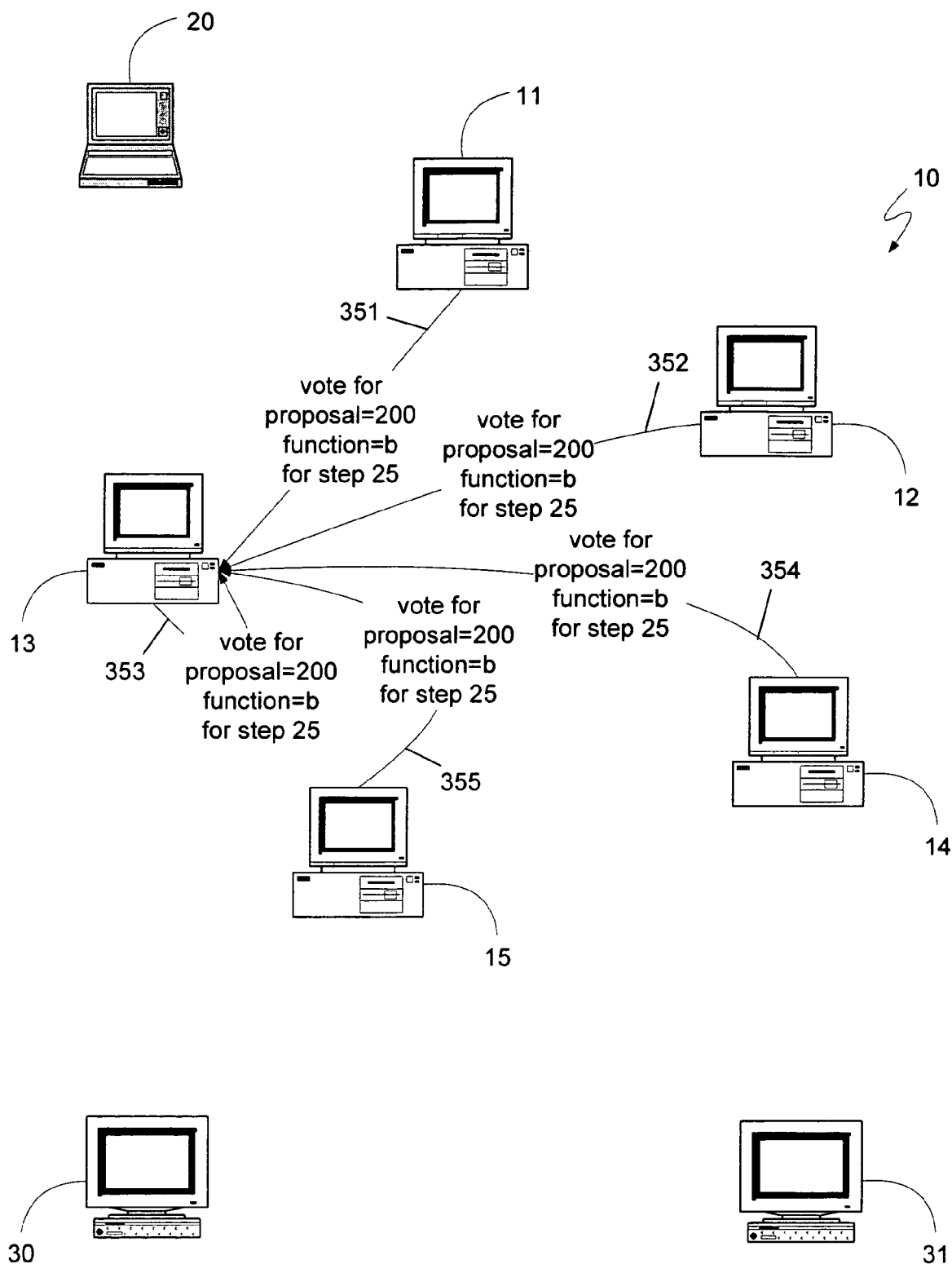
Figure 4G:
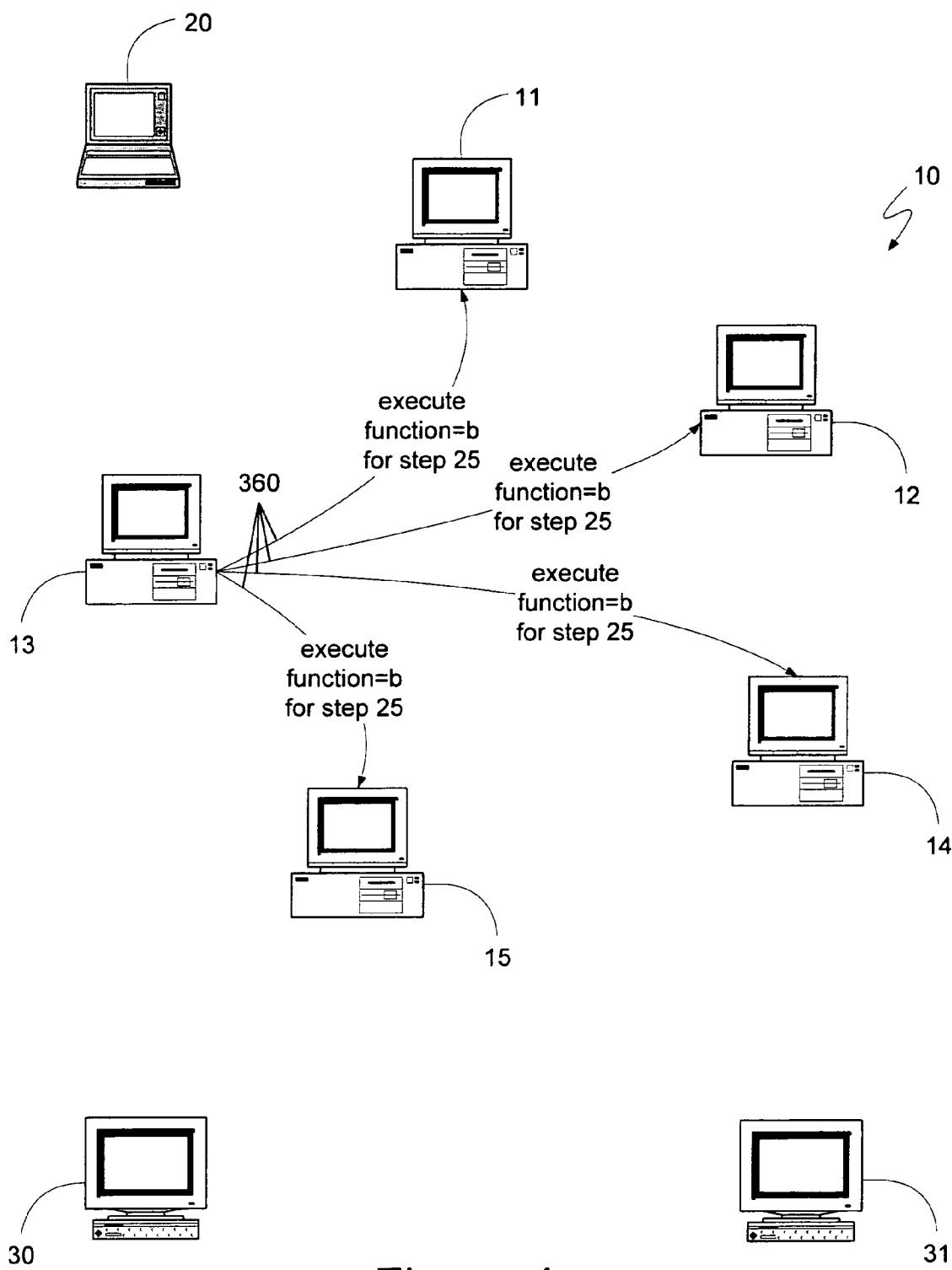

FIG. 4f illustrates devices 11-15 voting, for step 25, for proposal 200 proposing function "b" with messages 351-355, respectively. As before, a device can vote for a proposal so long as it has not promised to vote for a different proposal with a larger proposal number between the receipt of messages 320 and message 340. Once the leader 13 receives messages 351-355, it can transmit a message 360, as shown in FIG. 4g, informing the devices 11-12 and 14-15 that the function "b" was selected for step 25. The leader 13 can also store this information itself, since it now knows that the function was selected by a quorum.

However, the function requested by the client 20 in message 300 has not yet been selected by the system 10 at the point in time illustrated in FIG. 4g. To have the system 10 selected the client's request, the leader 13 can perform an abbreviated version of the complete Paxos algorithm illustrated by FIGS. 3a-e and 4a-g above.

Conceptually, the Paxos algorithm described above can be divided into two general phases. The first phase comprises the leader learning of previous proposals that were voted for by the devices in the quorum. The first phase can contain one iteration of a proposal number suggestion by the leader and responses by other members of the quorum, as illustrated by FIGS. 3a and 3b, or multiple iterations of proposal number suggestions and responses, as illustrated by FIGS. 4a-d. The second phase comprises the leader submitting a proposed function for a vote, receiving the votes, and, if the proposal was voted on by a sufficient number of devices, instructing the devices to execute the agreed to function. Examples of the second phase are illustrated by FIGS. 3c-e and 4e-g.

Once the leader learns of other proposals, and finds a proposal number that is safe for all of the current and future steps, it does not need to solicit further information unless it fails, or another device attempts to become a leader. Therefore, the first phase of the Paxos algorithm may be performed less frequently, while the second phase may be performed repeatedly, with ever increasing step numbers, allowing a distributed computing system to agree upon a series of functions and maintain an active running state.

Figure 5A:
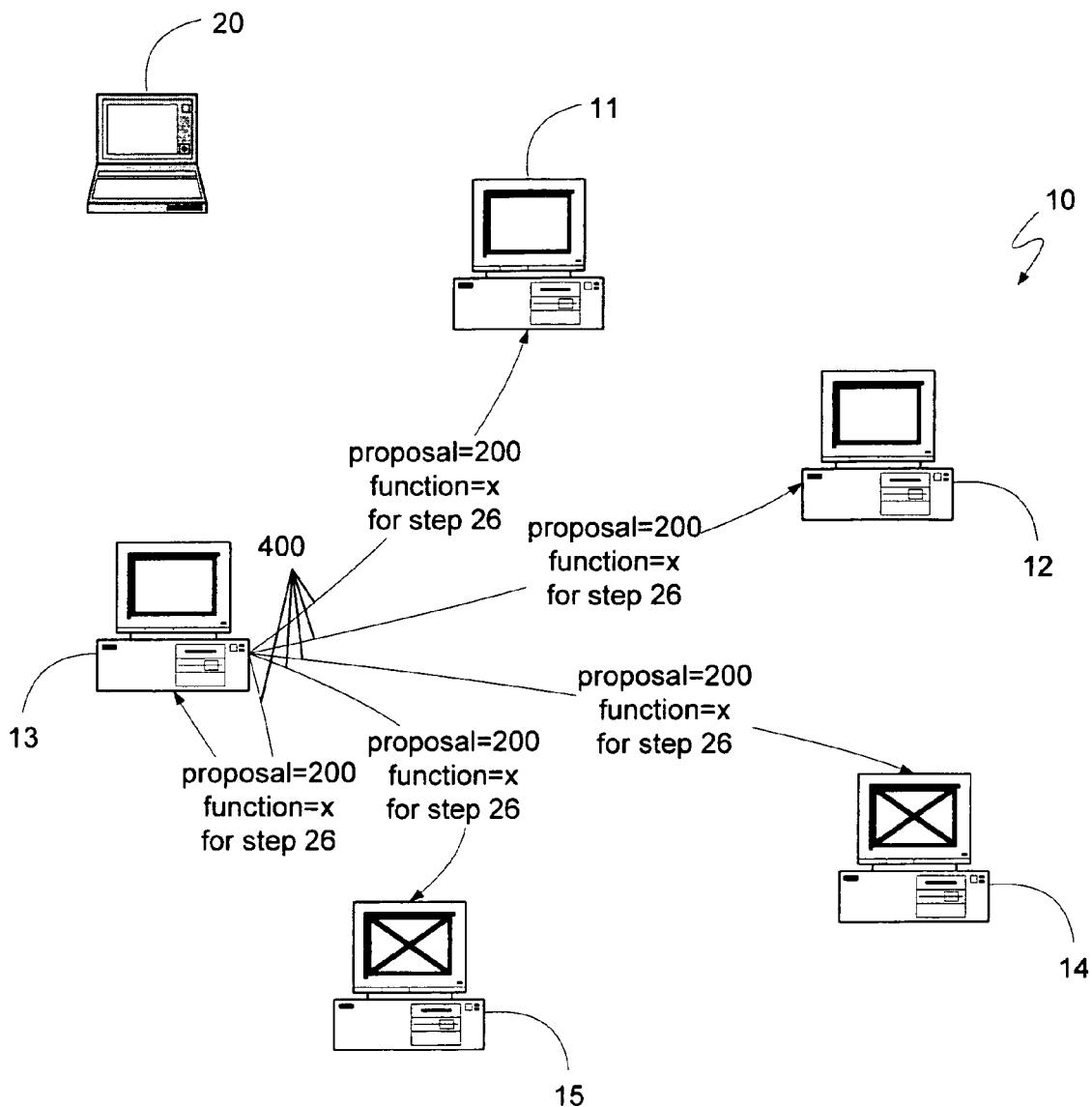
FIGS. 5*a-c* generally illustrate another aspect of the operation of multi-phase consensus algorithm contemplated by an embodiment of the present invention.
Figure 5A:
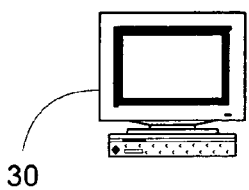
Figure 5A:
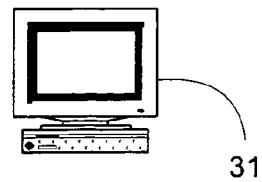
Figure 5B:
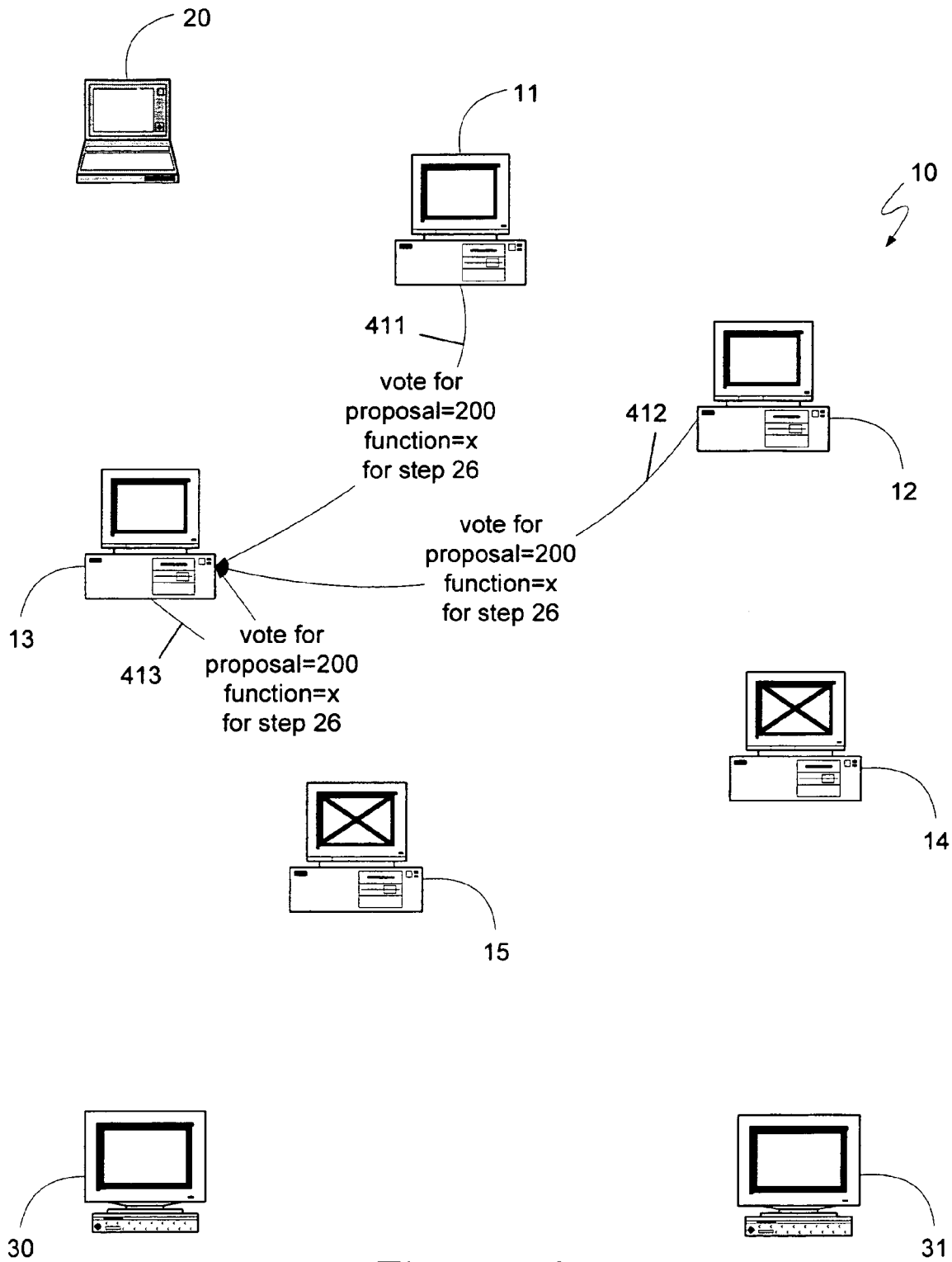

Turning to FIG. 5a, the exemplary distributed computing system 10 from FIGS. 4a-g is shown with the leader 13 proposing a function to be selected for a system step 26 that is subsequent to step 25 described in detail above. As a result of the first phase of the Paxos algorithm, as illustrated in FIGS. 4a-d, and described in, detail above, the leader 13 already is aware that none of the devices 11-15 has voted for any proposals above step 25 and that proposal number 200 is, therefore, safe for all proposals for steps greater than step 25. Therefore, as shown in FIG. 5a, for step 26 the leader can initiate the second phase of the Paxos algorithm, without needing to perform the first phase again, and can send a message 400 soliciting votes for function "x", which was requested by the client in message 300. Each of the devices 11-15 can then respond with votes. To illustrate the fault-tolerant nature of the Paxos algorithm, FIG. 5b illustrates only devices 11-13 responding messages 411-413. Devices 14 and 15 may have experienced a fault and either did not receive message 400, or cannot respond to it.

Figure 5C:
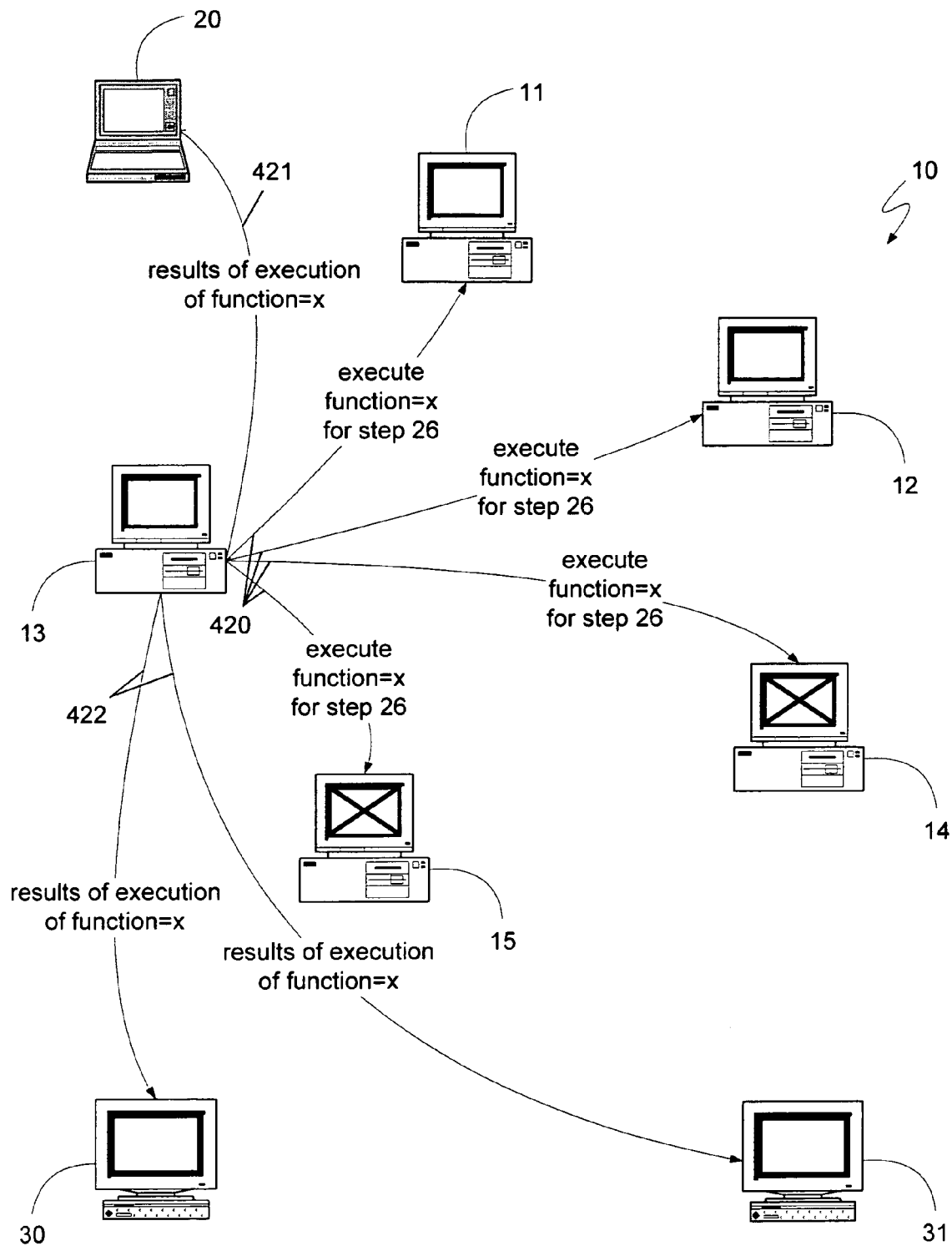

Nevertheless, the leader 13 can determine that the function "x" was selected because each of the devices in a quorum has voted for the execution of the function. As described above, a quorum can be any collection of at least a majority of the devices in the system implementing the Paxos algorithm, such as system 10. Consequently, while all of the devices 11-15 constitute one quorum of the system 10, devices 11-13, by themselves, constitute another quorum of the system 10. Because every device in the quorum comprising devices 11-13 has voted for function "x", the leader 13 can signal, with message 420, as shown in FIG. 5c, that function "x" was selected for step 26. In addition, because the leader 13 knows that the vote has succeeded, and as long as it is aware of the selected functions through step 25, it can execute function "x" for step 26 and can send the results of the execution of that function to the client as message 421, or to other interested computing devices, such as devices 30 and 31 as message 422. Messages 421 and 422 can be sent concurrently with message 420, or even before or after message 420.

As can be seen, once a leader has been established, and has learned the various highest numbered proposals voted on by the devices in the quorum for all upcoming step numbers, the leader can solicit proposals for a vote without cycling through the first phase of the Paxos algorithm. While the messages shown in FIG. 5a are described as taking place after the transmission of message 360 in FIG. 4g, the leader 13 need not wait for the devices to vote for one proposal before sending another proposal for a subsequent step. Therefore, upon sending message 340, as shown in FIG. 4e, the leader 13 can send message 400 shown in FIG. 5a, and can continue, in such a manner, proposing a series of functions, using proposal number 200, for steps greater than step 26. By operating in such an asynchronous fashion, the overall distributed computing system need not be slowed down by waiting to learn of votes for previous steps.

Should another device, such as a previously non-functioning device, attempt to become a leader, it would not cause the system to perform improperly, but would only succeed in causing the first phase of the algorithm to be repeated. For example, if another device attempted to become a leader, it might suggest a proposal number that some devices would respond to. Having responded to the proposal number offered by a second leader, the devices would then inform the first leader of the higher numbered proposal when the first leader solicited a vote, or the devices might ignore the request by the first leader to vote on its proposal. When the proposal failed, because an insufficient number of devices voted for it, the first leader would attempt to pass the proposal again by initially performing the first phase again and selecting what it believes is a sufficiently large proposal number which it can suggest to the devices. In such a manner, a second leader would only delay the system, but it would not cause improper operation on the part of the distributed computing system.

The devices implementing the Paxos algorithm, described above, can maintain variables storing information used in the algorithm. For example, for each step for which the devices do not know which function was chosen, the device can store the largest proposal number for which they responded to, the largest proposal number they voted for and the value of the corresponding proposal, and, if the device is a leader, it can additionally store the proposal number for the last proposal it issued. Additionally, devices can record which function was selected for all of the steps for which they have such information. Alternatively, a device could store a snapshot of its state at a given time, and the functions selected only since that time. For example, rather than storing each of the functions selected for steps 1-100, a device could store a snapshot of its state after the execution of step 75 and then only store the functions selected for steps 76-100, reducing the amount stored by a factor of four or more. Some or all of the above described information can be stored in either volatile storage 130 or non-volatile storage, such as hard disk 141, floppy disk 152, or optical disk 156, shown in FIG. 2.

Additional information regarding the Paxos algorithm can be found in the paper entitled "The Part-Time Parliament" by Leslie Lamport, published in ACM Transactions on Computer Systems, volume 16, number 2 on pages 133-169, dated May 1998, which is hereby incorporated by reference in its entirety to further explain or describe any teaching or suggestion contained within the present specification that is consistent with its disclosures.

Fast Paxos Algorithm

As can be seen from the above detailed description of the standard Paxos algorithm, once a leader has been established, and has learned the various highest numbered proposals for all upcoming step numbers that have been voted on by the devices in the quorum, the leader can solicit proposals for a vote without cycling through the first phase of the Paxos algorithm. To further decrease the number of message delays between the transmission of a client's request, and the transmission of a response to the client, the role of the leader in the second phase of the Paxos algorithm can be eliminated, and the devices of the distributed computing system can directly receive requests from clients such as client 20. Such an algorithm, which can be termed the "fast Paxos algorithm", relies on the above described property of the Paxos algorithm that, after a leader has established an appropriate proposal number, it often serves as a mere conduit for client requests and proposes requested functions without any additional polling of the devices of the distributed computing system.

Nevertheless, because the leader determined which functions were proposed, the Paxos algorithm could rely on the leader to ensure that functions that had previously been selected by one majority were also selected by any other majority for the same step, thereby ensuring consistency. Specifically, as described above, because every majority shared at least one device, that device would inform the leader of its previous vote and the leader could make certain that the current quorum voted for the same function for the same system step. Because the fast Paxos algorithm can operate without a leader, an alternative mechanism can be used to ensure that two quorums do not select different functions for the same system step. One such mechanism is to define a quorum as a sufficiently large number of devices so that any two quorums share a majority of their devices. In such a manner, a function selected by a previous quorum can be determined by polling any other quorum of devices and determining if a majority of the new quorum's devices have voted for the function.

Figure 6A:
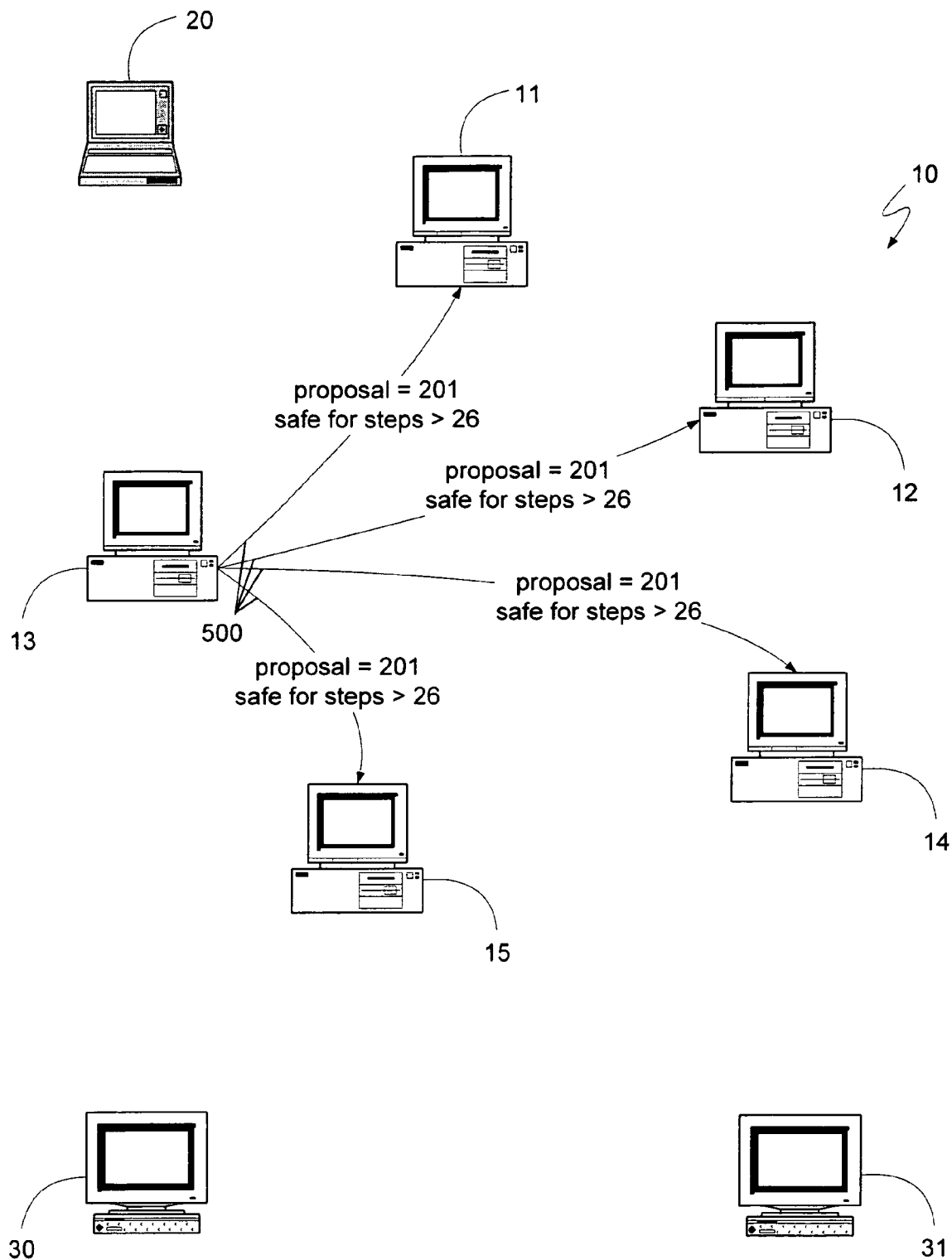
FIGS. 6*a-d* generally illustrate one aspect of the operation of a reduced message delay multi-phase consensus algorithm contemplated by an embodiment of the present invention.

Turning to FIG. 6a, an initial step of the fast Paxos algorithm is shown. Specifically, once the leader device 13 has determined an appropriate proposal number, it can notify each of the devices that they should treat any further messages from clients as proposals, for subsequent system steps, having the appropriate proposal number. For example, as shown in FIG. 6a, device 13 can send message 500 indicating that proposal number 201 is safe for all system steps greater than 26, indicating to the devices 11-15 that they should treat client requests as proposals of proposal number 201 for subsequent system steps.

As described in detail above, proposal numbers can be assigned to devices through various mechanisms. In addition to providing each device with a unique set of proposal numbers, the mechanism used to assign proposal numbers can be extended to categorize some proposal numbers as corresponding to the Paxos algorithm while other proposal numbers correspond to the fast Paxos algorithm. In such a manner, a device can know whether the current algorithm being used by the distributed computing system 10 is the Paxos algorithm or the fast Paxos algorithm, and can, therefore, make the appropriate adjustments. For example, as will be described in further detail below, devices in one implementation of the fast Paxos algorithm can anticipate the actions of a leader device if they learn of a conflict among the devices. A device can implement such mechanisms by noting the proposal number being used in order to determine if the Paxos algorithm or the fast Paxos algorithm is being used.

If proposal numbers were not correlated to a particular algorithm, the leader 13 in FIG. 6a could have indicated that proposal number 200 was safe for all steps greater than 26 since the leader has, as shown in FIG. 4d, already obtained an agreement by the devices 11-15 that they will not vote for any proposals having proposal numbers less than 200. Because a quorum of devices has promised not to vote for any proposals having proposal numbers less than 200, 200 can be considered a "safe" proposal number. Consequently, message 500 could have indicated to the devices 11-15 to treat further requests from clients as requests having a proposal number of 200.

However, if proposal numbers are correlated to a particular algorithm, as described above, then, as illustrated in FIG. 6a, the leader 13 can select a proposal number corresponding to the fast Paxos algorithm that is higher than any proposal number that was previously used of which the leader is aware. Because the leader 13 has been using a proposal number of 200, as illustrated in FIGS. 4c-g and 5a-c, the leader can select a proposal number higher than 200 that also corresponds to the fast Paxos algorithm, such as, for example, a proposal number of 201. However, before the leader can send message 500, the leader can determine that the proposal number is safe by, as described above, obtaining a promise from a quorum of devices not to vote for any proposals using lower proposal numbers. Once the proposal number of 201 is proposed and is accepted by a quorum, such as in the manner illustrated in FIGS. 4c and 4d, the leader 13 can transmit that proposal number to the clients 11-15. Because proposal number 201 corresponds to a fast Paxos algorithm, the devices 11-15 can know to treat further requests from the clients, such as client 20, as proposals having the transmitted safe proposal number.

Figure 6B:
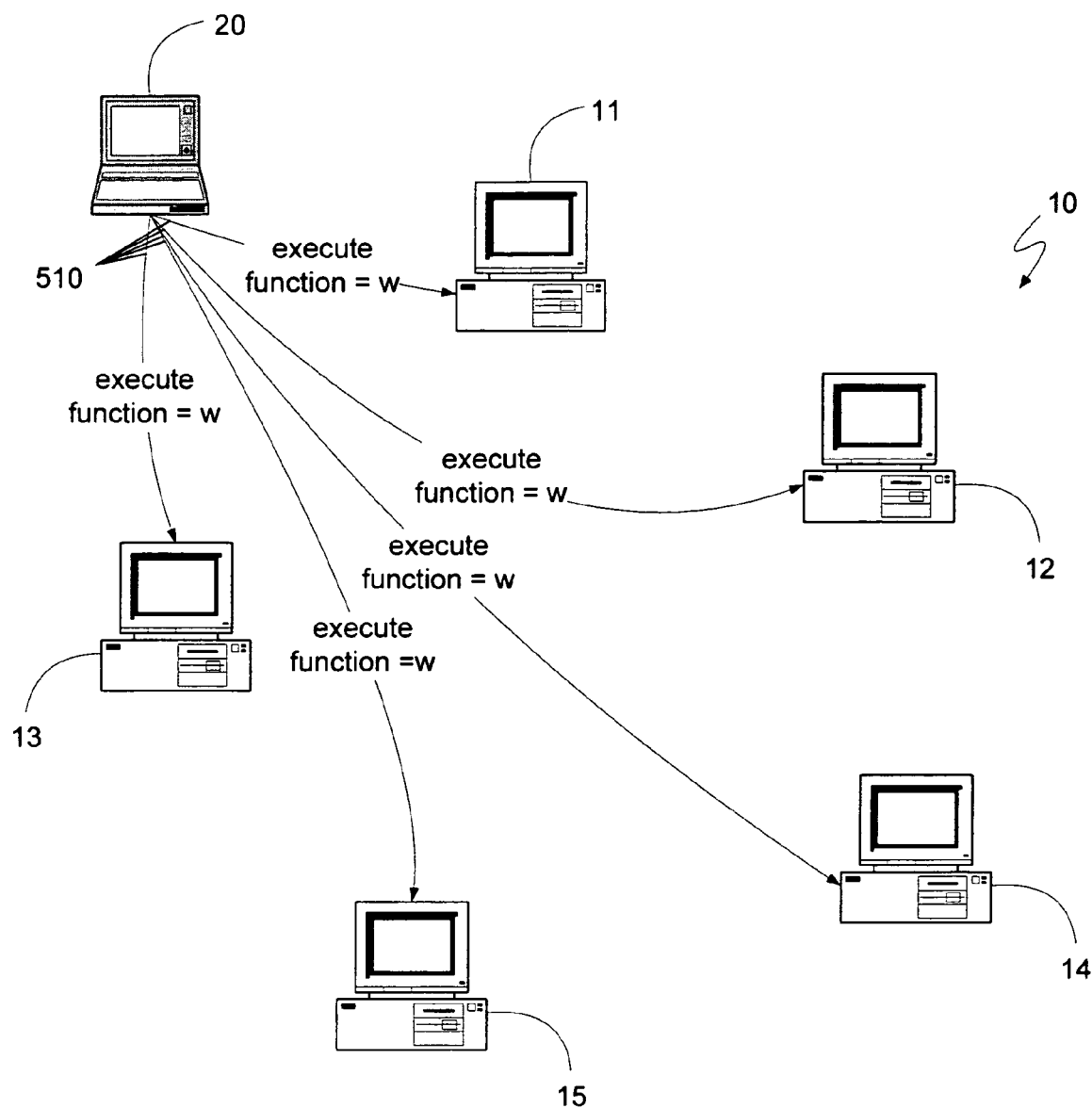
Figure 6B:

Turning to FIG. 6b, the operation of the fast Paxos algorithm is shown with reference to a request 511, from client 20 to the system 10. As can be seen, the client 20 sends request 510 directly to the devices 11-15, rather than sending it to a leader device, as was done with request 300. Each of the devices 11-15 can then treat the client's request as a proposal having a proposal number of 201 for a subsequent system step, which in the example illustrated in FIG. 6 would be step 27. Thus, each of the devices can determine whether to vote for the proposal based on any previous votes for step 27. Because, in the present example, none of the devices have voted for any other proposals, they can individually determine that the client's request of the execution of a function, represented by the variable "w" in FIG. 6b, is acceptable.

Figure 6C:
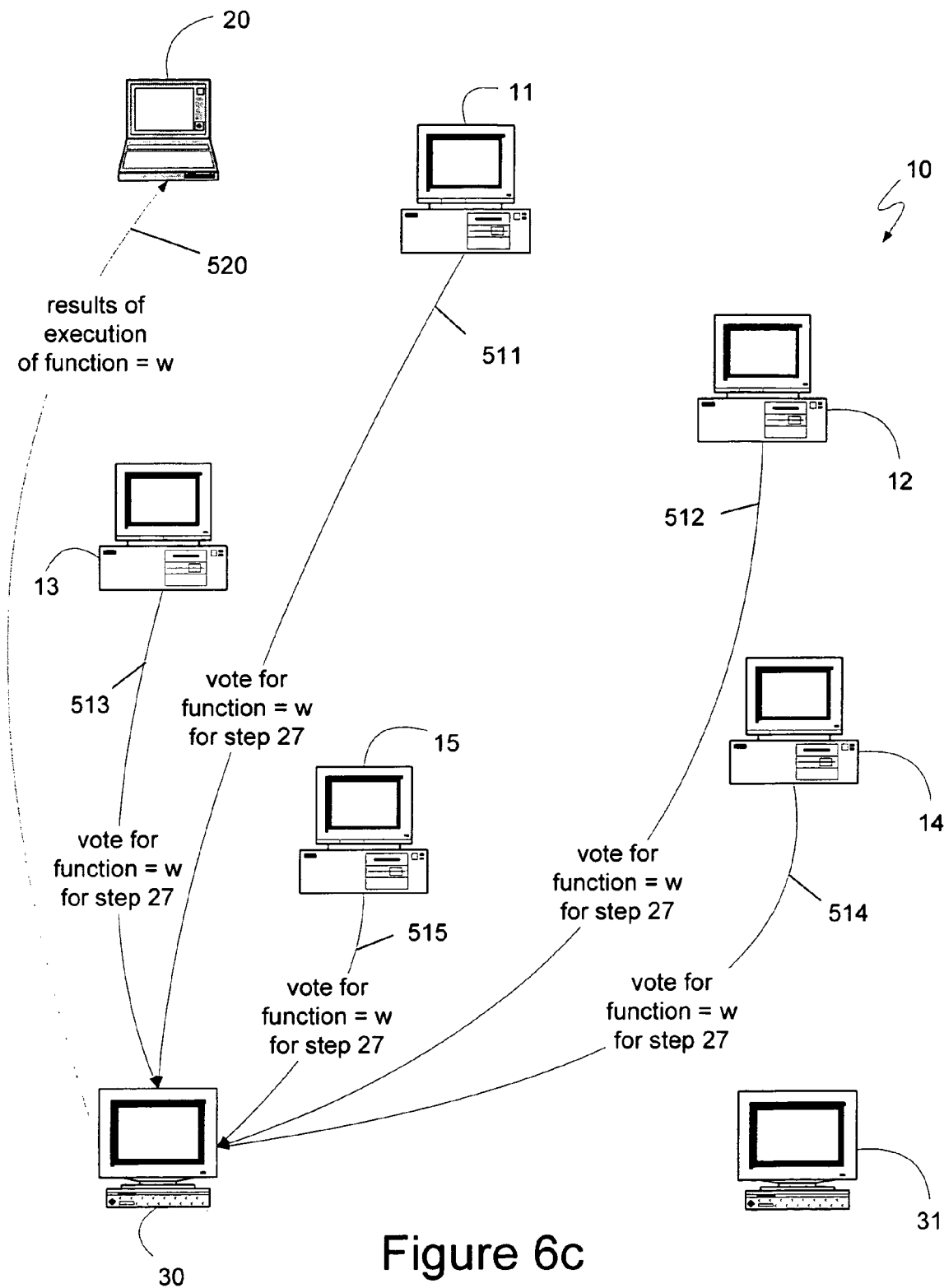

In one embodiment of the fast Paxos algorithm, illustrated in FIG. 6c, the devices 11-15 simply vote for the requested function. Thus, as shown, they would vote for the function represented by the variable "w" for system step 27. A further device, such as device 30, can act as a learner device and can learn of the decision made by the distributed computing system 10. As indicated above, if a quorum of devices of the system 10 votes for a particular function, then that function has been selected by the system. In the example illustrated in FIG. 6c, each of the devices votes for function "w". However, any one of the devices 11-15 could have failed or otherwise not voted for function "w", and it still would have been selected by the system 10 since any four devices comprise a quorum. As stated above, a quorum of devices for a fast Paxos algorithm can be any collection of devices that shares a majority of its devices with any other quorum. Expressed in terms of the number of failures that can be tolerated, a quorum can be any collection of devices larger than twice the number of failures that the system can tolerate. Consequently, as stated above, the size of a distributed computing system that seeks to implement the fast Paxos algorithm can therefore be larger than three times the number of failures that the system can tolerate.

Because, as illustrated in FIG. 6c, each of the devices 11-15 voted for the function "w" for system step 27, a learner device 30 can determine that the function "w" was selected by the distributed computing system 10, and can proceed to execute the function and return the results of that execution to the client 20 via message 520. Thus, the devices 11-15 can, when they vote for a particular function, transmit that vote to one or more learner devices, such as learner device 30. Alternatively, the devices 11-15 can merely store their votes and learner devices, such as device 30, can poll the devices 11-15 to determine if a new function has been selected for a further system step.

Figure 6D:
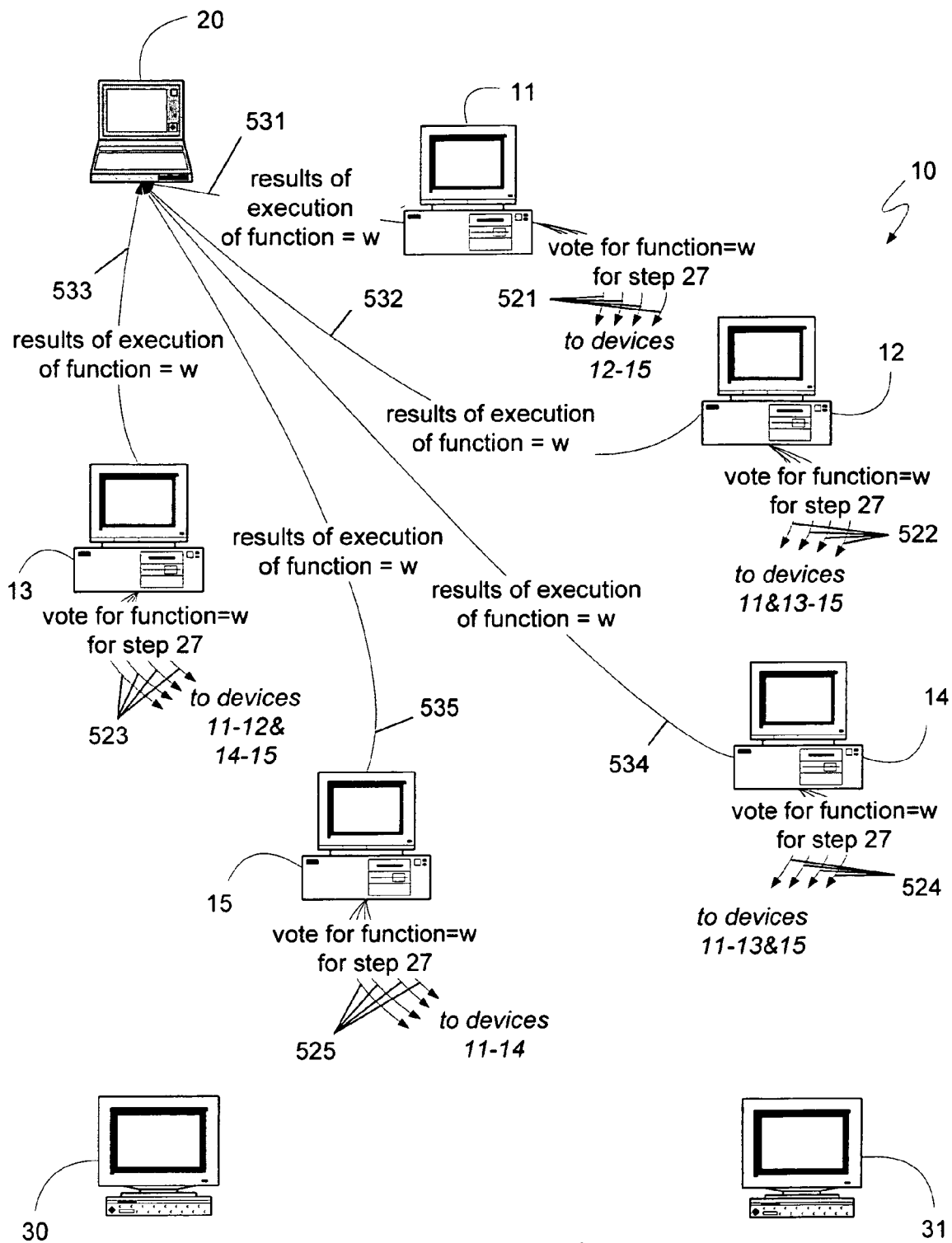

An alternative embodiment of the fast Paxos algorithm, as shown in FIG. 6d, contemplates that devices 11-15 can send their votes to each other, such as via messages 521-523. Once a device receives votes from a quorum of devices, including itself, for a particular function, it can determine that the function was selected and can execute the function and provide the results to the client 20. Since each device will be receiving the other devices' votes, each device can independently determine which functions were selected, and can independently transmit the results to the client 20. Consequently, the client 20 can receive multiple messages, such as messages 531-535, providing it the results of the requested function. In such a manner, some or all of the devices 11-15 can maintain a copy of the state of system 10, in effect each acting as learner devices.

As can be seen, the fast Paxos algorithm allows devices to propose functions to be executed by a distributed computing system, and receive responses, with fewer intervening message delays. For example, as shown in FIGS. 6b through 6d, only one set of messages was sent between the transmission of the client's request and the transmission of the results of the client's request. However, the fast Paxos algorithm may operate properly only so long as a quorum of devices remains operational. Thus, if two or more devices in the exemplary system 10 were to fail, no proposal could be selected since a quorum of operational devices does not exist. In such a case, the system 10 may resort to using the standard Paxos algorithm, which can define a quorum as a smaller set of devices, as described in detail above, and can, thereby, continue to act on client proposals.

Figure 7A:
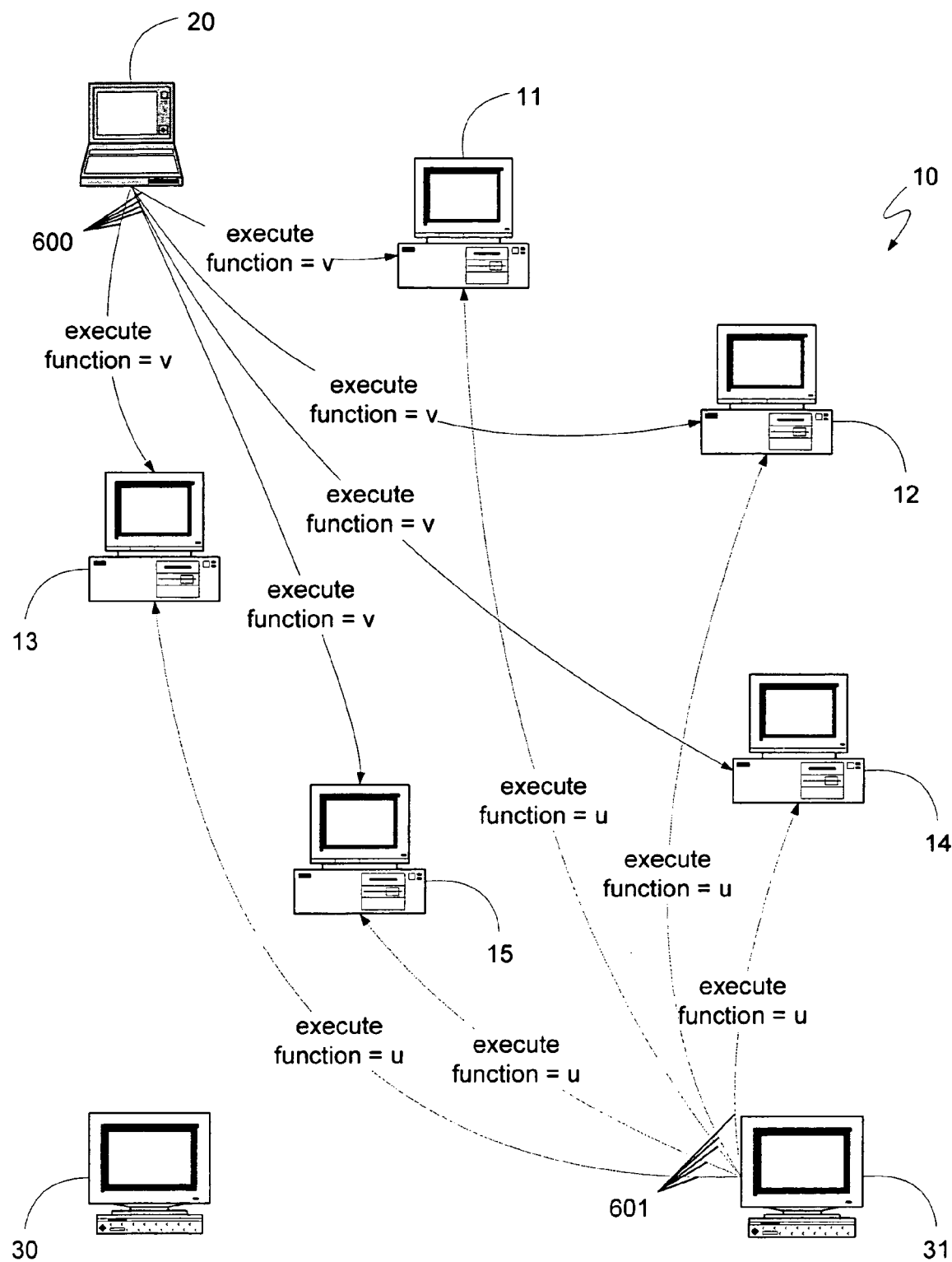
FIGS. 7*a-d* generally illustrate another aspect of the operation of a reduced message delay multi-phase consensus algorithm contemplated by an embodiment of the present invention.

The fast Paxos algorithm may also not operate properly if more than one client of the system 10 requests a function at approximately the same time. Turning to FIG. 7a, the client 20 is shown requesting that the system 10 execute a function, represented by the variable "v", by sending request message 600. However, at approximately the same time, device 31 also attempts to act as a client of the system 10 by sending request message 601, requesting that the system execute a function represented in the figure by the variable "u". Each of the messages 600 and 601 can arrive at the devices 11-15 at approximately the same time, with some devices receiving message 600 first, and other devices receiving message 601 first. Those devices that receive message 600 first may vote for or provisionally execute function "v", in the manner described above, while those devices that receive message 601 first may attempt to vote for or provisionally execute function "u" first.

Figure 7B:
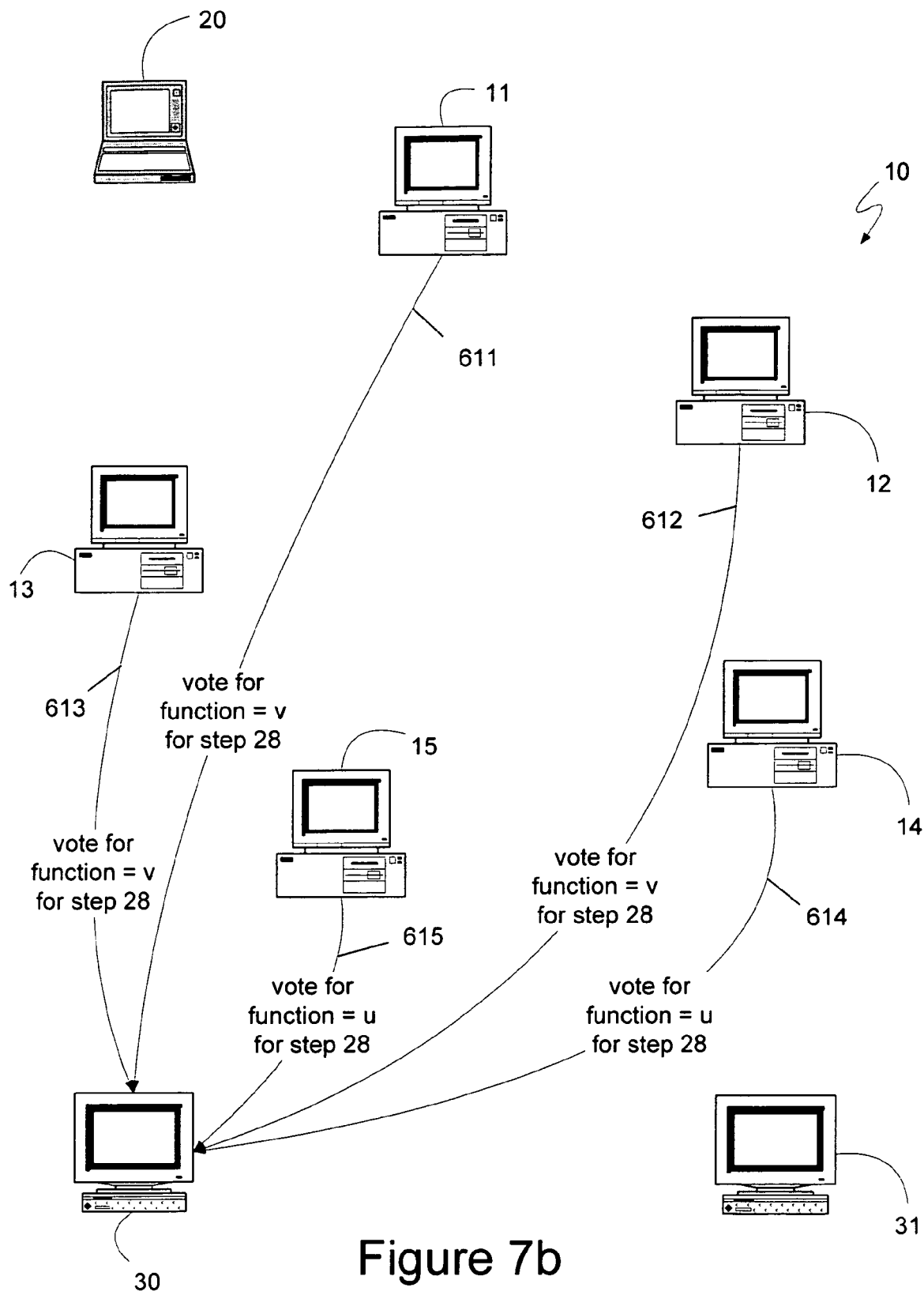

Turning to FIG. 7b, one possible outcome of the conflicting messages 600 and 601 is shown, with devices 11-13 voting for function "v" and devices 14-15 voting for function "u". A learner device, such as device 30 can collect the vote information from the devices 11-15 of the distributed computing system 10. In the example illustrated in FIG. 7b, the learner device 30 can receive messages 611-613 from devices 11-13, respectively, indicating a vote for function "v". Similarly, the learner device 30 can receive messages 614-615 from devices 14-15, respectively, indicating a vote for function "u". As above, for the exemplary system 10 illustrated in the figures, a quorum of devices for the fast Paxos algorithm can be four devices. Consequently, neither function "v" nor function "u" have been voted for by a quorum of devices, and the learner device 30 cannot execute either function.

The fast Paxos algorithm can handle conflicts, such as the one illustrated in FIGS. 7a and 7b, by resorting to the standard Paxos algorithm, and learning which of the two functions may have been selected, and then attempting to achieve a consensus on that function. Thus, following the situation illustrated in FIG. 7b, a leader device could proceed with the first phase of the standard Paxos algorithm, in a manner analogous to that described above with reference to FIGS. 4a-4d. After the completion of the first phase, the leader could initiate the second phase of the standard Paxos algorithm, in a manner analogous to that described above with reference to FIGS. 4e-4g, to achieve a consensus on the proposals learned of during the first phase. Because neither function "u" nor function "v" was selected, the leader can, based on some predefined selection criteria, pick one and have it selected by the system. The leader can then propose the other function and have it selected for a subsequent system step, or the leader can just rely on the client whose function was not selected to request it again, having received no response to the first request. Once a point is reached at which the leader knows of no device in the system 10 that has voted for any proposals for system steps greater than the current system step, it can send a message beginning another round of the fast Paxos algorithm, in a manner analogous to that described above with reference to FIG. 5d. Alternatively, the devices 11-15 could have continued to use the fast Paxos algorithm to select functions for system steps above step 28 while simultaneously participating in the standard Paxos algorithm, as described above, to resolve the conflict and determine whether to select function "u" or function "v" for system step 28. In such a case, the leader, after resolving the conflict using the standard Paxos algorithm, need not send an explicit message to restart the fast Paxos algorithm, as the devices would have already been using the fast Paxos algorithm to select functions for system steps above step 28.

Figure 7C:
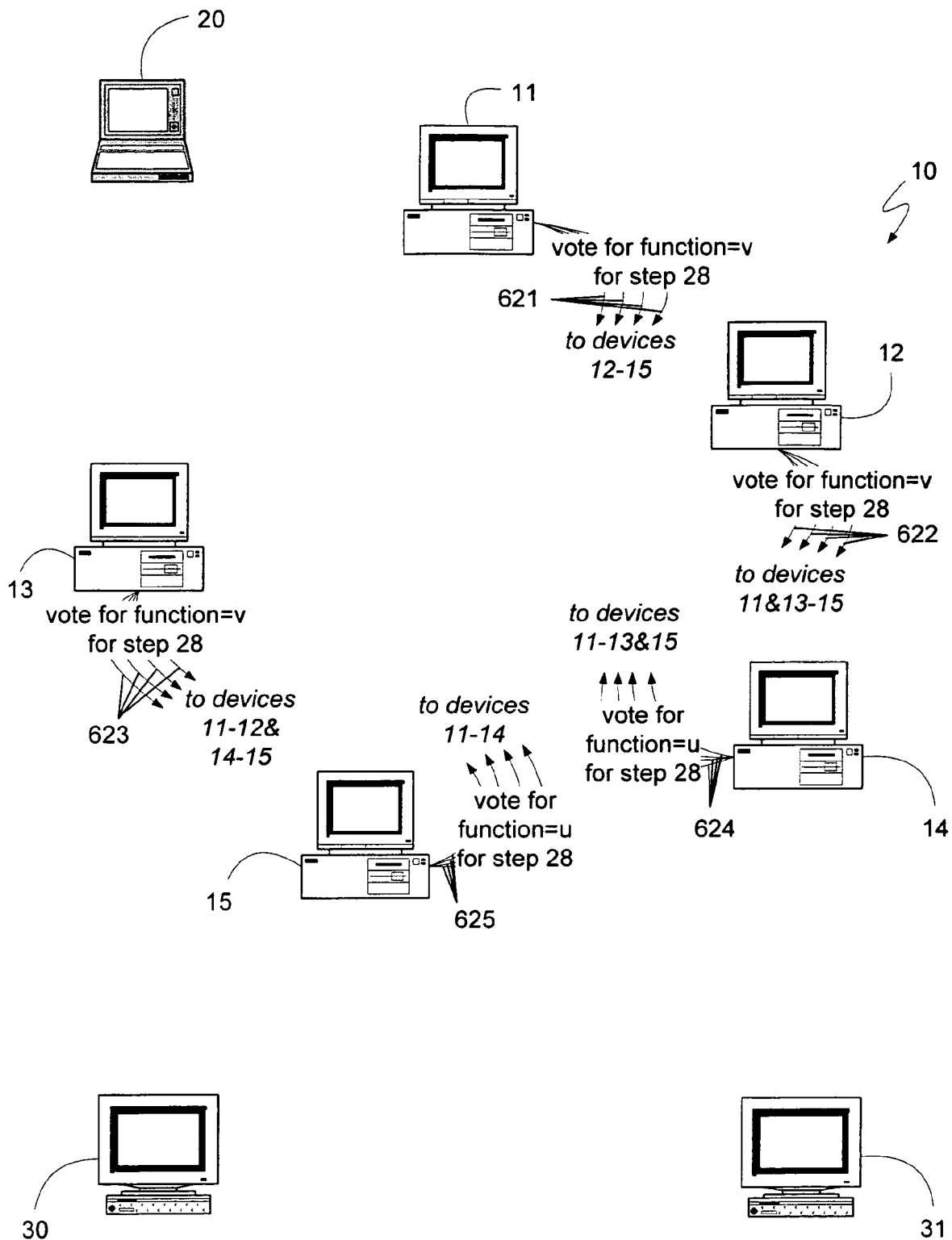
Figure 7D:
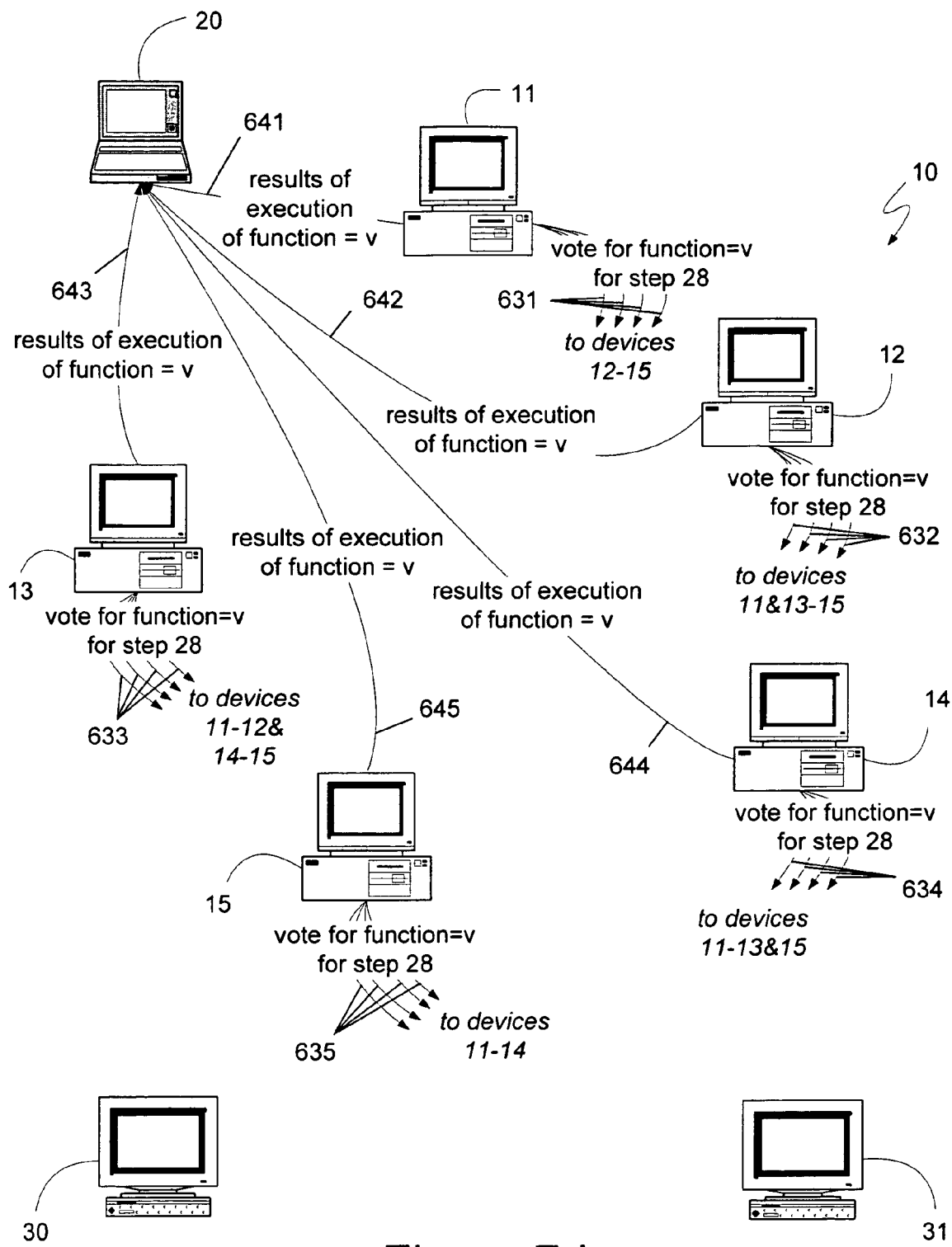

An alternative implementation of the fast Paxos algorithm is illustrated in FIGS. 7c and 7d. As shown in FIG. 7c, devices 11-13 can send messages 621-623 to the other devices informing them of the vote for function "v". Similarly, devices 14-15 can send messages 624-625 to the other devices informing them of the vote for function "u". However, because a quorum for the fast Paxos algorithm can be four or more devices, as described above, neither proposed function was selected by the system 10.

Instead of restarting the first phase of the Paxos algorithm, the alternative implementation of the fast Paxos algorithm can enable each of the devices to detect a conflict and attempt to correct it without involving a leader device. Specifically, each of the devices 11-15 can, based on messages 621-625, learn than a quorum of devices has not voted for either function "u" or function "v". Each of the devices can then select the next highest proposal number which must correspond to the fast Paxos algorithm, and can, based on the information received in messages 621-625, learn of the other devices' prior votes in the same way that a leader would if the standard Paxos algorithm had been restarted. As indicated above, if a leader device had learned of the conflict between function "u" and function "v", the leader could have selected either, based on some predefined criteria, and could have proposed that function to the devices. Each of the devices 11-15 can independently apply the same criteria as the leader, and can thereby determine which function the leader would propose. Once determined, each of the devices could vote for that function, using the new proposal number, in the same way they would have if the leader had proposed the function. Thus, as shown in FIG. 7d, each of the devices might independently determine that, using the new proposal number, they should vote for the function "v". Consequently, the devices 11-15 can send messages 631-635, respectively, to the other devices, indicating the vote for function "v". Each of the devices 11-15 can independently determine that a quorum of devices voted for function "v", and can, therefore, execute the function and provide the results to the client 20, via messages 641-645, respectively. In such a manner, a conflict can be resolved without resorting to the standard Paxos algorithm. However, if each of the devices 11-15 does not independently select the same function, another conflict can result. Therefore, one optimization can resort to the standard Paxos algorithm if the same conflict occurs more than once. Additionally, to limit the possibility that the devices could select a different function than a leader, had there been one, use of the above described implementation can be limited to the situation in which none of the devices are experiencing a failure.

As can be seen, in the event of conflicts, the fast Paxos algorithm can, by either performing the first phase of the standard Paxos algorithm, or by attempting a subsequent vote using a higher numbered proposal number, introduce additional message delays. Because conflicts can arise frequently in an environment in which more than once device may seek to act as a client, a reduced message delay consensus algorithm such as fast Paxos may not provide the expected efficiencies unless it can continue operating without conflict even if two or more proposals are transmitted by the clients at approximately the same time.

Additional information regarding the fast Paxos algorithm can be found in co-pending U.S. application Ser. No. 10/184, 767, filed on Jun. 28, 2002, and entitled "Fast Transaction Commit", and in a application filed on the same date as the present application, entitled "Fast Paxos Recovery", and having the contents of both of which are hereby incorporated by reference in their entirety to further explain or describe any teaching or suggestion contained within the present specification that is consistent with their disclosures.

Generalized Fault-Tolerant Consensus Algorithm

As illustrated above, the fast Paxos algorithm can introduce additional message delays if a quorum does not select a unique function for each system step. While such a situation can occur due to device failures, in which case the Paxos algorithm can be used, since it can achieve consensus with fewer operational devices, as described in detail above, more often the situation in which no unique function is selected by a quorum arises because two or more proposals were submitted to the distributed computing system 10 at approximately the same time, and the devices 11-15 did not each receive the proposals in the same order. Thus, the phrase "at approximately the same time" is intended to describe two or more requests being transmitted sufficiently close together in time such that, through expected network propagation delays, the two or more requests cannot be expected to arrive in the same order at each of the devices implementing a distributed computing system. For example, modern network hardware enables messages to be transmitted among devices within a few milliseconds if the devices are located geographically close to one another. For such a configuration of devices, two or more requests can be considered to be transmitted "at approximately the same time" if they are transmitted within approximately 50 milliseconds of one another. Alternatively, if the devices are located throughout the world, expected network propagation delays can cause messages to take as many as a few tenths of a second to be transmitted among the devices. In such a case, two or more requests can be considered to be transmitted "at approximately the same time" if they are transmitted within approximately half a second of one another.

While the above examples are provided as illustrations only, and are not intended to limit the scope of the description to only those ranges of time, they do indicate that two or more potentially interfering requests are often transmitted within a small time window. Empirical evidence suggests that very often requests from two independent sources that are made within such a small time window commute with one another. As used herein, the term "commute" refers to pairs of requests where the response to one request does not change, regardless of whether the other request has already been responded to or not. Similarly, a set of requests can "commute" if every pair of requests in the set commutes. As an example of a pair of requests that do not commute, in a database system, a request to read a record does not commute with a request to edit that record because the value that is read can be different depending on whether the request to read the record was granted before or after the request to edit the record. However, as an example of a pair of requests that do commute, a request to edit one record commutes with a request to edit an unrelated record, since the result of editing one record does not change whether or not another, unrelated, record was edited before or after.

The state of each device in a distributed computing system can remain synchronized, and each device can provide the correct response to requests if, for any pair of requests that do not commute, the requests of that pair are responded to by each device in the same order. For any pair of requests that do commute, those requests do not need to be responded to by each device in the same order, since, by definition, their ordering does not change the result of the requests. Returning to the above example, to maintain consistency, each of the devices of a distributed computing system can either select to respond to the request to read a record before responding to the request to edit that record, or each of the devices can selected to respond to the request to edit the record prior to responding to the request to read that record. However, consistency would still be maintained if some devices selected to respond to the request to edit an unrelated record before responding to the edit request directed to the first record, while other devices responded to those requests in the opposite order.

While sequences of functions performed in response to various requests can be considered equivalent so long as the order of pairs of non-commuting functions is maintained, the sequences are not mathematically equal. Thus, while a sequence of functions editing two unrelated records in one order can be considered to be equivalent to a sequence of functions editing the two unrelated records in the opposite order, the two sequences are, in fact, opposites of one another. Consequently, the concept of a "command structure", or "c-struct", can be used. A command structure can be similar to a sequence of functions, with the exception that two or more command structures can be mathematically equal even if they comprise difference sequences of functions. Specifically, two or more command structures can be considered mathematically equal if each of the command structures has the same number of commands, for every function that commutes, each command structure has that function somewhere, and for every pair of functions that do not commute, each command structure has that pair of functions in the same order.

A base command structure can be a null element, and every command structure can be created by appending a command, or sequence of commands, to the null element. Therefore, the null element is a prefix of every command structure. As used herein, a "prefix" of a command structure is a smaller command structure from which the larger command structure can be derived by appending additional sequences of commands. Appending any equivalent sequence of commands to a command structure results in equivalent command structures. Thus, for example, appending to a command structure a sequence of commands comprising first editing record A and then editing an unrelated record B results in a command structure that is equal to the command structure resulting from appending, to the same initial command structure, a sequence of commands comprising first editing record B and then editing record A. Furthermore, two or more command structures can be "compatible" if, for each command structure, there exists one or more command sequences that can be appended to that command structure such that the resulting command structures are equivalent. Two or more compatible command structures, therefore, have a common upper bound.

A generalized consensus algorithm can, therefore, rather than agreeing on a particular function for every step, simply agree on ever increasing equivalent command structures. By virtue of agreeing on command structures, a generalized consensus algorithm can accommodate a variety of orderings of pairs of commands that commute, and need not create inefficiencies by forcing each device to select the same command for each system step. As will be illustrated below, a generalized consensus algorithm can, nevertheless, possess analogous properties to the Paxos and fast Paxos algorithms described in detail above. For example, as illustrated above, both the Paxos and fast Paxos algorithms provide that once a function is selected, no other function can be selected. Similarly, both the Paxos and fast Paxos algorithms provide a mechanism by which all of the clients can eventually select the same function for a particular step. A generalized consensus algorithm can similarly provide that once a command structure is selected, it is a prefix of future selected command structures and can also provide that the command structures selected by any two devices are compatible.

Figure 8A:
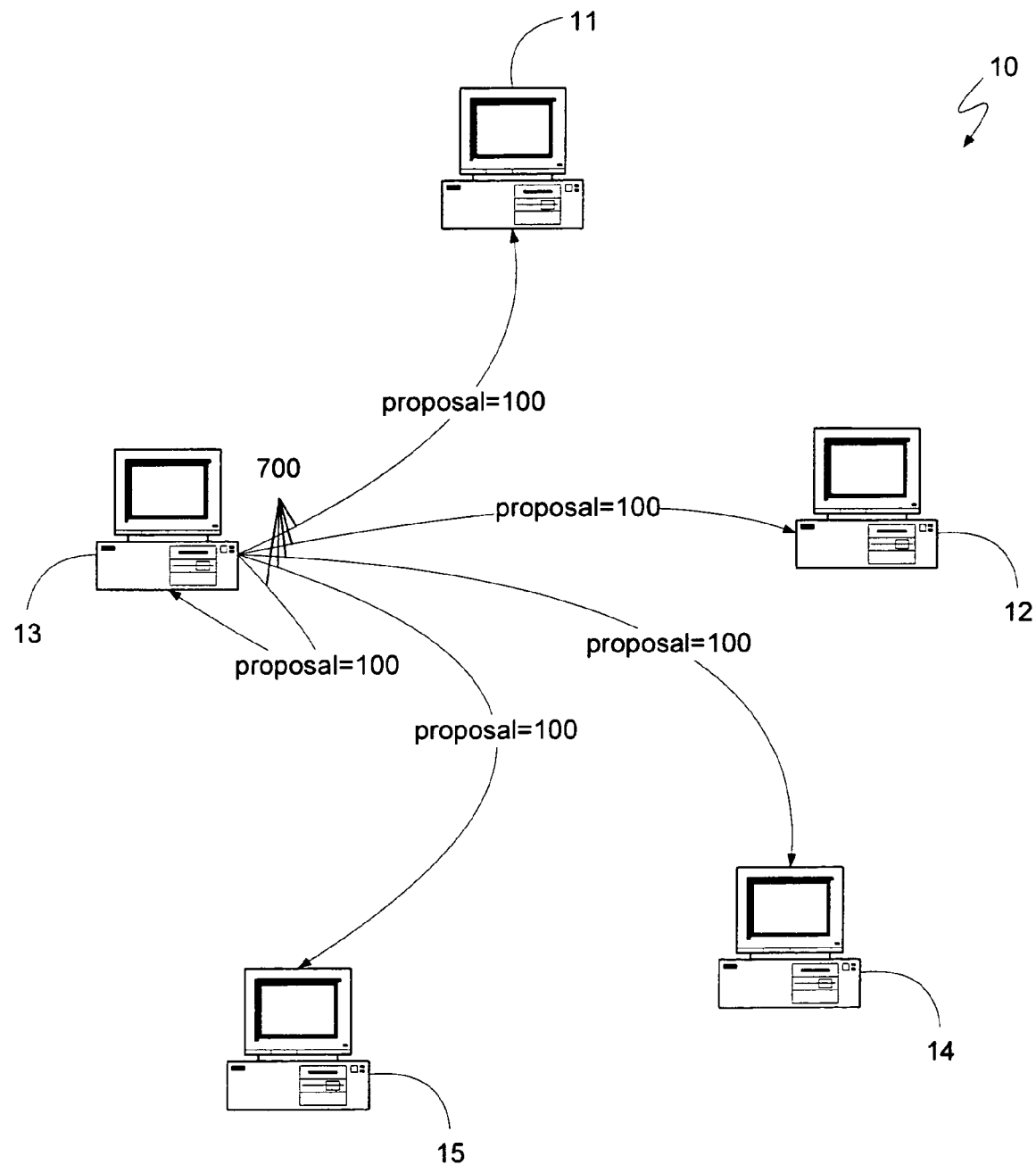
FIGS. 8*a-h* generally illustrate the operation of a generalized consensus algorithm contemplated by an embodiment of the present invention.

Turning to FIG. 8a, the operation of a generalized consensus algorithm contemplated by an embodiment of the present invention is illustrated with reference to the distributed computing system 10 comprising devices 11-15. As with the Paxos algorithm, described in detail above, any device can attempt to become a leader device and can send a message proposing a proposal number to the other devices. Thus, as illustrated in FIG. 8a, device 13 can attempt to become a leader by transmitting message 700 to devices 11-15, proposing a proposal number of 100.

Figure 8B:
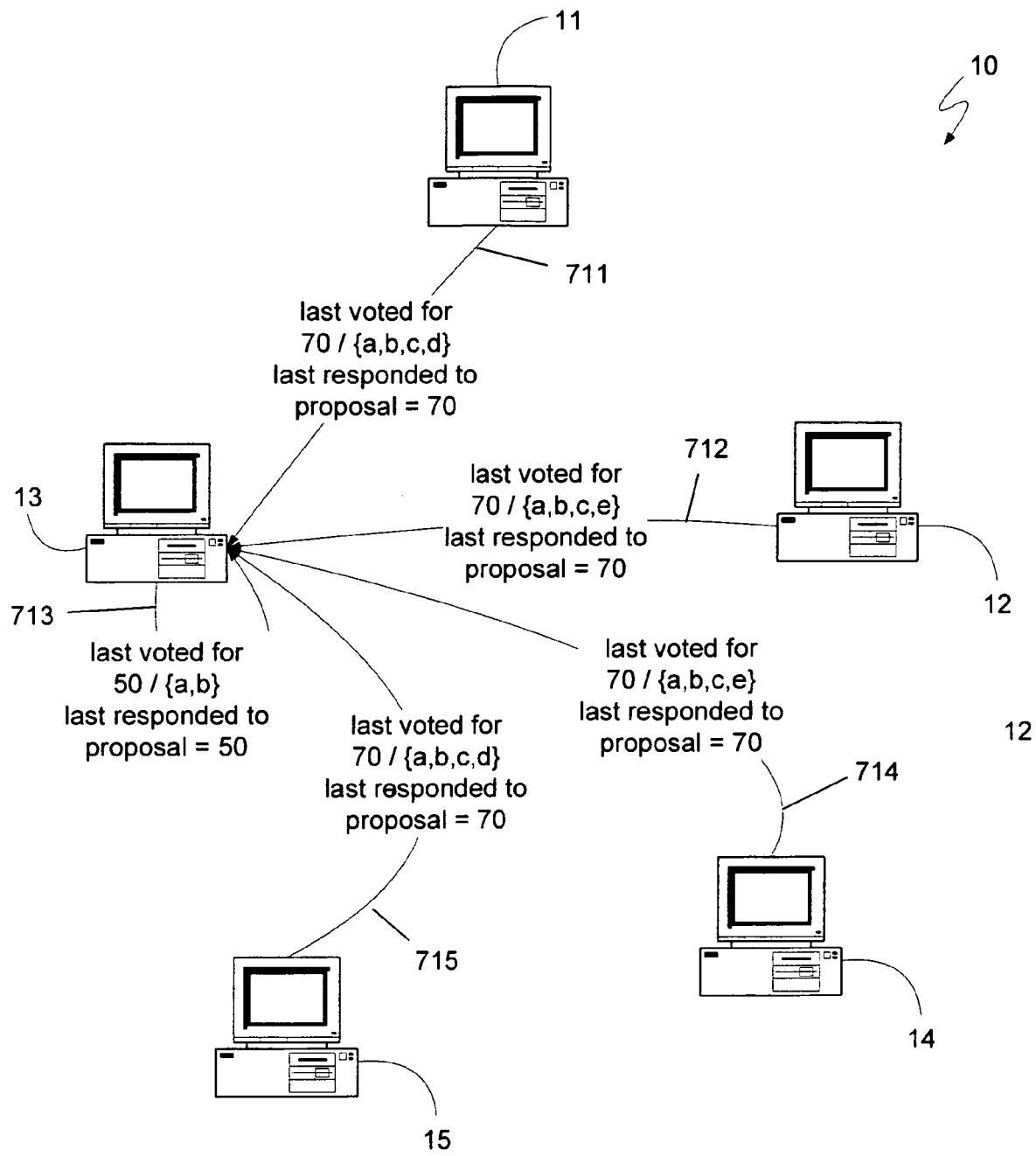

Turning to FIG. 8b, in a manner analogous to the Paxos algorithm described above, each of the devices 11-15 can respond with the highest numbered proposal for which the device voted for a command structure, and the corresponding command structure. In addition, each of the devices can also respond with the highest numbered proposal in which the device participated, even if the device did not cast a vote for a command structure that was proposed using that proposal number. In the illustrative example of FIG. 8b, command structures are represented as simple sequences of functions though, as explained above, command structures maintain mathematical properties different than a sequence of functions. Thus, devices 11 and 15 can respond with messages 711 and 715, respectively, indicating that they last participated in proposal 70 and that they voted for a command structure corresponding to proposal 70 that comprises the functions represented by the variables "a", "b", "c", and "d", in that order. Similarly, devices 12 and 14 can respond with messages 712 and 714, respectively, indicating that they too last participated in proposal 70 and that they voted for a command structure corresponding to proposal 70 that comprises the functions represented by the variables "a", "b", "c", and "e", in that order. Device 13 can also respond to itself, though, as above, message 713 would be communicated internally and would not necessary be an explicit network communication.

Once the leader device 13 has received messages 711-715, it can determine an appropriate command structure to propose to the devices 11-15. Thus, as with the Paxos algorithm, described in detail above, the leader device can ensure consistency by selecting an appropriate proposal based on the prior vote information transmitted to it by the other devices. A command structure can be considered to be chosen at a particular proposal number if that command structure is a prefix for every command structure voted for by a quorum of devices at that proposal number. Similarly, a command structure can be considered "chooseable", at a particular proposal number if that command structure is a prefix for every command structure voted for by the devices of a quorum that are now using a proposal number that is higher than that proposal number. In other words, a command structure is chooseable at a proposal number if it remains possible for that command structure to be chosen at that proposal number because the devices whose votes can no longer be changed voted for a command structure that has the chooseable command structure as its prefix, and the remaining devices are capable of voting for a command structure that will result in the chooseable command structure becoming chosen. Consequently, it can be safe for a leader device to propose a command structure at a proposal number if all chooseable command structures at lower proposal numbers are prefixes of the proposed command structure.

To determine a command structure that is safe for the leader to propose, the leader can first determine that a quorum of devices has responded to the leader's proposal of a proposal number. A quorum can be defined in an analogous manner to the definition provided above with respect to the Paxos algorithm. Once the leader has determined that a quorum has responded to it, it can identify the previous largest proposal number in which any device, from the responding set of devices, has previously participated. If every quorum that can be selected from among the responding devices has at least one device that participated in the identified previous largest proposal number, but did not vote for any command structure at that proposal number, then the leader can know that no command structure was chosen at that identified previous largest proposal number. Consequently, the leader can safely propose any of the command structures, corresponding to that identified previous largest proposal number, that were voted for by a device.

However, if, for every quorum that can be selected from among the responding devices, every device in that quorum that participated in the identified previous largest proposal number also voted for a command structure corresponding to that proposal number, then the leader can determine a safe command structure to propose through a multi-step operation. Initially, the leader can determine a base command structure that is the largest prefix shared by each of the command structures voted for by the devices in conjunction with the identified previous largest proposal number. The leader can then determine such a base command structure for each collection of devices, from among the devices that responded to the leader, that is sufficiently large to form a quorum. A safe command structure for the leader to propose can then be determined as the smallest command structure to which all of the determined base command structures converge. Two or more command structures can "converge" if sequences of functions can be added to each of the two or more command structures to ultimately yield equivalent command structures.

In the example illustrated in FIG. 8b, devices 11 and 15 have last voted for a command structure represented by the sequence of commands {a,b,c,d} which was proposed using a proposal number of 70, and devices 12 and 14 have last voted for a command structure represented by the sequence of commands {a,b,c,e} which was also proposed using a proposal number of 70. None of the devices 11-12 and 14-15 have participated in a proposal using a proposal number greater than 70. Device 13 last voted for a command structure represented by the sequence of commands {a,b} which was proposed using a proposal number of 50, and device 13 has not participated in any proposals using proposal numbers greater than 50. Consequently, the leader can determine that the previous largest proposal number to which any of the devices 11-15 has responded is proposal number 70.

Because, as described above in connection with the Paxos algorithm, a quorum of devices for the exemplary system 10 can be any collection of three or more devices, the leader can select any one of the collection of devices listed in Table 1, below, to act as a quorum. However, as part of the process by which the leader determines the command structure to propose, the leader can determine whether each of the possible quorums listed in Table 1 has at least one device that has participated in proposal 70, but has not cast any vote using proposal 70. As can be seen from FIG. 8b, no such quorum exists.

TABLE 1

| devices 11, 12 and 13 | devices 12, 13 and 14 | devices 11, 12, 14 and 15 |
| devices 11, 12 and 14 | devices 12, 13 and 15 | devices 11, 13, 14 and 15 |
| devices 11, 12 and 15 | devices 12, 14 and 15 | devices 12, 13, 14 and 15 |
| devices 11, 13 and 14 | devices 13, 14 and 15 | devices 11, 12, 13, 14 and 15 |
| devices 11, 13 and 15 | devices 11, 12, 13 and 14 | |
| devices 11, 14 and 15 | devices 11, 12, 13 and 15 | |

Consequently, the leader can then proceed to determine a base command structure, for each of the quorums listed in Table 1, that is the largest prefix shared by each of the command structures voted for by the devices in that quorum in conjunction with proposal number 70. For example, for the quorum comprising devices 11, 12 and 15, each of the devices of that quorum voted for a command structure in conjunction with proposal number 70. Specifically, devices 11 and 15 voted for the command structure represented by the sequence of commands {a,b,c,d}, while device 12 voted for the command structure represented by the sequence of commands {a,b,c,e}. As can be seen by comparing the two command sequences, they both share the following prefixes: {a}, {a,b} and {a,b,c}. Of these, the latter is the largest prefix shared by both command structures. and can, consequently, be the base command structure for the quorum comprising devices 11, 12 and 15. The leader can perform the same analysis with each of the other quorums listed in Table 1, and can identify a series of base command structures corresponding to the quorums of Table 1.

As will be recognized by those skilled in the art, for the example illustrated in FIG. 8b, the base command structures for each of the quorums listed in Table I is the command structure represented by the sequence of functions {a,b,c}. Consequently, each of these base command structures trivially converge to the command structure represented by the sequence of functions {a,b,c}, and that command structure can be a safe command structure for the leader device 13 to propose. In addition, any command structure that has this safe command structure as a prefix can also be a safe command structure for the leader to propose. However, if each of the quorums did not have identical base command structures, the leader device could determine if the base command structures converged to a larger command structure, and could then propose that larger command structure.

Figure 8C:
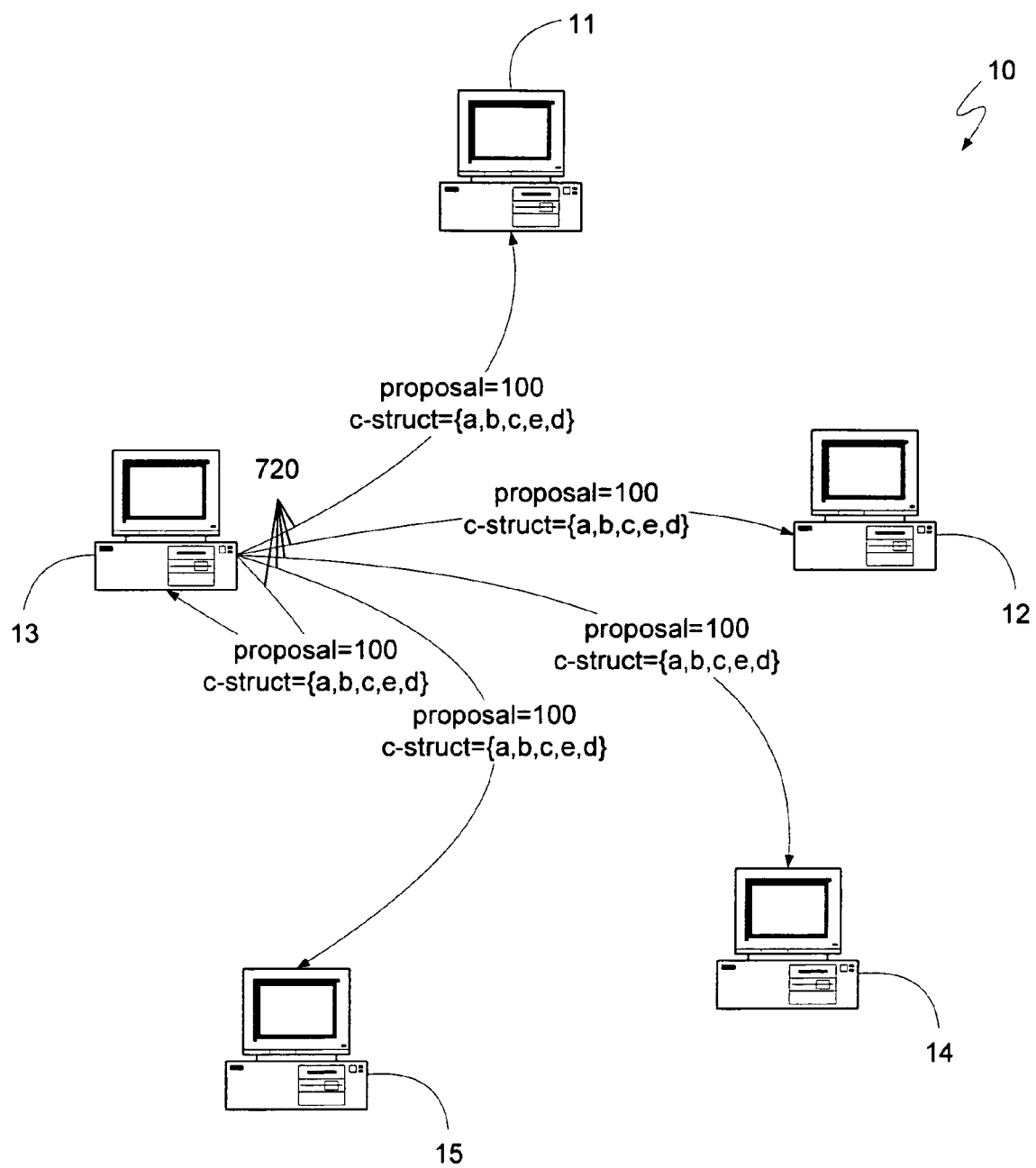

Turning to FIG. 8c, the leader device 13 is shown proposing a safe command structure represented by the sequence of functions {a,b,c,e,d} in message 720 to the devices 11-15. Once the devices 11-15 receive message 720, they can each independently determine whether to vote for the proposed command structure. As with the Paxos algorithm, described in detail above, a device can vote for a proposed function, or command structure, if it has not responded to a request proposing a larger proposal number. Additionally, a device can vote for a proposed command structure if it either has not already voted for any other command structure using the same proposal number, or if the previously voted for command structure, proposed using the same proposal number, is a prefix of the newly proposed command structure.

Figure 8D:
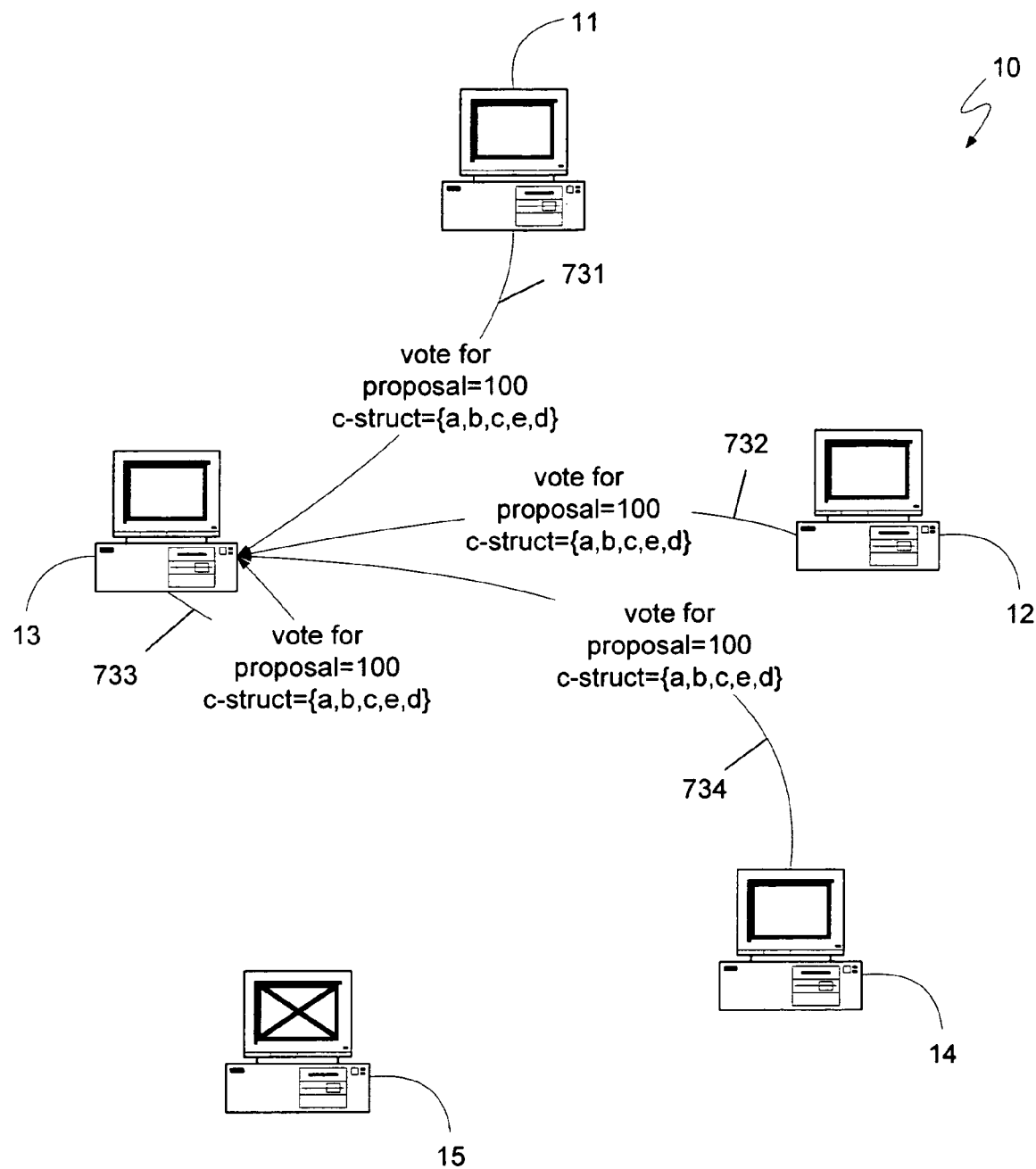
Figure 8E:
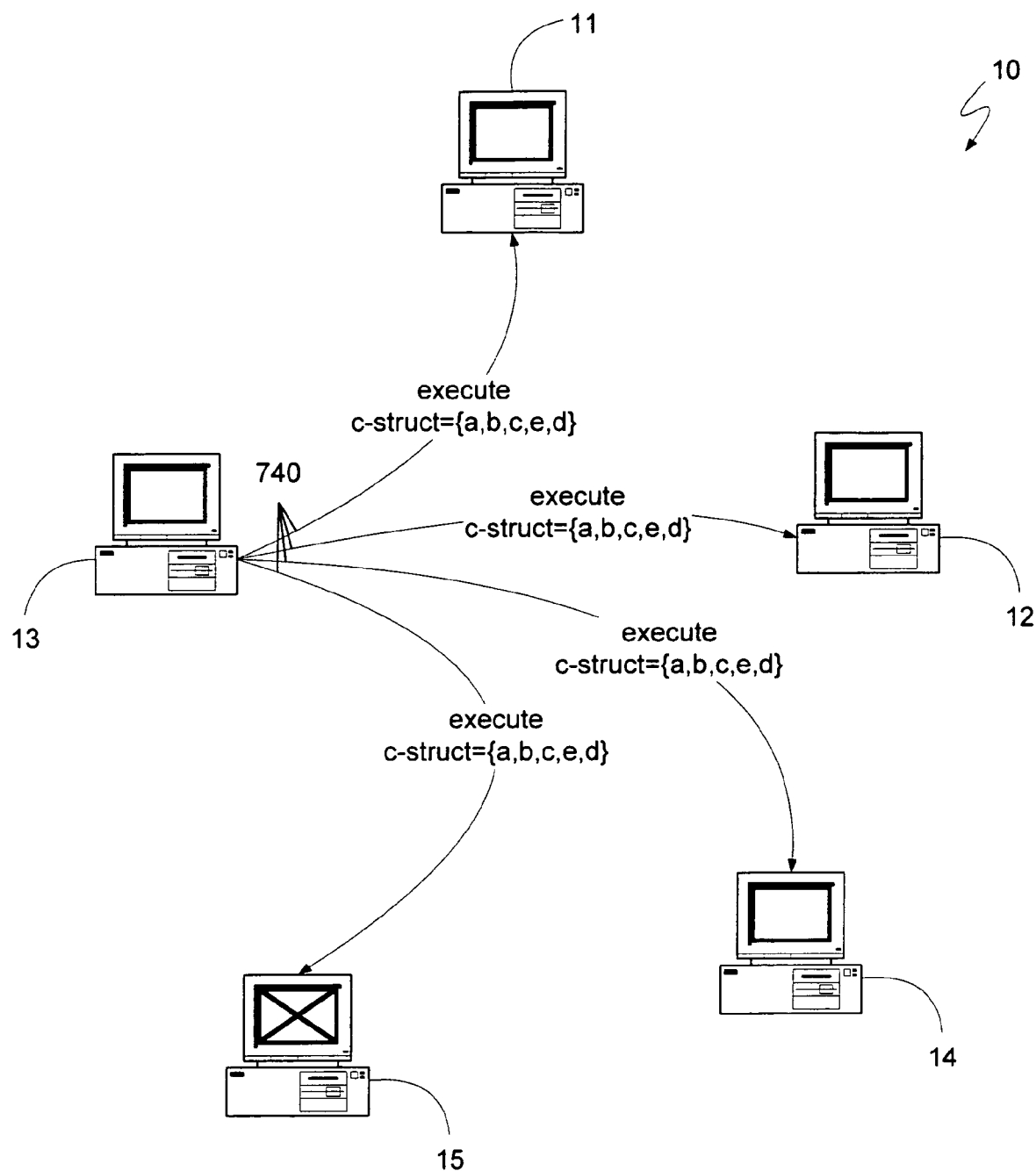

Turning to FIG. 8d, each of the devices 11-14 can independently determine that they can vote for the proposed command structure, and signal their votes to the leader 13 via messages 731-734. To illustrate the fault-tolerant nature of the generalized consensus algorithm, device 15 is illustrated as having experienced a fault, and does not, therefore, provide any response to the leader 13. As with the Paxos algorithm, described in detail above, the leader 13 can determine that a quorum of devices has selected the proposed command structure, and can signal that success to the devices 11-15 via a message, such as message 740, shown in FIG. 8e.

Figure 8F:
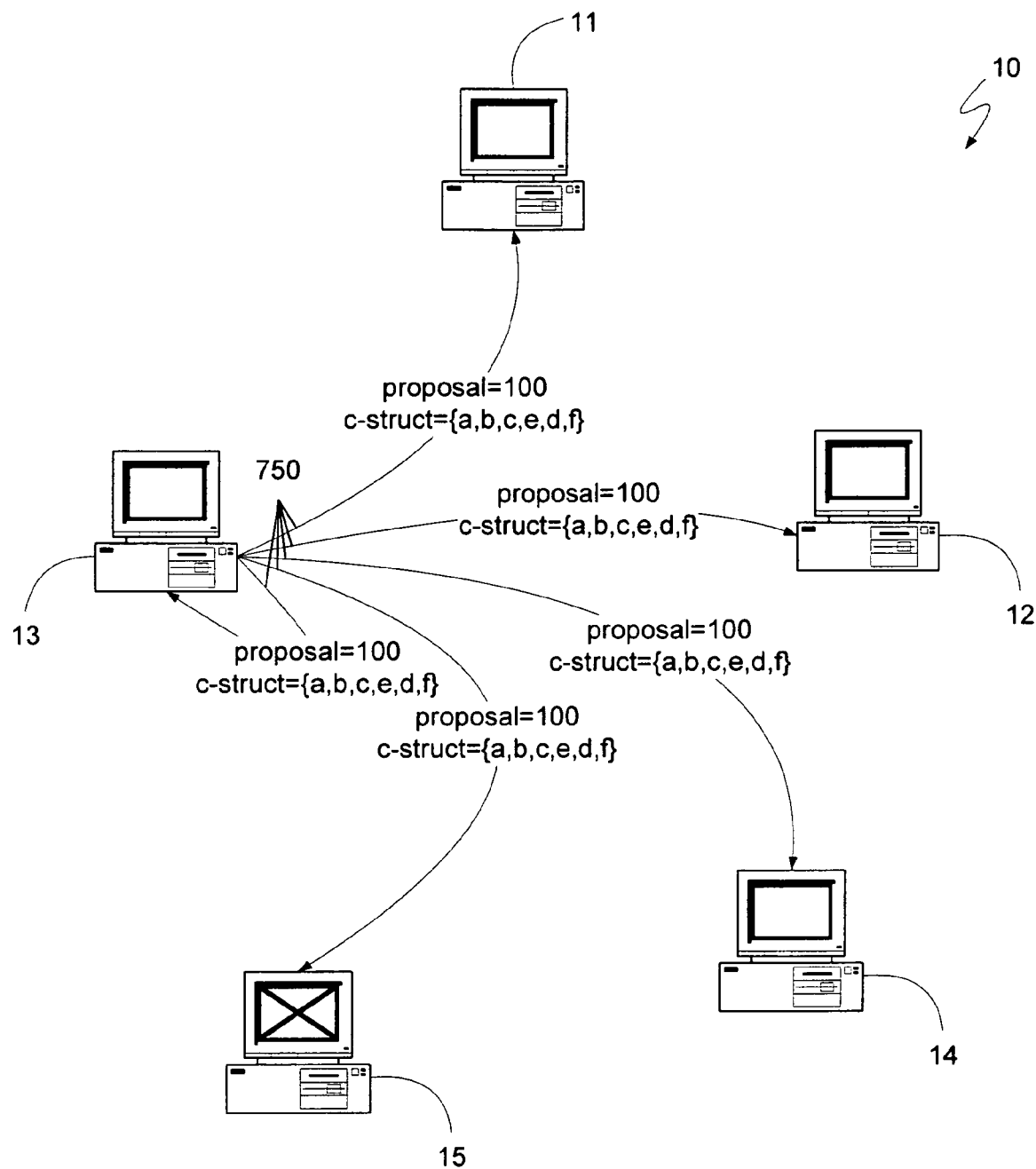

Because the above described generalized fault tolerant consensus algorithm does not select individual functions, but rather can select command structures, the leader 13 need not advance the system 10 to a subsequent system step before proposing a different function. Instead, the leader can simply propose a new command structure containing the previously selected command structure with the new function appended to it. Thus, turning to FIG. 8f, the leader 13 can have the system 10 select and execute a new function, represented by the variable "f", by proposing a command structure represented by the sequence {a,b,c,e,d,f}, which can be formed by appending the function "P" to the previously selected command structure represented by the sequence {a,b,c,e,d}.

Figure 8G:
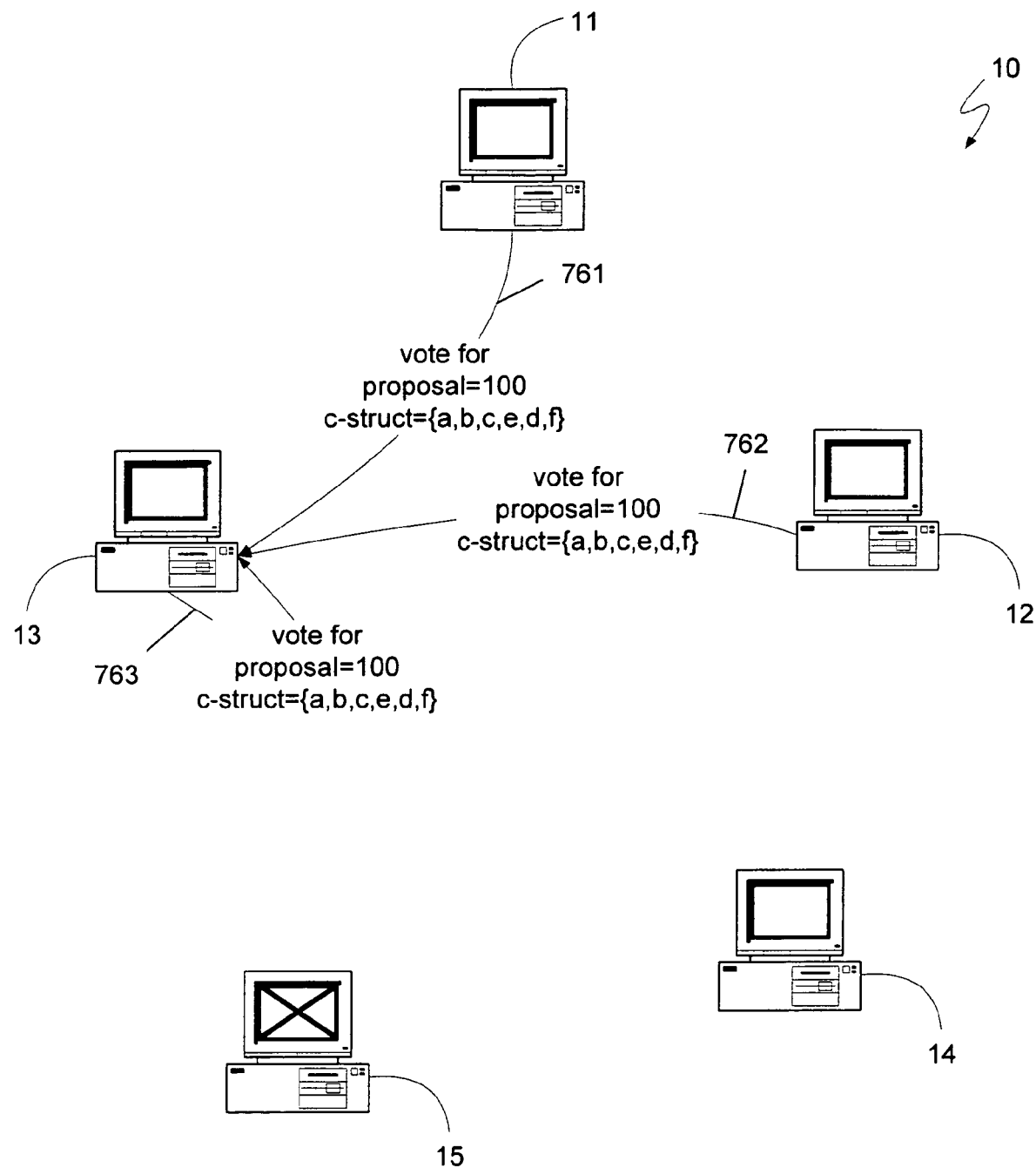
Figure 8H:
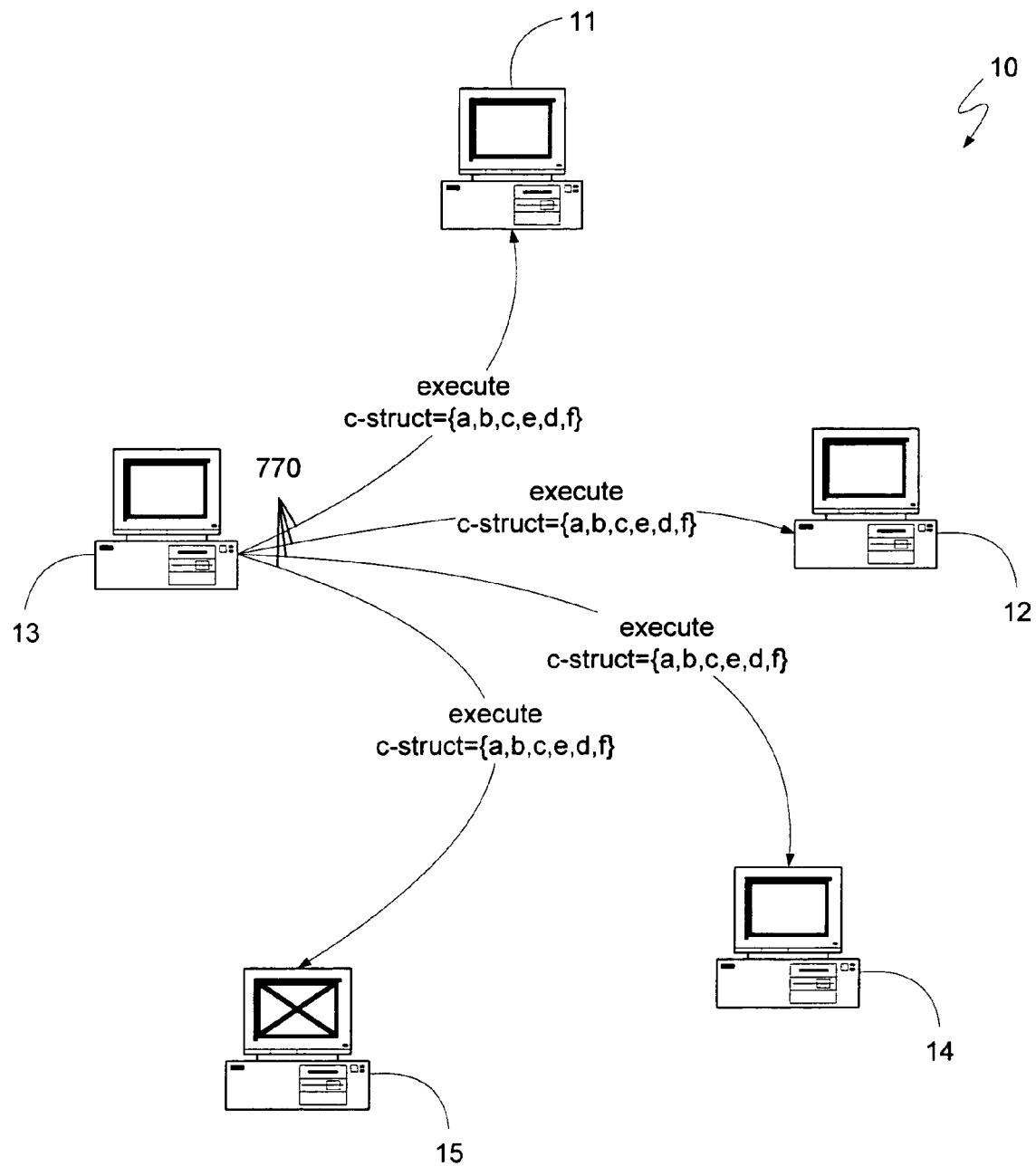

As previously described, each of the devices 11-15 can independently determine whether to vote for the proposed command structure. Because each of the devices 11-14 has previously voted for a command structure proposed using proposal number 70, they can each independently determine whether the newly proposed command structure has, as a prefix, the previously voted for command structure. Since the newly proposed command structure, represented by the sequence {a,b,c,e,d,f}, does have the previously voted for command structure, represented by the sequence {a,b,c,e,d} as a prefix, each of the devices 11-14 can vote for the proposal transmitted in message 750. Therefore, as illustrated in FIG. 8g, devices 11-13 can send messages 761-763, respectively, indicating their vote for the newly proposed command structure. Device 14 may have responded to a higher proposal number and could not, therefore, vote. Nevertheless, because, as indicated in Table 1, devices 11-13 comprise a quorum of the exemplary system 10, the leader 13 can determine that the proposed command structure represented by the sequence {a,b,c,e,d,f} has been selected, and it can inform the devices 11-15 via a message, such as message 770, shown in FIG. 8h.

Figure 9A:
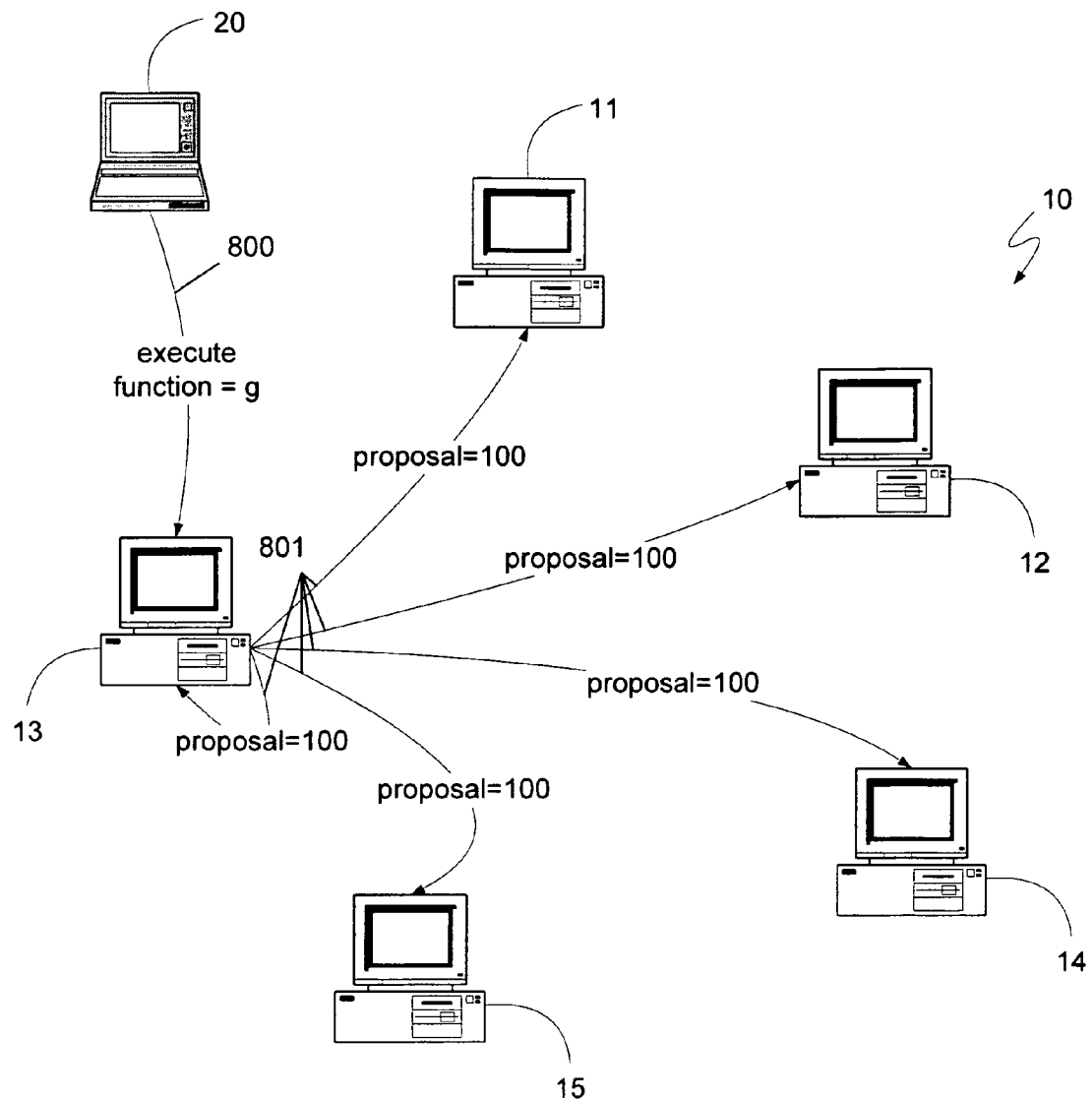
FIGS. 9*a-g* generally illustrate one aspect of the operation of a multi-phase generalized consensus algorithm contemplated by an embodiment of the present invention.
Figure 9A:
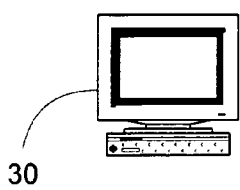
Figure 9A:
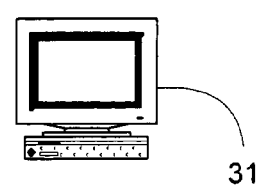

As can be seen, the above described generalized fault tolerant consensus algorithm enables a distributed computing system to agree upon a sequence of functions, as opposed to a single function. Consequently, the need to coordinate the algorithm around system steps is no longer present. Turning to FIG. 9a, the operation of the above described algorithm is shown in the context of an environment comprising, not just the distributed computing system 10, but also a client 20, and additional computing devices 30 and 31. Consequently, the operation illustrated in FIGS. 9a-g is meant to be independent of the operation illustrated in FIGS. 8a-g, and, as a result, does not assume that the command structures illustrated in FIGS. 8a-g have been previously selected. Therefore, as shown in FIG. 9a, the client 20 can send a request 800 to a device 13, requesting that a function represented by the variable "g" be executed. The device 13 can then attempt to become a leader device by transmitting message 801 suggesting a proposal number 100, in the manner described in detail above.

Figure 9B:
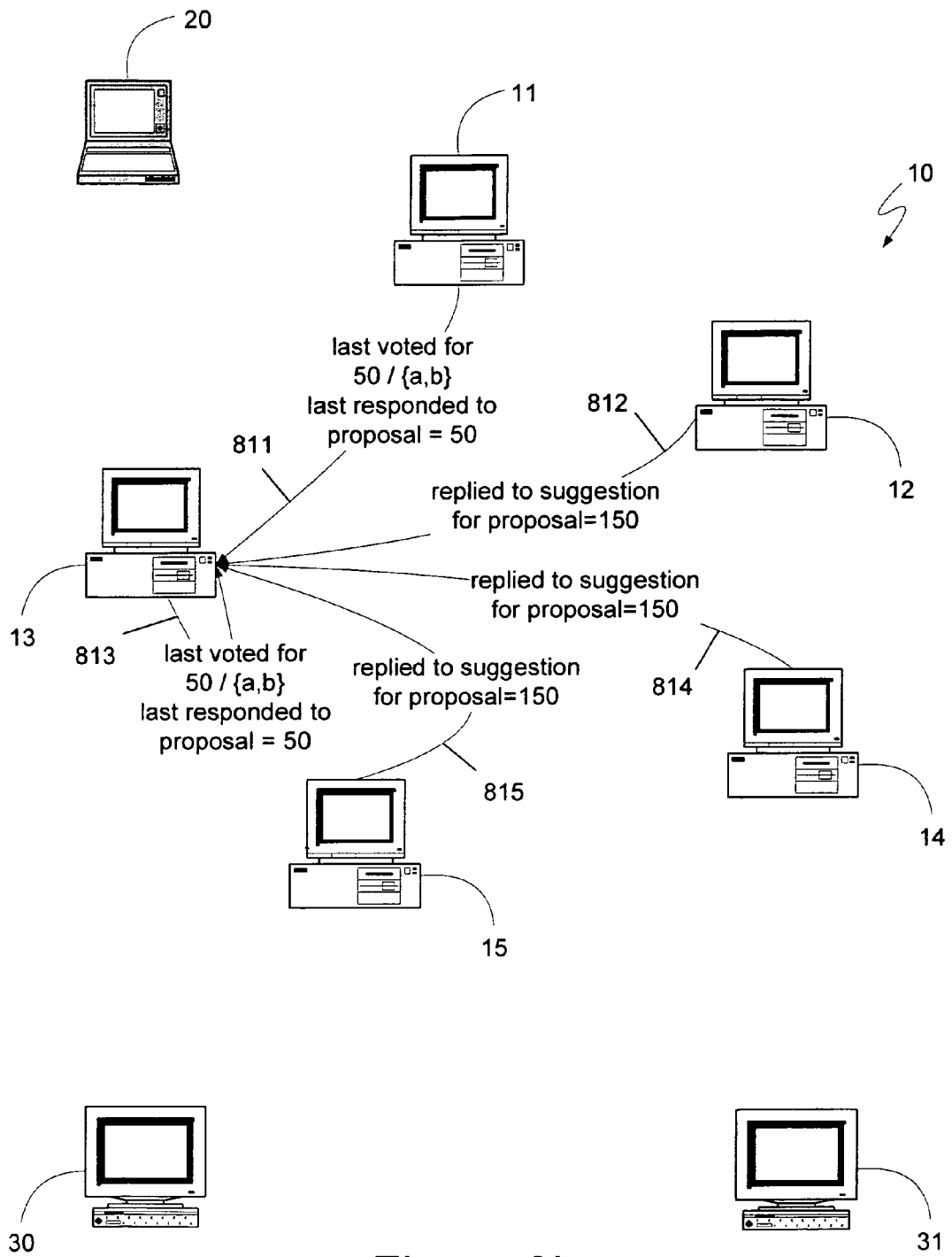

Turning to FIG. 9b, devices 11 and 13 can indicate, via messages 811 and 813, respectively, their prior vote information and the highest proposal number that each has responded to. Specifically, devices 11 and 13 can indicate that they previously voted for a command structure represented by the sequence of functions {a,b}, which was proposed using proposal number 50, and that proposal number 50 is the highest numbered proposal to which they have responded. On the other hand, devices 12 and 14-15 are illustrated as having previously responded to a suggestion having a higher proposal number than the proposal number used by the leader 13. Thus devices 12 and 14-15 can send messages 812 and 814-815, respectively, indicating that the devices have responded to a suggestion to use proposal number 150. Alternatively, as described in detail above in conjunction with the Paxos algorithm, devices 12 and 44-15 could have simply not responded to the leader 13, since the proposal number sent by the leader 13 is less than the highest proposal number to which the devices have already responded. In either event, the leader 13 can determine that a quorum of devices has not agreed to vote for the leader's proposal, and can attempt to send a larger proposal number.

Figure 9C:
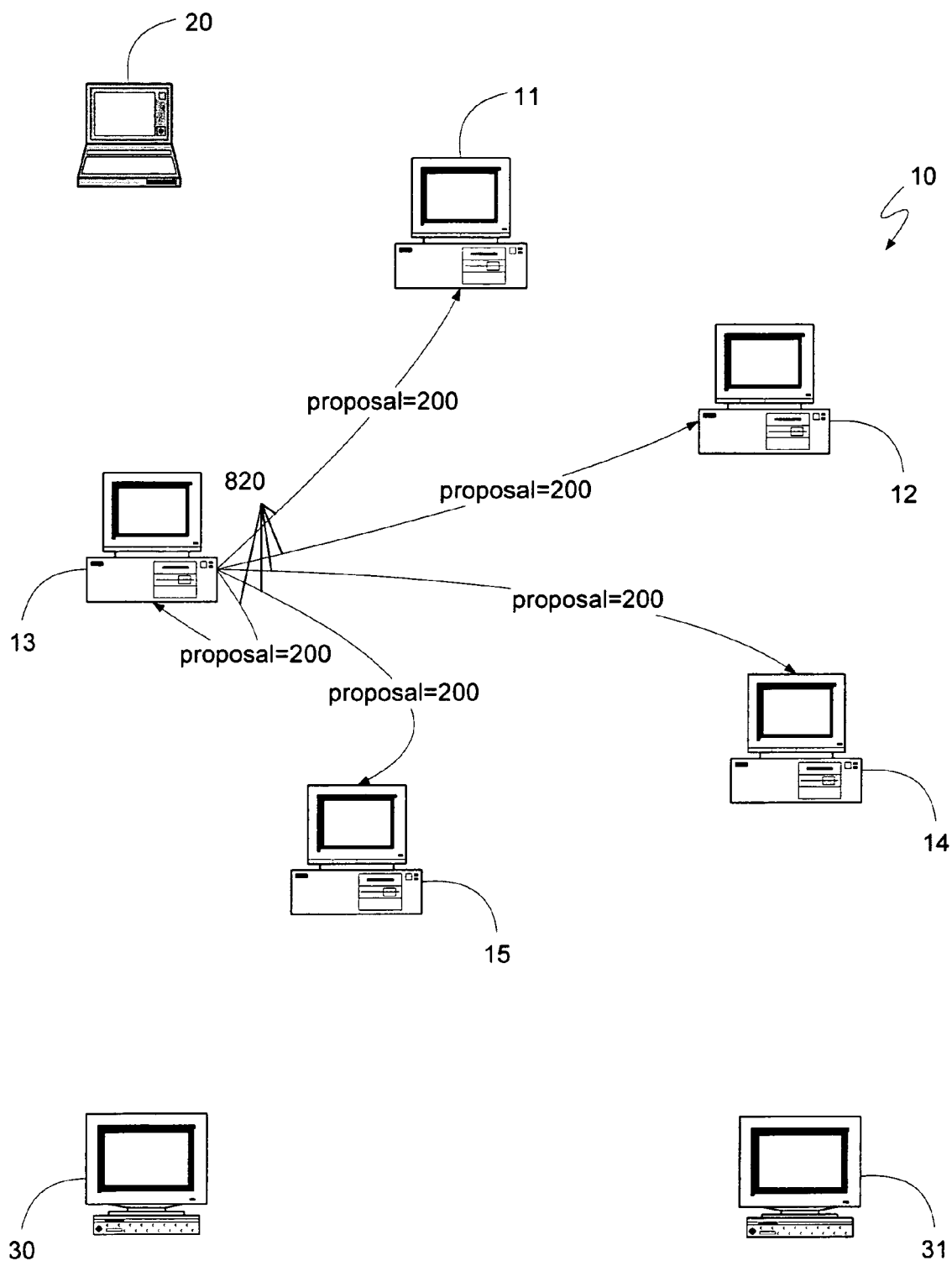
Figure 9D:
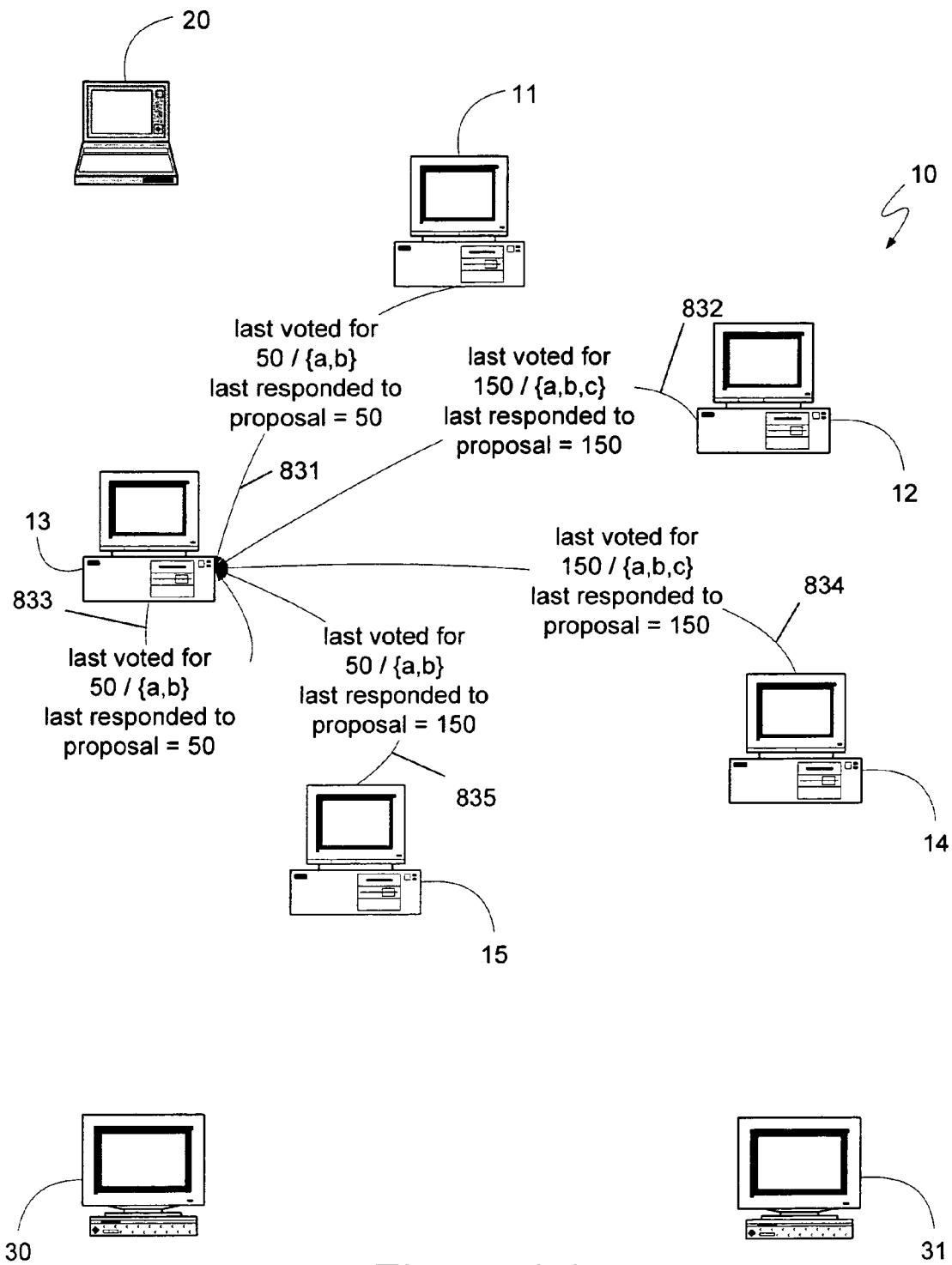

Turning to FIG. 9c, the leader 13 is shown transmitting message 820 suggesting a new proposal number of 200. Each of the devices 11-15 can then respond to this new proposal number in an analogous manner to that described above. For example, as illustrated in FIG. 9d, devices 11 and 13 can transmit, via messages 831 and 833, respectively, the same information they previously transmitted via messages 811 and 813 since neither device responded to any other message between the receipt of the leader's first message 801, and the subsequent proposal 820. Devices 12 and 14-15, on the other hand, can now provide the leader with their last vote information because the proposal number the leader suggested is sufficiently high. Thus, as shown in FIG. 9d, devices 12 and 14 can indicate, via messages 832 and 834, respectively, that they previously voted for a command structure represented by the series of functions {a,b,c} that was proposed using proposal number 150, and that proposal number 150 is the largest proposal number to which they have responded. Similarly, device 15 can indicate, via message 835, that it has previously voted for a command structure represented by the sequence of functions {a,b}, that was proposed using a proposal number of 50, and that it has responded to a proposal to use proposal number 150, but has not cast any votes corresponding to proposal 150.

Given the information provided via messages 831-835, the leader can determine a safe command structure to propose to the devices 11-15. As described in detail above, the leader can determine if each of the possible quorums that the leader can select has at least one device that has participated in proposal 150, but has not cast any vote using proposal 150. As can be seen, there exist several quorums, comprising either or both of the devices 12 and 14, in which every device that has participated in proposal 150, namely either or both of the devices 12 and 14, has also cast a vote using proposal 150. Consequently, the leader can then determine a base command structure, as also described in detail above, for every quorum that the leader could select from among the responding devices 11-15. A safe command structure for the leader to propose can be any command structure that has each of the determined base command structures as a prefix. As an example, the quorum comprising devices 11, 12 and 13 can have a base command structure represented by the function sequence {a,b}. Similarly, the quorum comprising devices 12, 14 and 15 can also have a base command structure represented by the function sequence {a,b}. As will be recognized by those skilled in the art, for the exemplary situation illustrated in FIG. 9d, all of the possible quorums will have a base command structure represented by the function sequence {a,b}. Therefore, any command structure that has, as a prefix, the command structure represented by the function sequence {a,b}, will be a safe command structure for the leader 13 to propose.

Figure 9E:
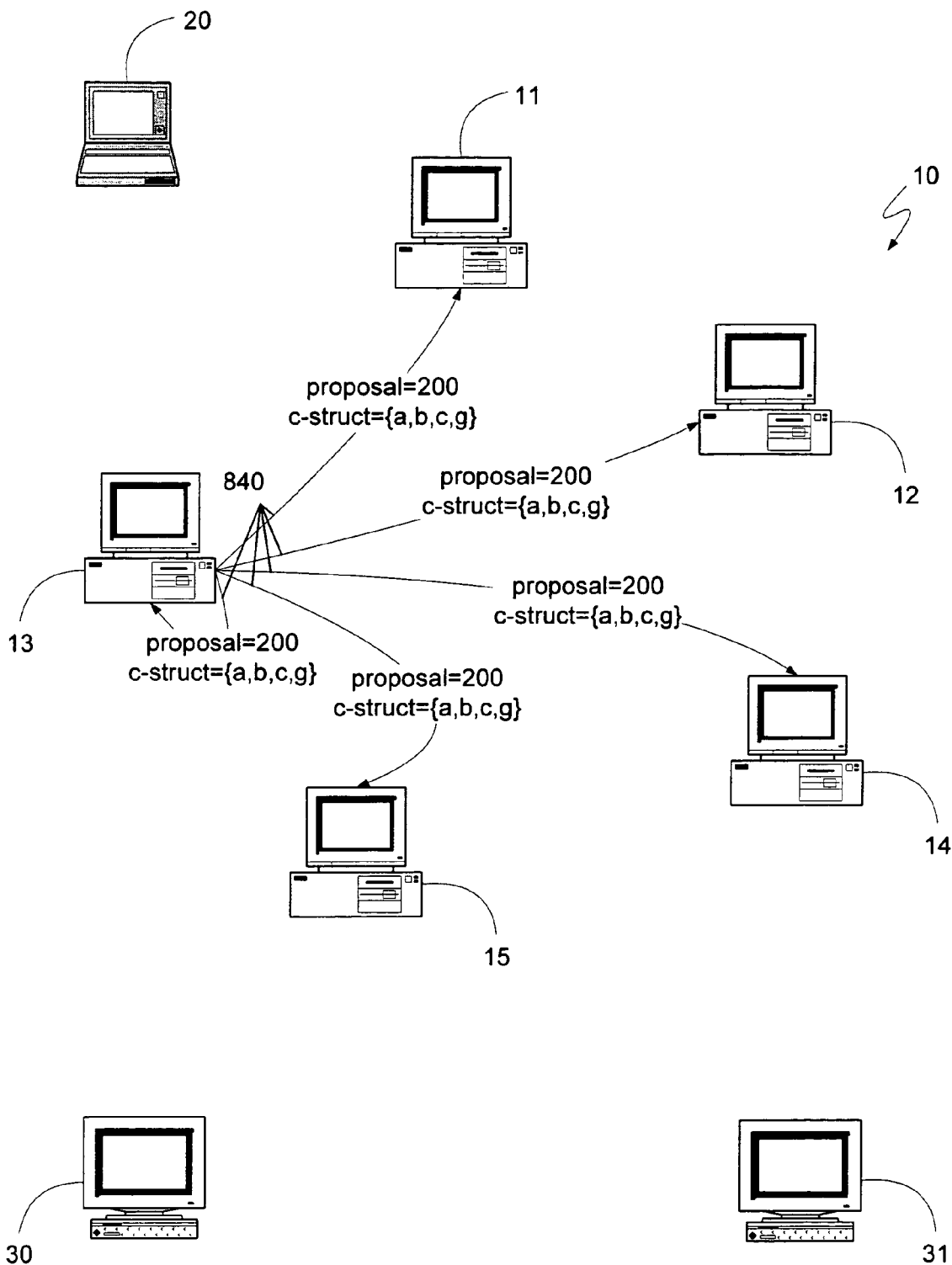
Figure 9F:
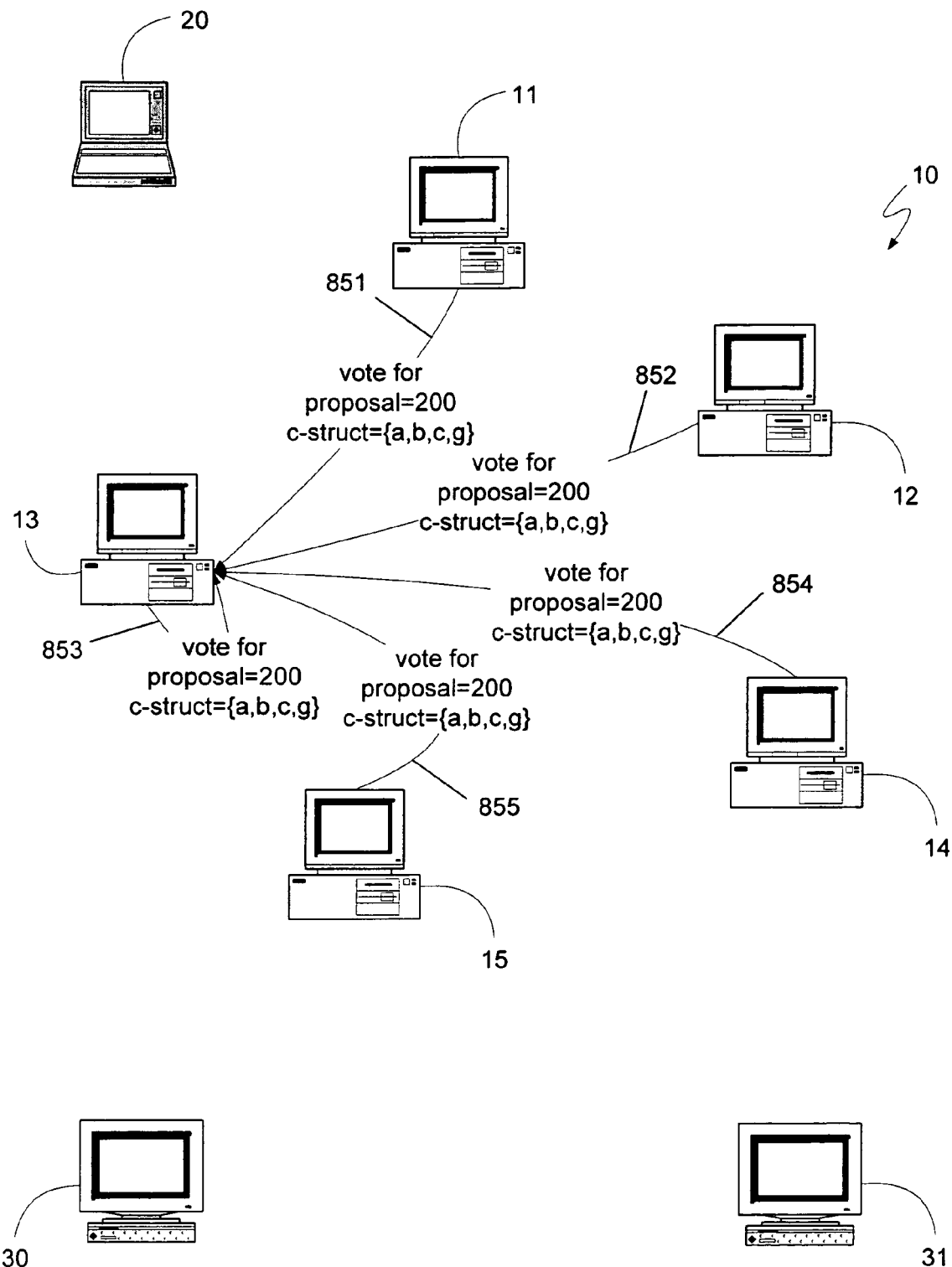

Turning to FIG. 9e, the leader 13 is illustrated as having selected a command structure represented by the function sequence {a,b,c,g} to propose, via message 840 to the devices 11-15. As indicated above, such a command structure is safe because the command structure represented by the function sequence {a,b,c,g} has, as a prefix, the command structure represented by the function sequence {a,b}. More specifically, the command structure represented by the function sequence {a,b,c,g} can be obtained by appending the function sequence {c,g} to the command structure represented by the function sequence {a,b}. Upon receipt of message 840, each of the devices can independently determine whether to vote for the proposed command structure. As described in detail above, each device can vote for a proposed command structure unless it has either responded to a suggestion to use a higher proposal number, or unless it has already voted for a command structure proposed using the current proposal number, and that previously voted for command structure is not equal to any prefix of the currently proposed command structure.

Figure 9G:
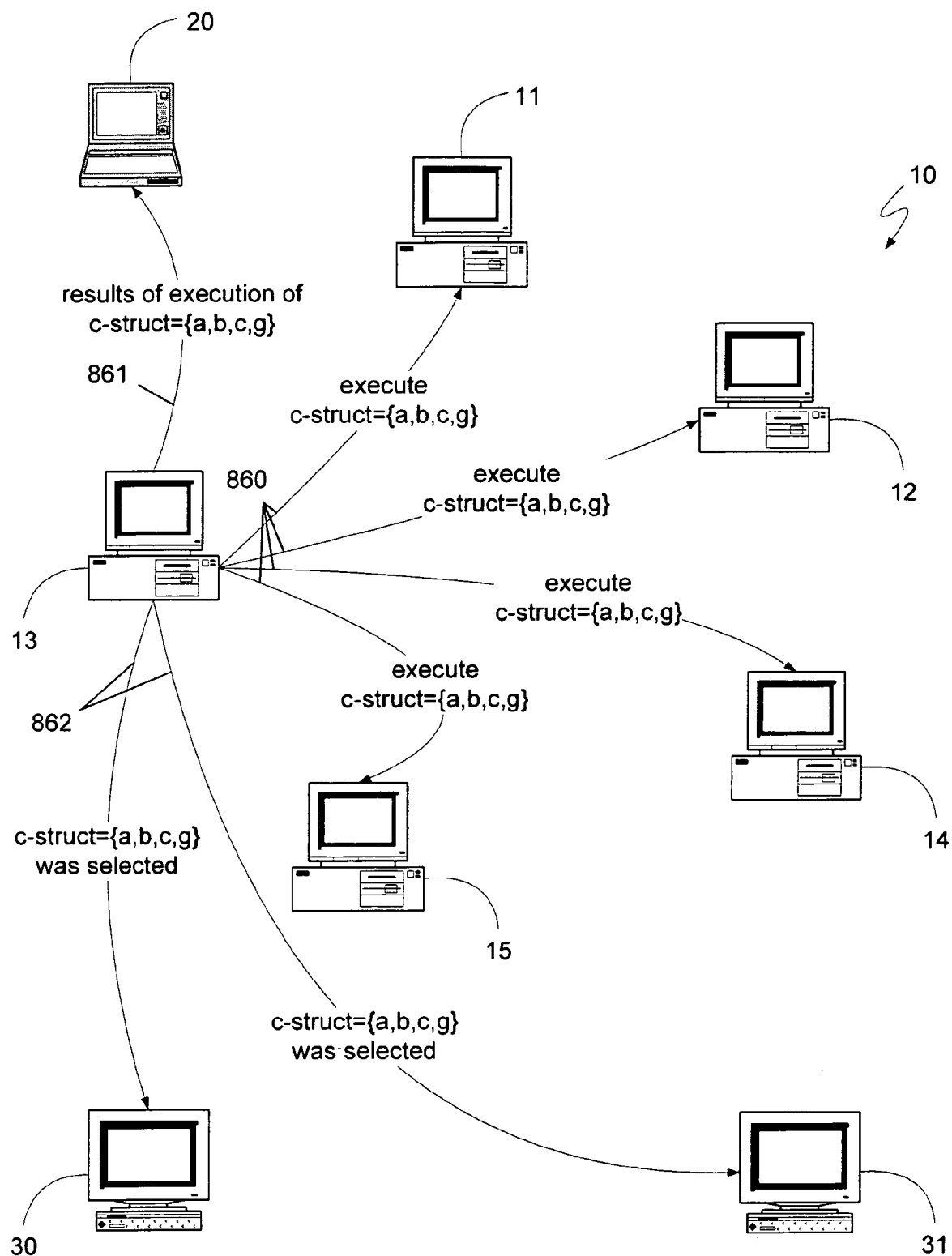

Because none of the devices 11-15 has responded to any higher numbered proposal, nor has any device voted for a previously proposed command structure using the current proposal number, each of the devices can vote for the command structure proposed by message 840. Therefore, turning to FIG. 9f, each of the devices 11-15 is shown voting for the proposed command structure by transmitting messages 851-855, respectively, to the leader 13. Since devices 11-15 comprise a quorum, the leader 13 can determine that the proposed command structure was selected and can inform the other devices via message 860, as shown in FIG. 9g. Similarly, the leader can inform client 20, via message 861, of the results of the execution of the function "g" that the client 20 requested via message 800. In addition, the leader can inform learner devices 30 and 31 that the proposed command structure was selected via message 862. Alternatively, as described in detail above, the leader 13 can simply inform devices 30 and 31 of the results of the execution of the functions.

As can be seen from the above detailed description, a generalized fault tolerant consensus algorithm can allow a distributed computing system to achieve consensus, not merely on an individual function, but rather on a command structure that recognizes the equivalence between sequences of functions that have commuting pairs of functions in different orders. A leader device, therefore, can continue to propose ever larger command structures, formed by appending one or more new functions to previously selected command structures, and can thereby continue to have the system select and execute new functions. However, the presence of the leader device, as a single point for proposing command structures, ensures that even pairs of commands that commute will still be selected in the same order. By enabling the constituent devices of the distributed computing system to receive requests directly from clients, the flexibility of the above described command structures can be utilized to remove at least one message delay between the transmission of a request and the transmission of the response to that request.

Generalized Message Delay Reducing Fault-Tolerant Consensus Algorithm

Figure 10A:
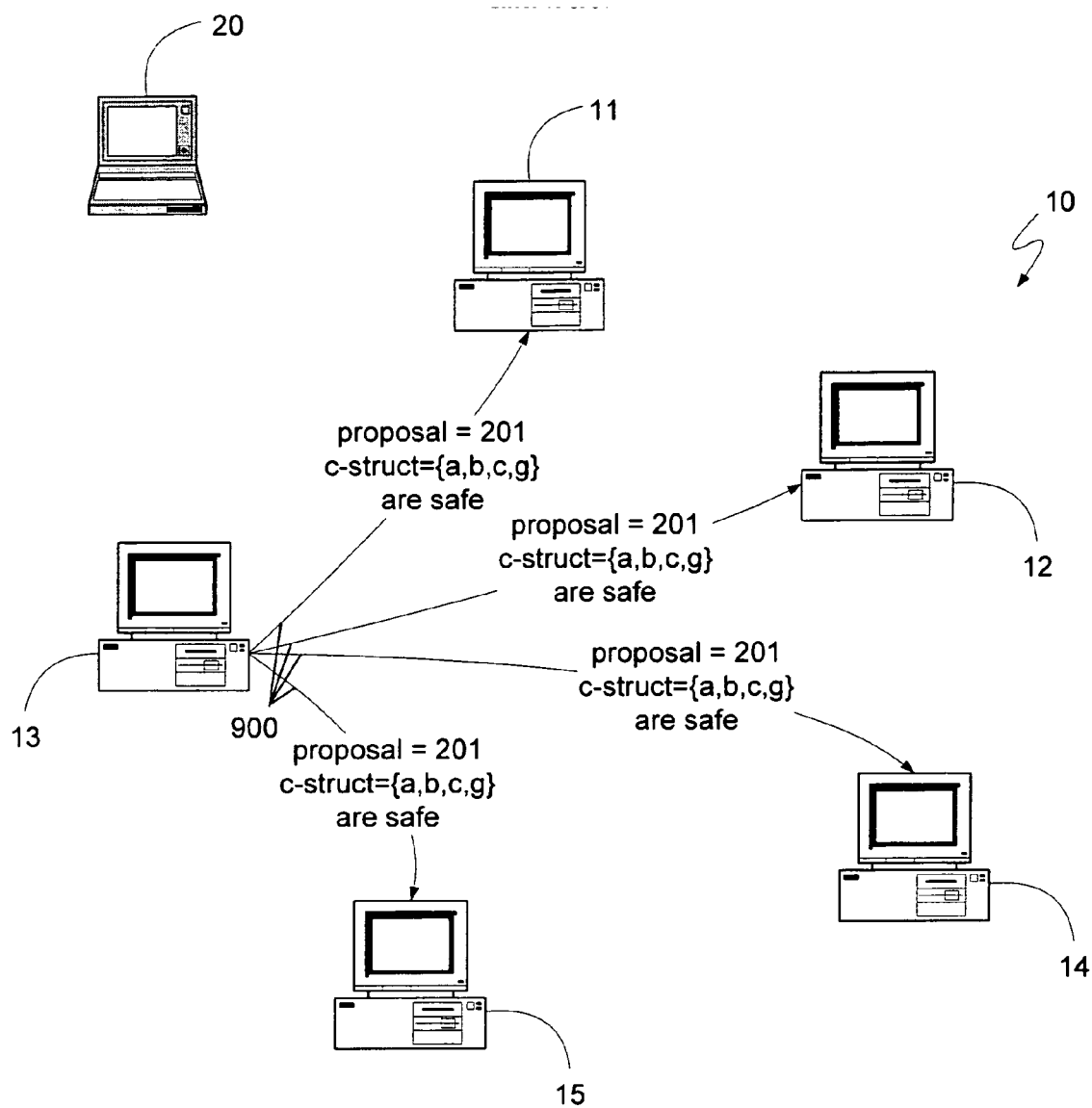
FIGS. 10*a-d* generally illustrate one aspect of the operation of a reduced message delay multi-phase generalized consensus algorithm contemplated by an embodiment of the present invention.

Turning to FIG. 10a, once the leader device 13 has achieved consensus, and knows of no further proposals, it can enable the system 10 to use a generalized message delay reducing fault-tolerant consensus algorithm. As described above, if proposal numbers are not correlated to the type of algorithm used by the system, the leader can simply indicate, in a message analogous to message 900, that the last chosen command structure is safe and that the proposal number that the leader was using is also safe. However, if proposal numbers are correlated to the type of algorithm used by the system, then the leader 13 can select a proposal number corresponding to a generalized reduced message delay algorithm that is higher than any proposal number that was previously used, of which the leader is aware, and can propose that proposal number to the devices 11-15 in the manner shown in FIG. 8a. If a quorum of devices agrees to the newly selected proposal number, such as in the manner shown in FIG. 8b, the leader 13 can transmit the new proposal number, corresponding to the generalized reduced message delay algorithm and indicate that the proposal number, and the previously selected command structure, are safe. For example, as shown in FIG. 10a, if the leader 13 had selected proposal number 201, corresponding to a generalized reduced message delay algorithm, and had obtain an agreement from a quorum of devices, the leader could send message 900 indicating that proposal number 201 and the command structure represented by the function sequence {a,b,c,g} are safe. Each device can maintain a database correlating proposal numbers to a corresponding algorithm. Consequently, upon receipt of message 900, each of the devices 11-15 can know that proposal number 201 corresponds to a generalized reduced message delay algorithm, and can therefore use that proposal number to respond to requests received directly from clients. Alternatively, message 900 can contain an explicit instruction to the devices 11-15 to accept requests directly from clients and treat such requests as having a proposal number of 201.

Figure 10B:
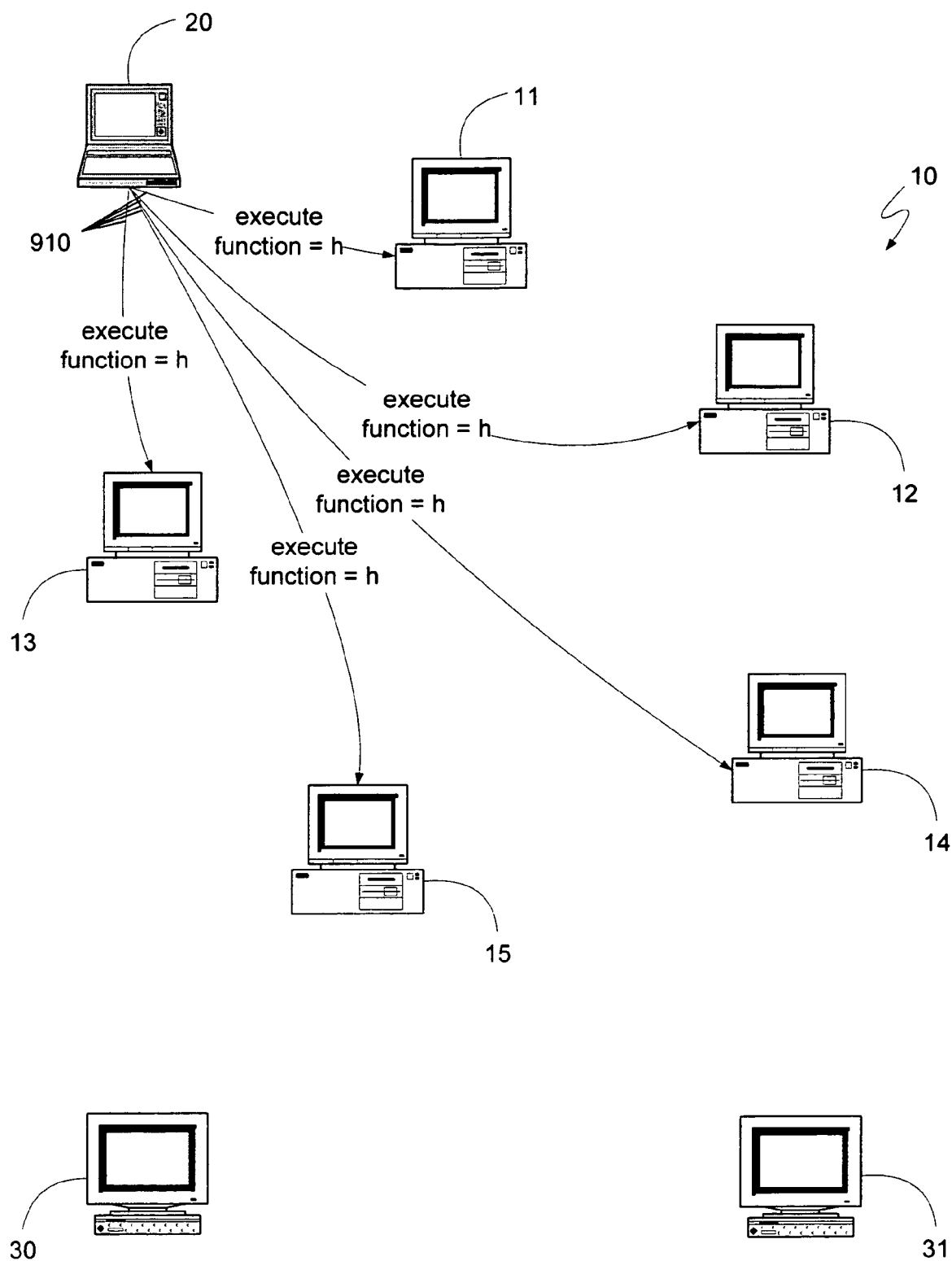
Figure 10C:
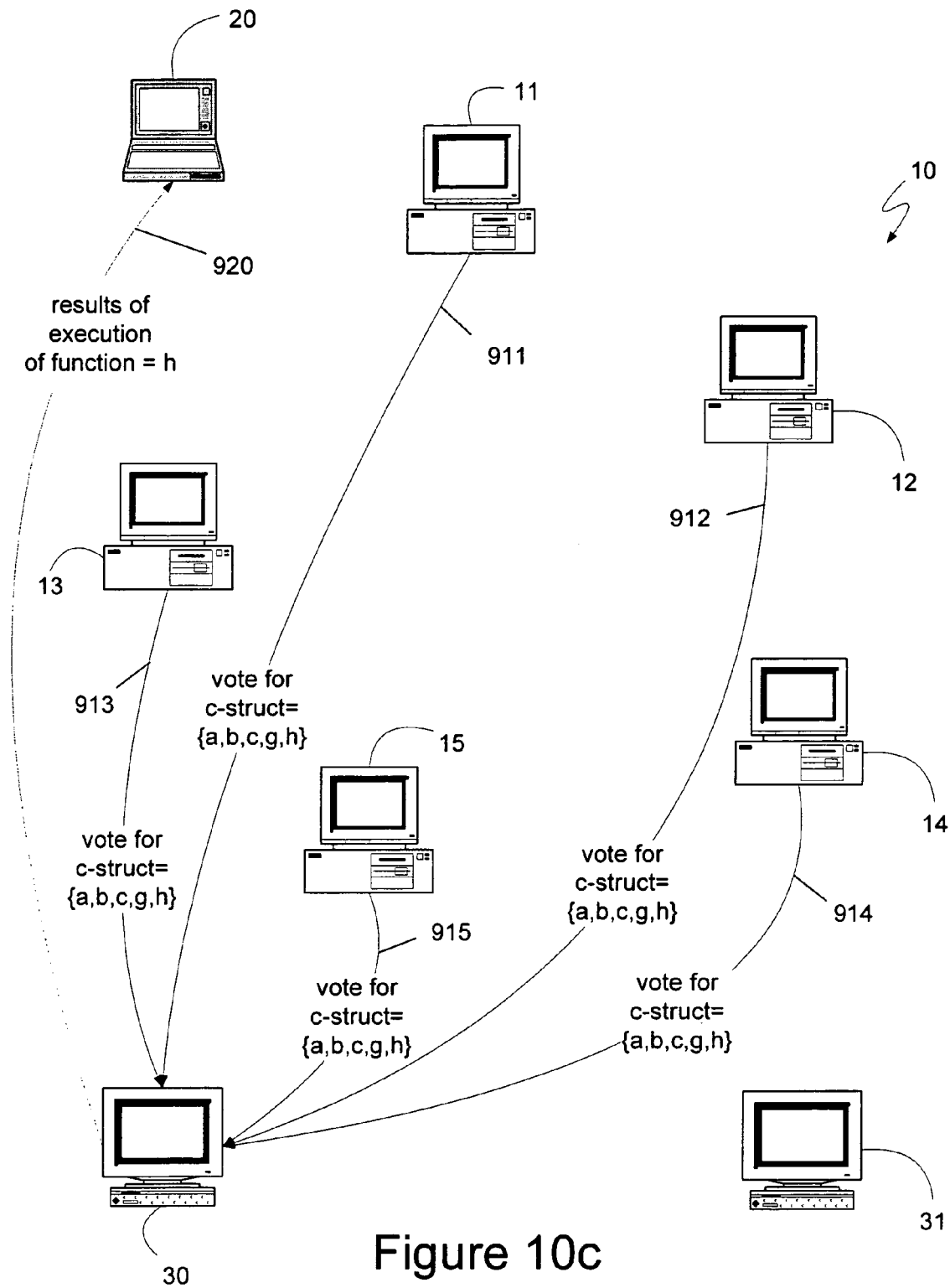

Turning to FIG. 10b, a client 20 is illustrated transmitting a message 910 to the devices 11-15, requesting that a function represented by the variable "h" be executed. As indicated above, each of the devices 11-15 can treat the client 20's request as a proposal having a proposal number of 201, and can determine, in the manner described in detail above, whether to vote for the requested function. Turning to FIG. 10c, because the leader 13 previously indicated that the command structure represented by the function sequence {a,b,c, g} was safe, each of the devices 11-15 can vote for the requested function by voting for a command structure created by appending the requested function to the indicating safe command structure, which, as illustrated, would be a command structure represented by the function sequence {a,b,c, g,h}. A learner device, such as device 30, can learn of the devices' votes either by polling the devices, or automatically receiving messages, such as messages 911-915, indicating the devices' votes. The learner device can determine if a quorum of devices has selected a command structure and, if a quorum has selected a command structure, the learner device can execute an equivalent sequence of commands, and can provide the results to any device, including the requesting client device 20. Consequently, as shown in FIG. 10c, the learner device 30 can transmit message 920 to the client device, providing the results of the execution of the function "h" requested by the client 20, after the learner 30 has determined that at least a quorum of devices has voted for a command structure containing the requested function.

Figure 10D:
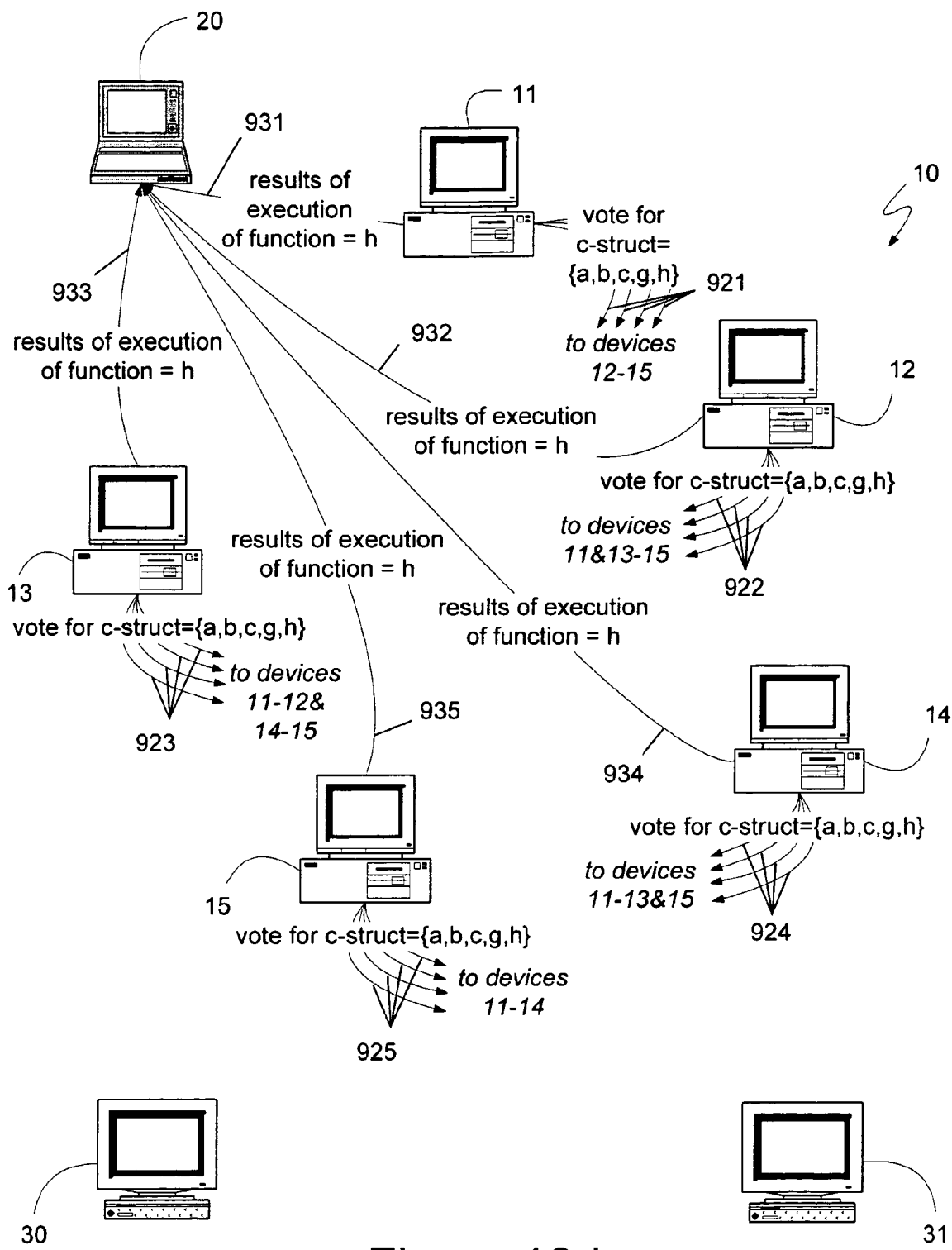

As described in detail above, each of the devices 11-15 can also act as learner devices and can themselves execute requested commands and can, thereby, independently maintain the state of the system 10. In such a case, each device can signal its vote for a command structure to each of the other devices. Therefore, turning to FIG. 10d, each of the devices 11-15 is shown sending messages 921-925, respectively, to each of the other devices, informing the other devices of the vote for the command structure represented by the function sequence {a,b,c,g,h}. Once any device receives a sufficient number of the messages 921-925 to determine that a quorum of devices has voted for a command structure, the device can execute an equivalent sequence of commands, and can provide the results of that execution to any device, including client devices. Thus, as shown in FIG. 10*d*, once each of the devices 11-15 learns that a quorum has selected the command structure represented by the function sequence {a,b,c,g,h}, they can execute the function "h" and provide the results to the client 20, such as via messages 931-935.

Figure 11A:
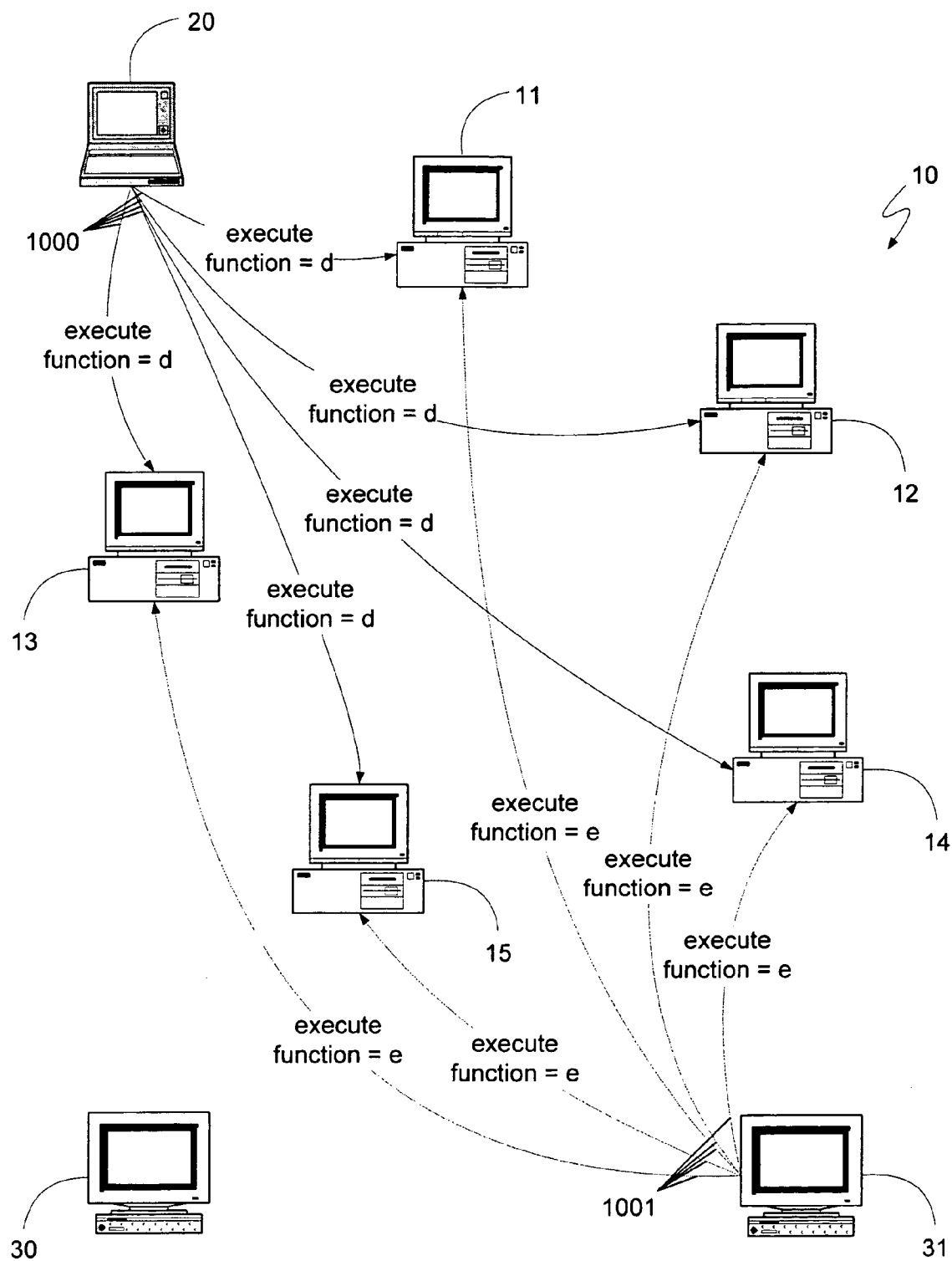
FIGS. 11*a-g* generally illustrate another aspect of the operation of a reduced message delay multi-phase generalized consensus algorithm contemplated by an embodiment of the present invention.

In some circumstances, however, two or more client devices may transmit requests to the distributed computing system 10 at approximately the same time. In such a case, the requests may arrive in varying orders at the devices. For example, FIG. 11*a* illustrates a client 20 and a client 31 both sending request messages at approximately the same time. Client 20 sends a message 1000 requesting the execution of a function represented by the variable "d", while client 31 sends a message 1001 requesting execution of a function represented by the variable "e". Some of the devices 11-15 of the distributed computing system 10 may receive message 1000 first, while other devices may receive message 1001 first. As explained in detail above, a device can append, to the already selected command structure, whichever function is requested by the message the device receives first.

Figure 11B:
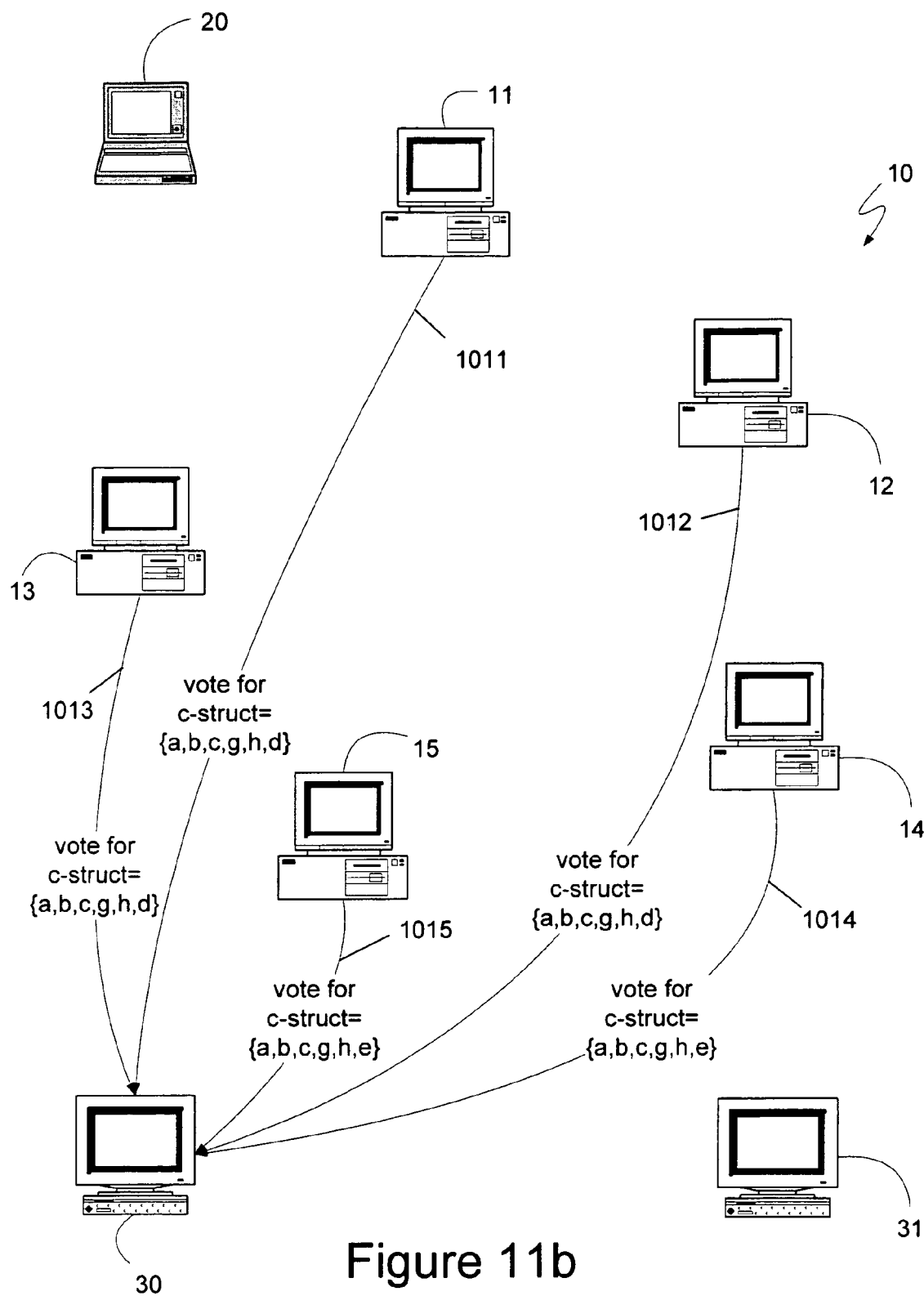

Turning to FIG. 11*b*, devices 11-13 are illustrated as having received message 1000 first, while devices 14-15 are illustrated as having received message 1001 first. Thus, if the devices 11-15 were to report their votes to a learner device 30, in the manner described in detail above, devices 11-13 could send messages 1011-1013, respectively, indicating that they cast a vote for the command structure represented by the function sequence {a,b,c,g,h,d}, while devices 14-15 could send messages 1014-1015, respectively, indicating that they cast a vote for the command structure represented by the function sequence {a,b,c,g,h,e}. As can be seen, the command structures that each of the devices voted for was obtained by appending the requested function, either "d" or "e", whichever message was received first, to the already selected command structure represented by the function sequence {a,b,c,g,h}.

Because requests 1000 and 1001 were transmitted at approximately the same time, those devices that received request 1000 first, namely devices 11-13 in the exemplary situation illustrated in FIG. 11*b*, will likely receive request 1001 very soon thereafter. Similarly, devices 14-15, which, in the exemplary situation of FIG. 11*b*, received message 1001 first, will likely receive request 1000 very soon. Once each of these devices receives the latter request, they can vote for that request in an analogous manner to that described in detail above. Therefore, turning to FIG. 11*c*, devices 11-13 are shown voting for a command structure containing the command structure those devices previously voted for with the function requested by message 1001 appended to it. Similarly, devices 14-15 are shown voting for a command structure containing the command structure devices 14-15 previously voted for with the function requested by message 1000 appended to it. Thus, messages 1021-1023, from devices 11-13, respectively, indicate that those devices have voted for a command structure represented by the function sequence {a,b,c,g,h,d,e}, while messages 1024-1025, from devices 14-15, respectively, indicate that they have voted for a command structure represented by the function sequence {a,b,c,g,h,e,d}.

As previously explained, such a conflict would have caused the fast Paxos algorithm to introduce additional message delays in an attempt to uniquely order functions "d" and "e". However, if functions "d" and "e" commute, they need not be ordered, as explained in detail above, and the command structure of messages 1021-1023 would be equal to the command structure 1024-1025. In other words, devices 11-15 would have each voted for equivalent command structures if functions "d" and "e" commute, and a consensus on those command structures would have been reached. Therefore, as illustrated in FIG. 11*d*, if functions "d" and "e" commute, learner device 30 can execute both functions "d" and "e", in either order, and can provide the results to the respective requesting client, via messages 1030 and 1031. As can be seen, a generalized message delay reducing fault-tolerant algorithm introduces no additional message delays even when two or more requests are transmitted at approximately the same time, if every pair of the requested functions commutes. Of course, if functions "d" and "e" did not commute, a generalized fault-tolerant consensus algorithm could be used to achieve consensus by selecting either "d" or "e" first and proposing an appropriate command structure to the devices 11-15 in the manner described in detail above.

Figure 11C:
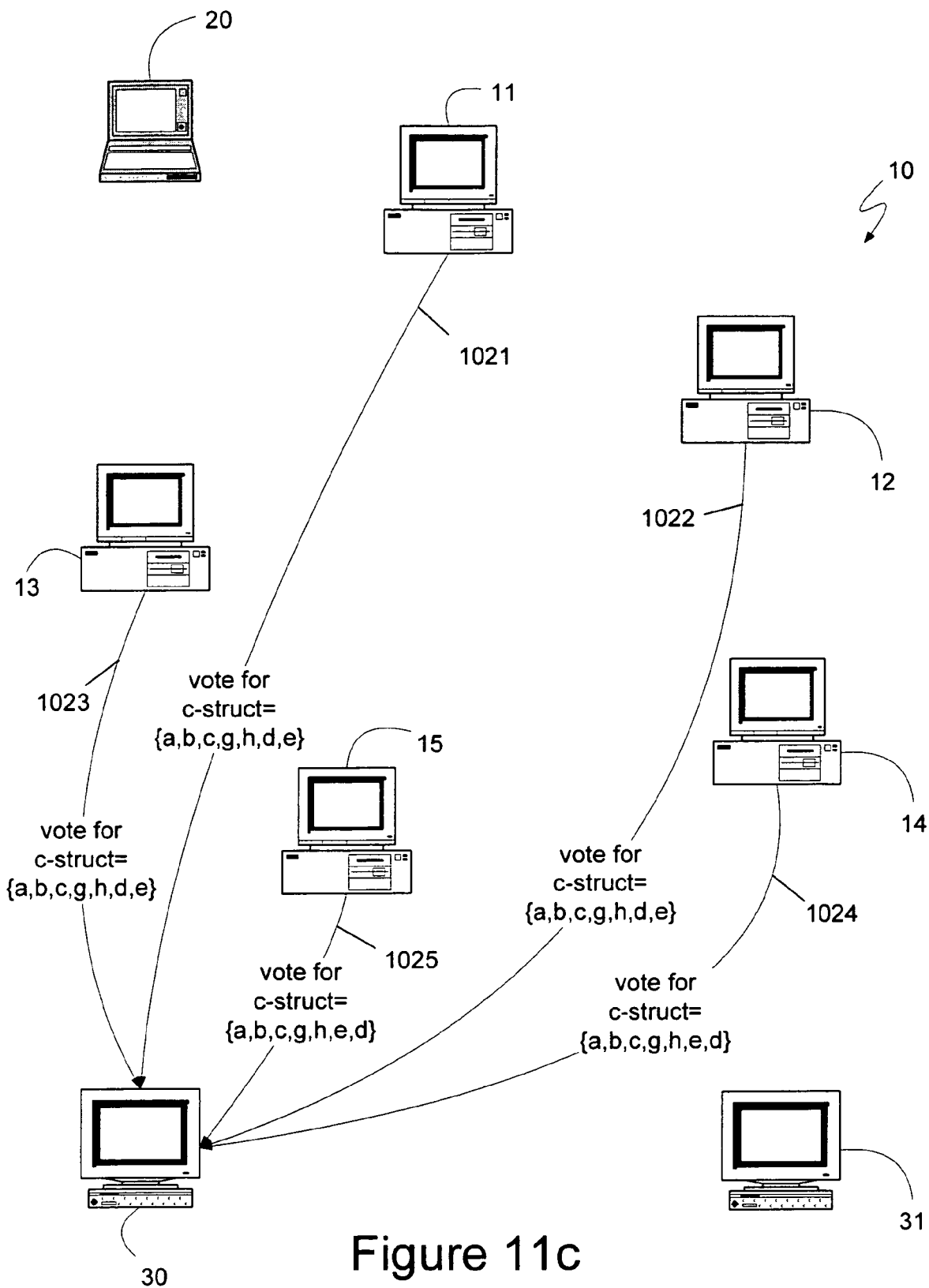
Figure 11D:
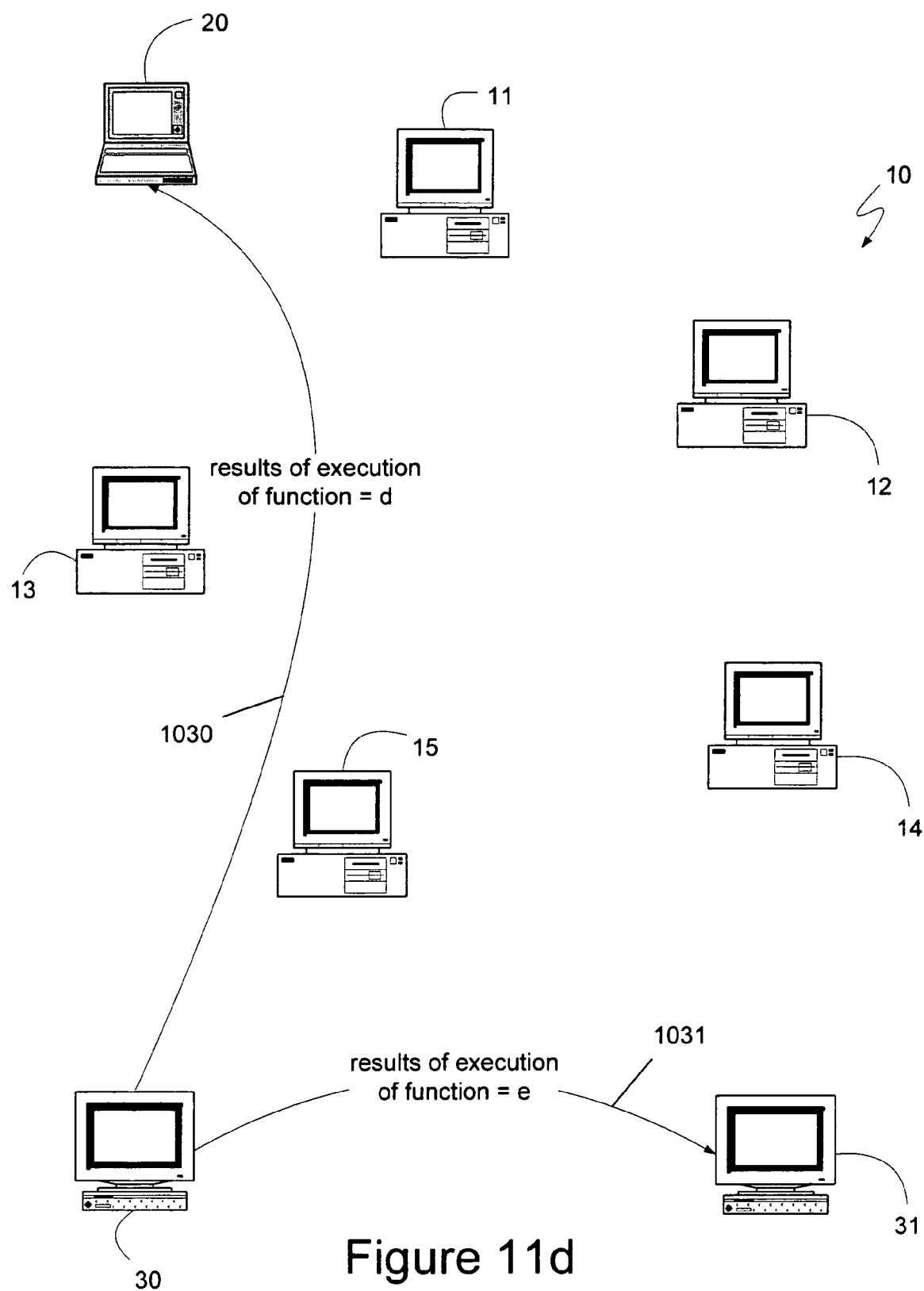
Figure 11E:
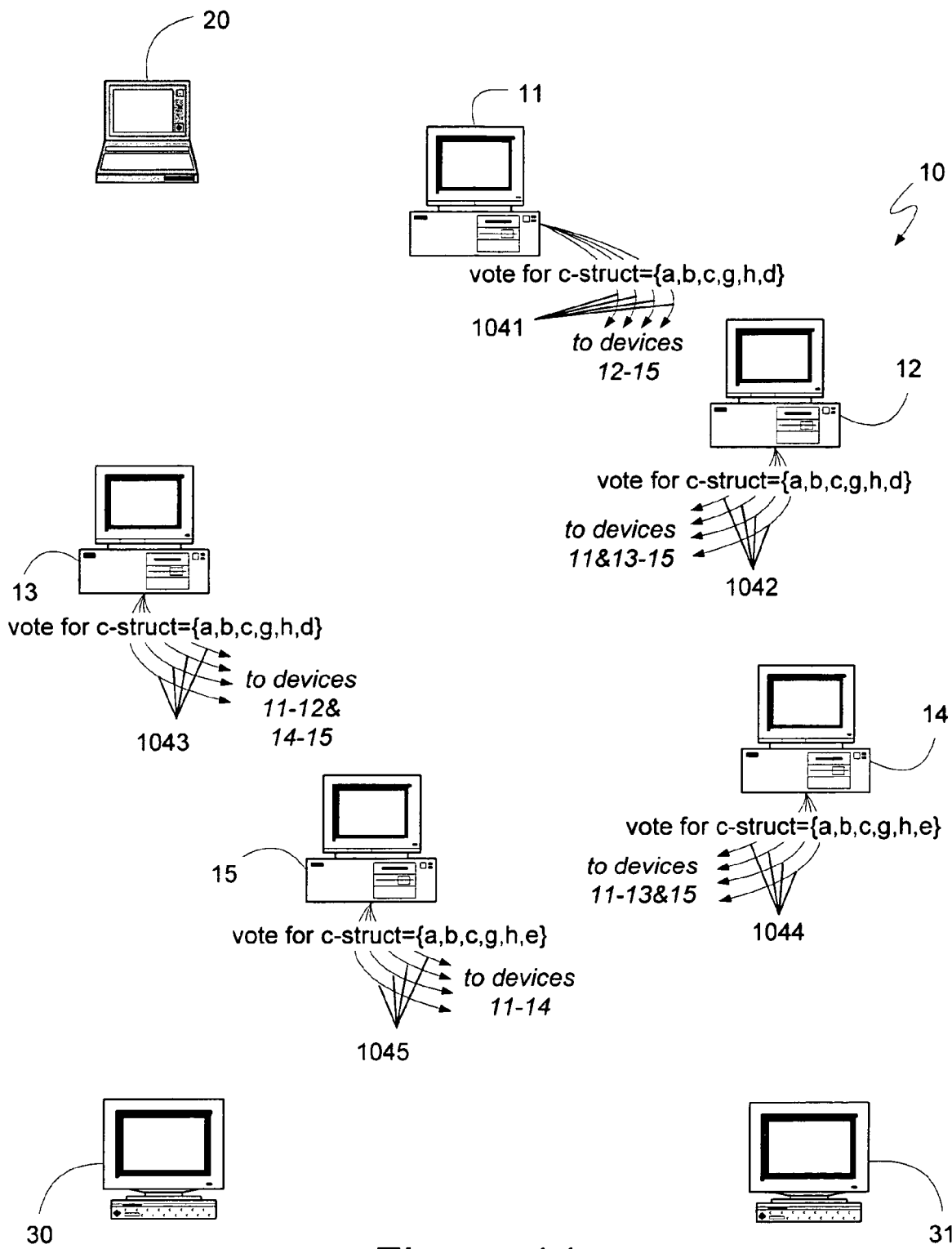

Turning to FIG. 11*e*, an alternative implementation of a generalized message delay reducing fault-tolerant consensus algorithm is illustrated. As described above, each of the devices 11-15 can also act as learner devices. In such a case when the devices vote for a command structure, they can send a message indicating their vote to each of the other devices. Thus, as illustrated in FIG. 11*e*, devices 11-15 can send messages 1041-1045, respectively, to each other. As in FIG. 11*b*, devices 11-13 are illustrated as having received message 1000 first while devices 14-15 are illustrated as having received message 1001 first. Messages 1041-1043, therefore, indicate a vote for a command structure obtained by appending the function "d" to the previously selected command structure represented by the function sequence {a,b,c,g,h}, while messages 1044-1045 indicate a vote for command structure obtained by appending the function "e" instead.

Figure 11F:
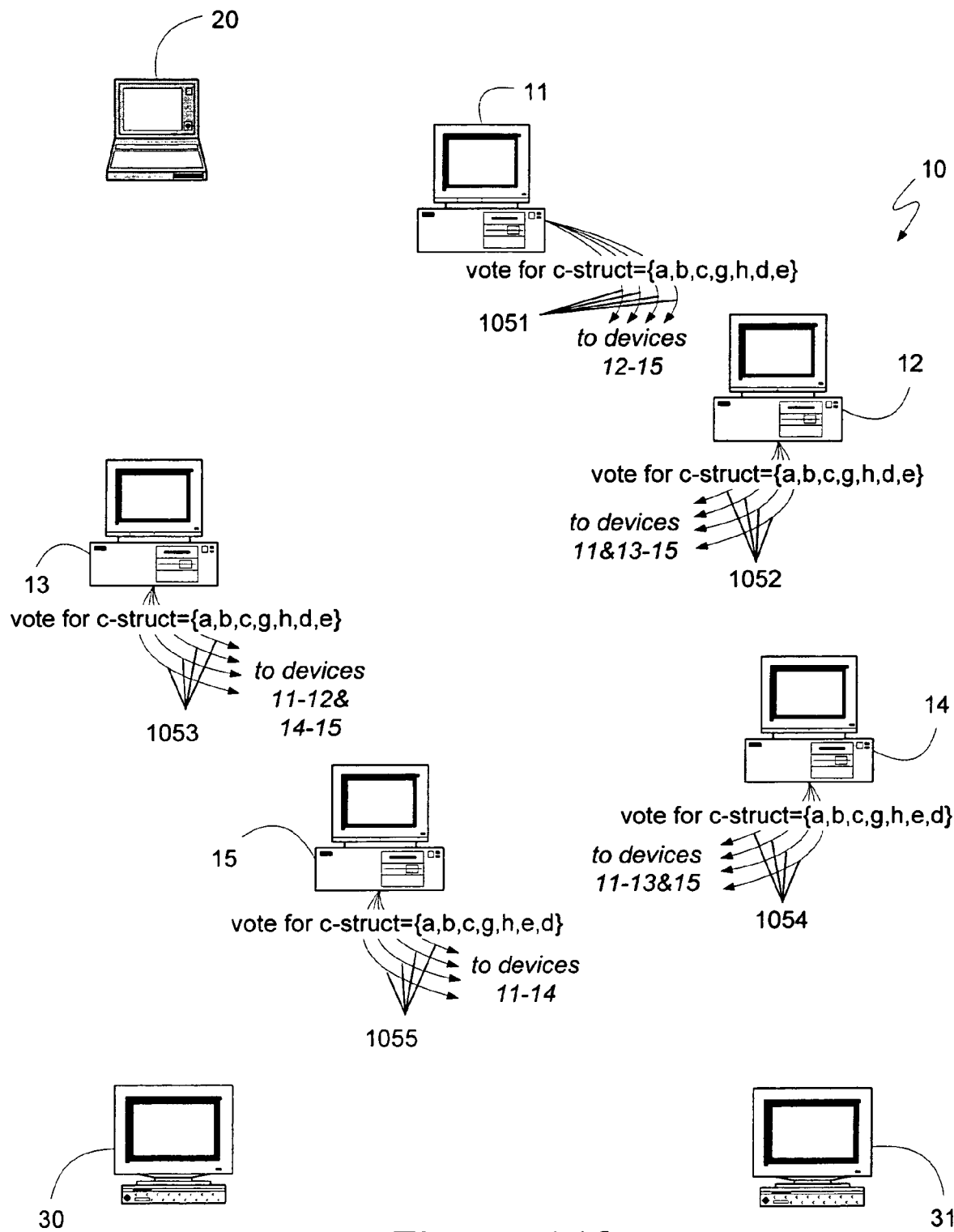

As above, after receiving either message 1000 or 1001 first, each of the devices is likely to receive, and respond to, the other of the two messages. Consequently, as illustrated in FIG. 11*f*, devices 11-13 can send messages 1051-1053, respectively, indicating they have voted for a command structure obtained by appending the function "e" to the previously voted for command structure, while devices 14-15 can send messages 1054-1055, respectively, indicating they have voted for a command structure obtained by appending the function "d" to their previously voted for command structure. As explained in detail above, if functions "d" and "e" commute, then both of the command structures voted for by the devices are equivalent. Consequently, each device can determine that the command structures were selected, and can independently execute both functions "d" and "e" and provide the results to the respective clients 20 and 31 via messages 1061-1065 and 1071-1075, as illustrated in FIG. 11*g*.

Figure 11G:
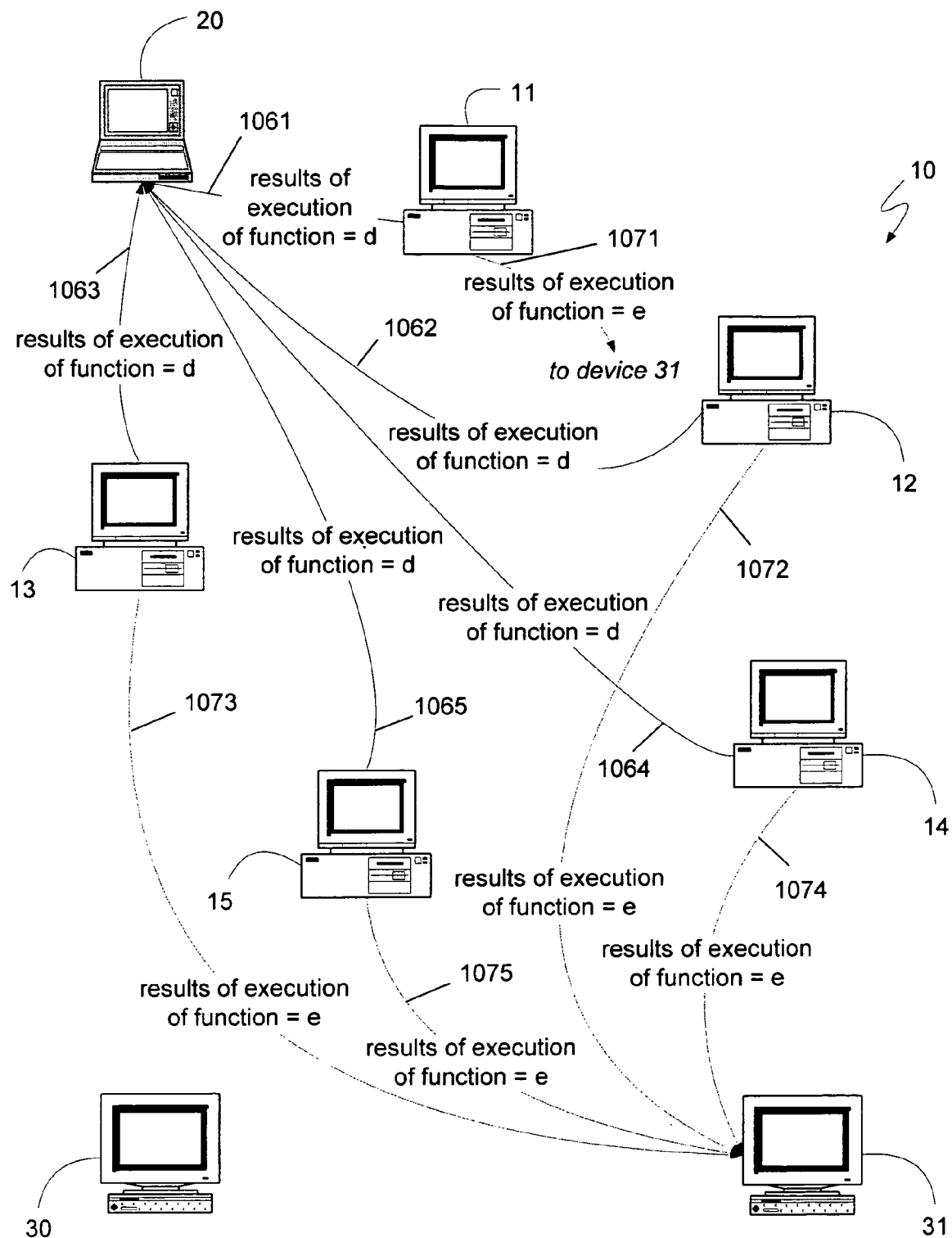

If functions "d" and "e" do not commute, the system of FIGS. 11*e-g* need not resort to using a generalized fault-tolerant consensus algorithm in the same manner as the system of FIGS. 11*b-d*. Instead, because each of the voting devices 11-15 also maintains a state of the overall system, each device can, upon receipt of messages 1041-1045 and 1051-1055, determine that a conflict has occurred. In such a case, each device can attempt to anticipate what a leader device would do in a manner analogous to that described in detail above in connection with the fast Paxos algorithm. Specifically, each device can select a new proposal number that similarly corresponds to a generalized reduced message delay algorithm and can send a message, analogous to messages 831-835, using that new proposal number, to every other device. As explained above the new proposal number can be larger than any proposal number for which the devices know a proposal was made. Once each of the devices receives the messages from the other devices regarding the new proposal number, each device can, using the same predetermined criteria as a leader device would use, determine whether to propose a command structure that appends the function sequence {d,e} or the function sequence {e,d} to a safe command structure. Once determined, the device can vote for the new command structure and transmit its vote to the other devices. Each device should have selected the same command structure and operation analogous to that illustrated in FIG. 10*d* can resume. Because the predetermined criteria used by the leader can depend on the messages received, different devices might not receive the same set of messages if some devices fail or if some messages experience an unreasonable delay. As a result, devices receiving different sets of messages may not independently select the same new command structure. In such a case, a second conflict can occur. To prevent a continuous reoccurrence of the same conflict, the system can resort to using a generalized consensus algorithm that relies on a leader device to avoid conflicts, such as the above-described generalized fault-tolerant consensus algorithm, if the same conflict occurs more than once. Nevertheless, in the normal case in which all non-failed devices receive all messages that are sent, the above described mechanism can reduce the number of message delays between the receipt of a client's request and the transmission of a response in the situation where two conflicting requests are sent at approximately the same time.

As explained in detail above, the fast Paxos algorithm can define a quorum as a larger number of devices than a quorum as used by the Paxos algorithm. Similarly, a generalized message delay reducing fault-tolerant consensus algorithm can use a larger number of devices as a quorum than the above-described generalized fault-tolerant consensus algorithm. All things being equal, a generalized message delay reducing fault-tolerant consensus algorithm can provide a more efficient distributed computing system. However, if an insufficient number of devices is operational, the above-described generalized fault-tolerant consensus algorithm can be used. Consequently, a leader device or a learner device can monitor the other devices of the system 10 for failures. If a sufficient number of devices fails, a leader can select a proposal number corresponding to a generalized fault-tolerant consensus algorithm and can implement the algorithm as described in detail above. Additionally, as will be known by those skilled in the art, there can be many mechanisms by which the failure of a device can be detected, including time-outs, failure to respond to pings, and the like. Any mechanism can be used by embodiments of the present invention to detect faults, though mechanisms which can signal a fault when, in fact, there is no fault, can cause less efficient operation.

Similarly, selecting or executing a single function multiple times can also cause inefficient operation, or even incorrect operation. Requested functions can be assigned unique function identifiers such that, multiple requests of a function would be assigned different function identifiers, since a client requested the function multiple times. Such function identifiers can be used to ensure that each function requested by a client is only selected or executed once per request. One mechanism contemplated by an embodiment of the present invention checks the function identifier when appending functions to previously voted for command structures in order to generate a new command structure. If the function identifier indicates that the function is already present in the command structure, an attempt to append that function to the command structure can result in no change to the command structure. Consequently, duplicate functions will not be selected. An alternative mechanism contemplated by an embodiment of the present invention checks the function identifier when executing a selected series of functions. If the function identifier indicates that the function has already been executed, the executing device can ignore the duplicated function. As a result, even if a duplicate function were selected, it would not be executed.

While leader devices and learner devices can contain information that can aid in the performance of the above described algorithms, the constituent devices 11-15 of the distributed computing system 10, if they only act as voting devices, need only maintain a few elements of information. Specifically, each voting device can maintain the largest proposal number for which the device has responded to a message from a leader proposing the use of that proposal number, the largest proposal number for which the device has cast a vote, and the command structure, corresponding to that proposal number, for which the device has previously voted.

The amount of memory used by the devices can be further reduced through the use of checkpoint commands. As indicated above, a checkpoint command can be a command the does not commute with any other command. As a result, a checkpoint command defines a fixed point in a command structure. More particularly, a checkpoint allows any command structure to be created from a series of smaller command structures, each with the checkpoint command appended to them. Thus, a device need only remember its state after executing the latest of the series of smaller command structures, together with the currently voted on command structure.

Figure 12A:
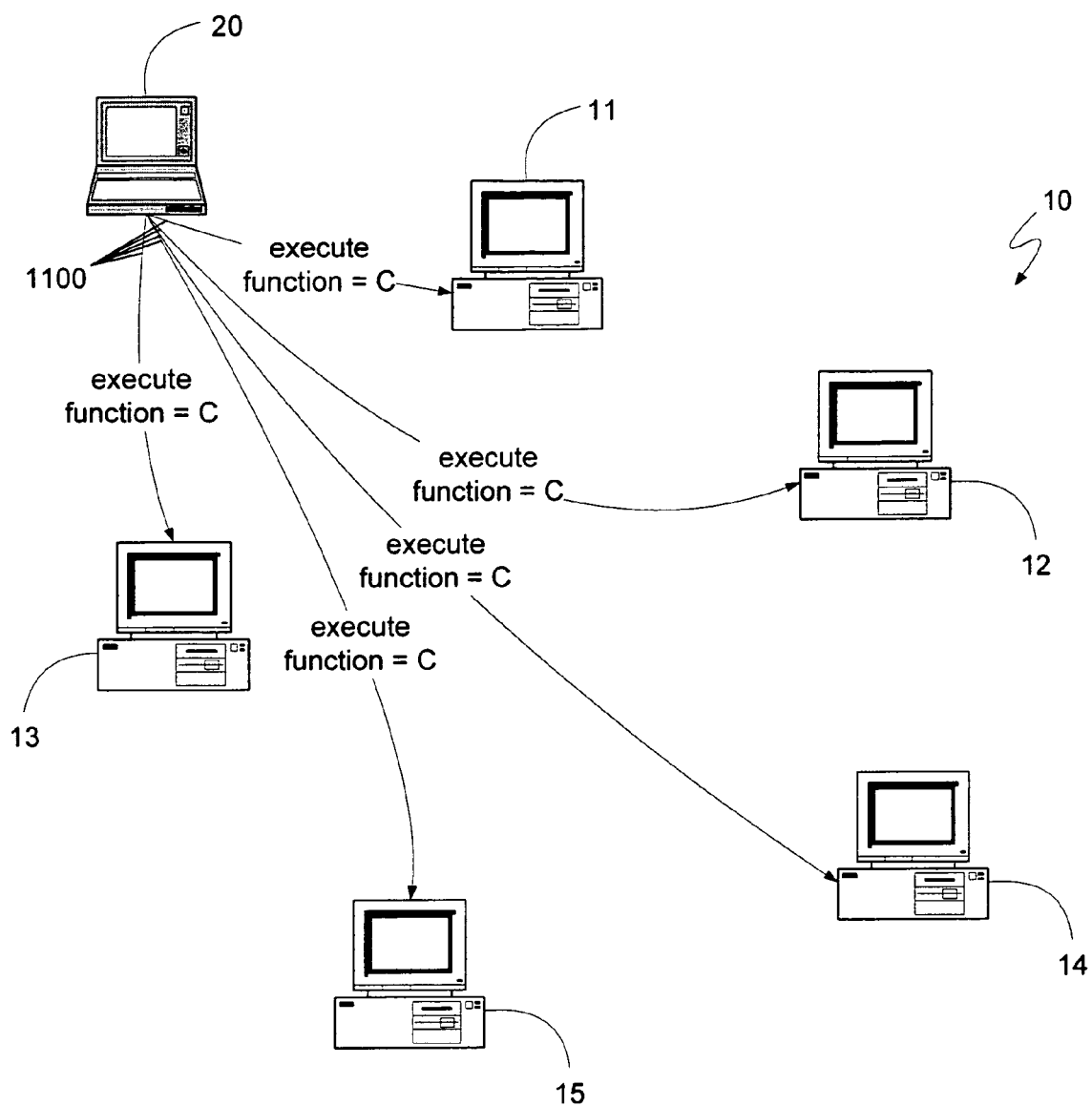
FIGS. 12*a-f* generally illustrate a further aspect of the operation of a reduced message delay multi-phase generalized consensus algorithm contemplated by an embodiment of the present invention.
Figure 12A:
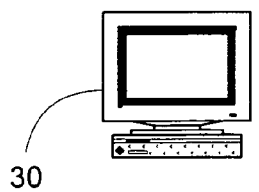
Figure 12A:
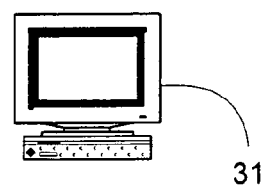

Turning to FIG. 12*a*, an exemplary implementation of a checkpoint command is illustrated. A leader device, or alternatively a client device, such as client device 20 as shown in FIG. 12*a*, can propose a checkpoint command, represented by the variable "C", by sending a request to execute the checkpoint command to the devices 11-15 via message 1100. Upon receipt of message 1100, each of the devices can, in the manner described in detail above, determine whether to vote for a command structure with the checkpoint command appended to it.

Figure 12B:
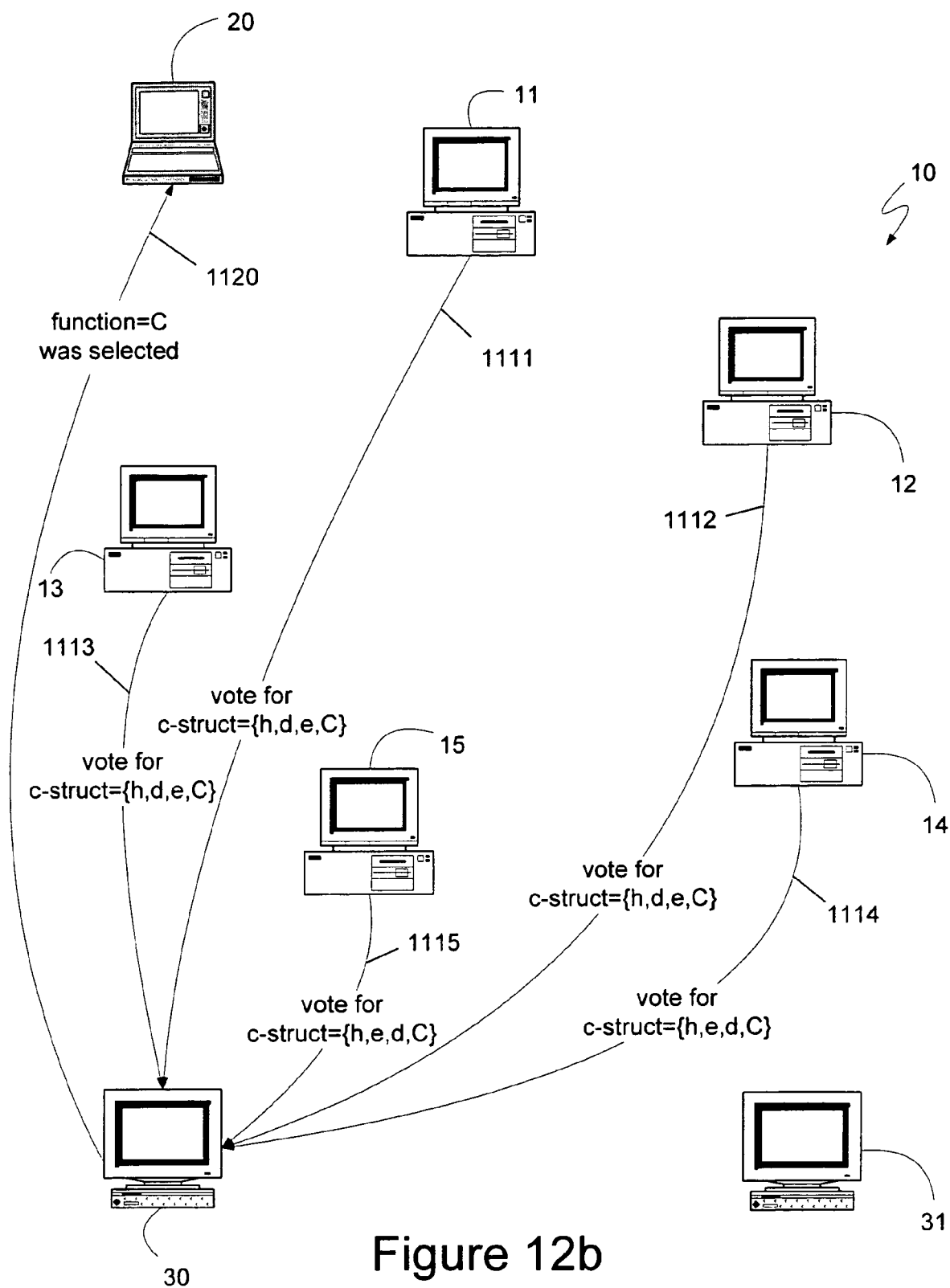
Figure 12C:
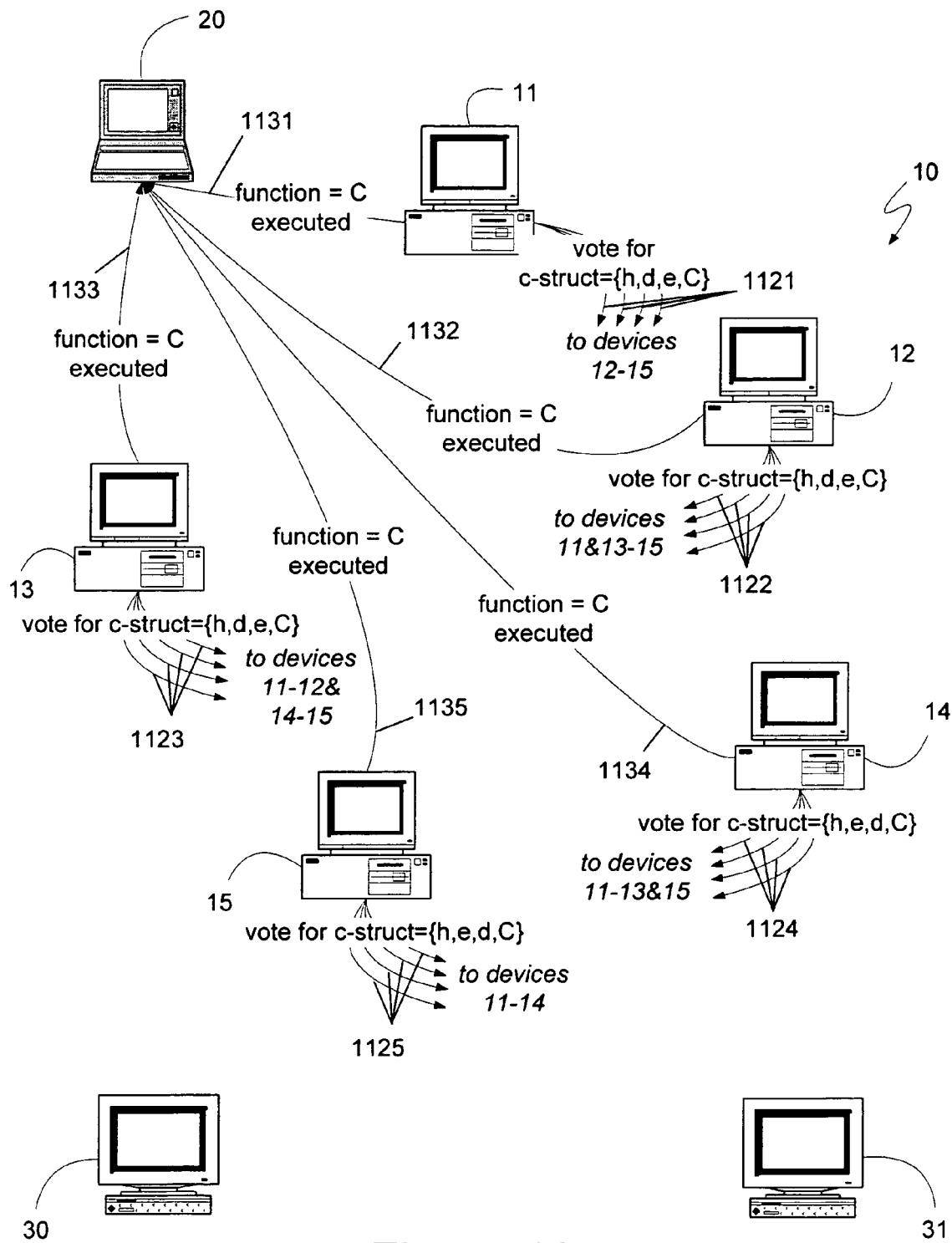

FIG. 12*b* illustrates devices 11-15 voting for command structures formed by appending the checkpoint command to command structures that those devices had previously voted for. Thus, for example, devices 11-13 are shown voting for a command structure represented by the function sequence {h,d,e,C}, while devices 14-15 are shown voting for a command structure represented by the function sequence {h,e,d, C}. Each of the devices can transmit their vote information, via messages 1111-1115, respectively, to a learner device, such as learner device 30. Once learner device 30 receives a sufficient number of messages to determine that a quorum of devices has selected a command structure, it can inform the requesting device 20 that the checkpoint command was selected, as indicated by message 1120. Alternatively, as shown in FIG. 12*c*, each of the devices could have transmitted their vote messages 1121-1125 to one another, in the manner described in detail above, and could have each independently determined that a quorum of devices had voted for the checkpoint function and subsequently transmitted an indication that the checkpoint command was selected to the requesting device 20 via messages 1131-1135.

Figure 12D:
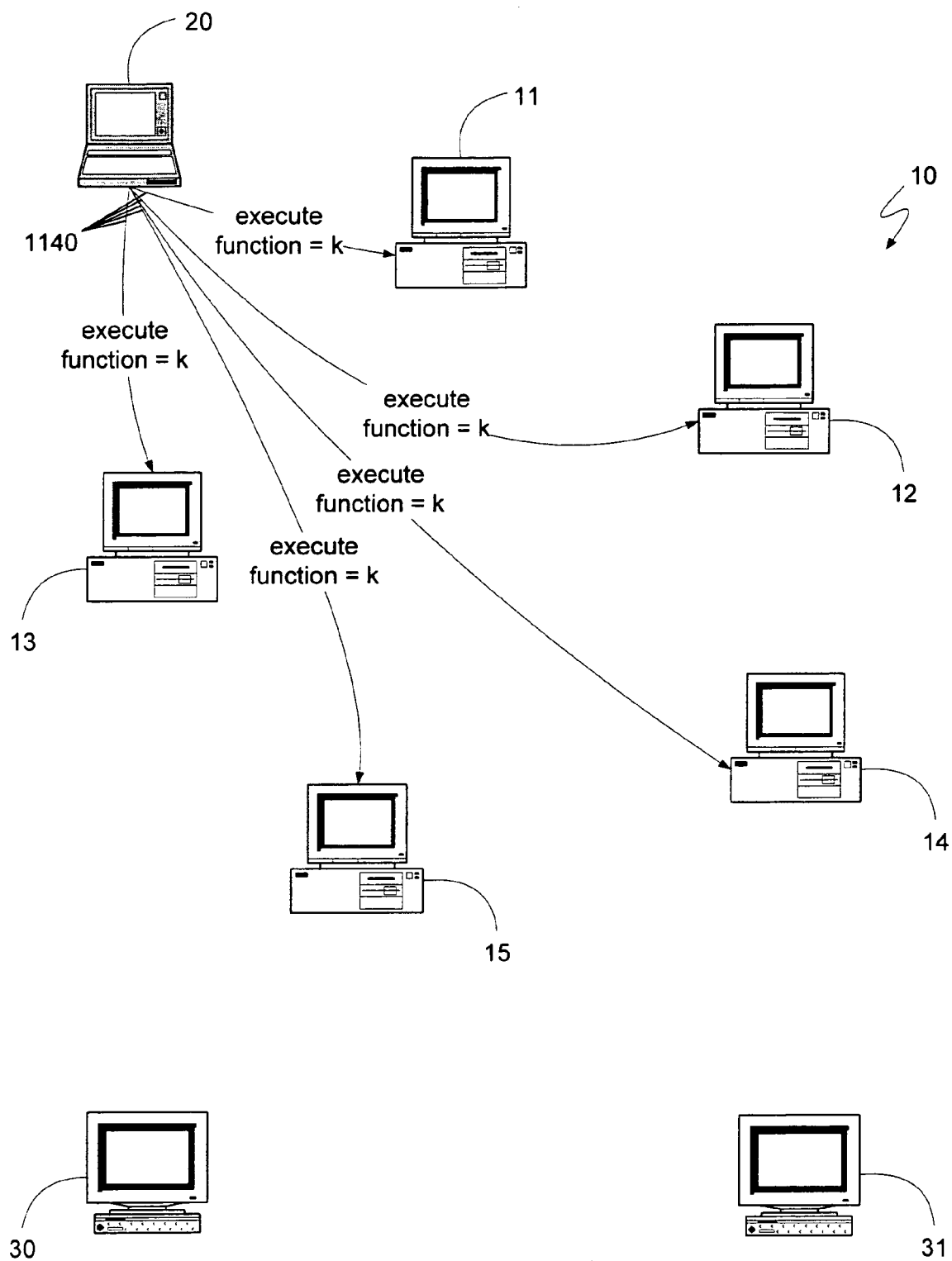
Figure 12E:
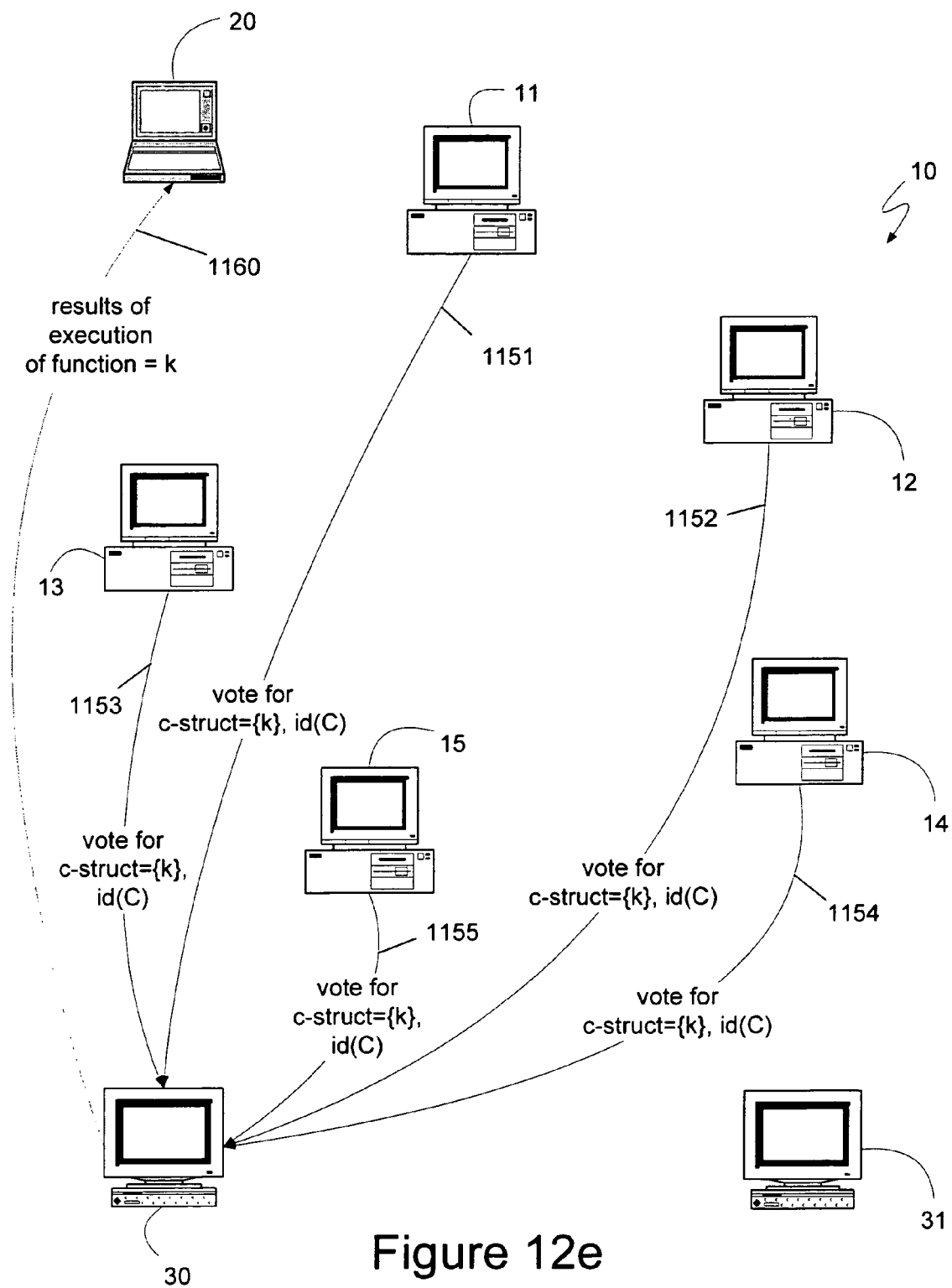
Figure 12F:
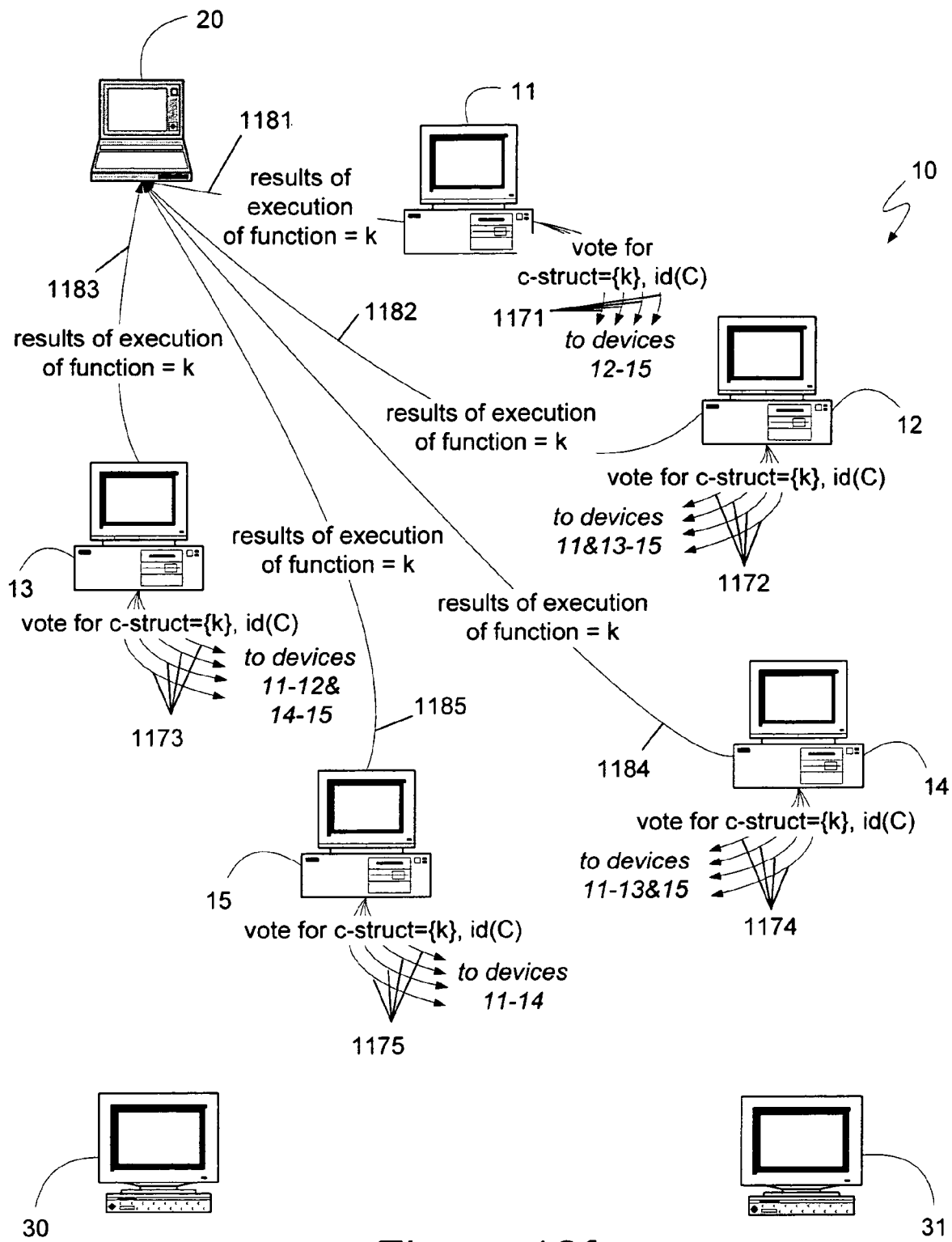

After a checkpoint command has been selected, each of the devices need only remember their state after executing the command structure ending with the checkpoint command. Turning to FIG. 12d, a subsequent request by device 20, transmitted via message 1140, illustrates a request that a function represented by the variable "k" be executed. Because a checkpoint command was previously selected, each of the devices 11-15 can vote for the function "k" by voting for a command structure formed by appending "k" to a null command structure. In addition, an identifier of the previously selected checkpoint command can also be specified so that it can be determined that the devices are, in fact, in agreement. For example, if a checkpoint was selected after every 10 functions, there could be a significant difference between a device's state after the $20^{th}$ function versus that device's state after the $30^{th}$ function. Consequently, as illustrated in FIG. 12e, each of the devices 11-15 can vote for a command structure represented by the function sequence {k}, and can provide an indication of which checkpoint precedes the voted for command structure. As shown in FIG. 12e, the checkpoint command can be assigned a command identifier, in the manner described in detail above, and that command identifier can be used. Alternatively, each checkpoint could be serially numbered, and that number could be sent instead. Subsequently, the devices' votes can be transmitted to a learner device 30 via messages 1151-1155, which can then provide the results of the execution of the function "k" to the requesting client 20 via message 1160, as illustrated in FIG. 12e. Alternatively, as illustrated in FIG. 12f, the devices 11-15 can send messages 1171-1175 announcing their votes to each other, and can, after independently determining that a quorum of devices has voted for the function "k", also send messages 1181-1185 to the client 20 providing the results of the execution of the function "k".

As indicated above, however, devices do not merely store command structures, they also transmit them. For example, each one of the devices 11-15 can transmit a command structure every time it seeks to inform another device of its vote. One mechanism contemplated by an embodiment of the present invention for reducing the amount of information transmitted utilizes the nature of command structures to transmit only the new information. Specifically, as described above, a command structure can be created by appending a newly requested function or series of functions to a prefix command structure. Furthermore, the prefix command structure was voted for previously, and possibly already transmitted. Thus, rather than transmitting the newly voted for command structure, the transmitting device can learn of the largest prefix of the newly voted for command structure that the receiving device is already aware of. The transmitting device then need only send the additional function or series of functions that are to be appended to the prefix command structure to generate the newly voted for command structure. In essence, the transmitting device, rather than transmitting the entire command structure, transmits only the information needed for the receiving device to assemble the command structure.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that some elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof

What is claimed is:

1. A method for selecting a proposed command structure in a distributed computing system to synchronize execution of functions by a plurality of computing devices implementing the distributed computing system, the method comprising:
    transmitting a proposed command structure to a first quorum of devices in the distributed computing system, wherein the proposed command structure is a command structure that represents all equivalent sequence of functions, which is proposed for vote using an associated proposal number, the proposed command structure comprising one or more functions appended to a prefix, wherein the prefix is a smaller command structure from which the proposed command structure is derived;
    receiving acceptance messages indicating an acceptance of the proposed command structure by one or more devices that have accepted the proposed command structure, wherein an accepting device can send an acceptance message if it has not responded to a suggested proposal number higher than the proposal number and if it has previously voted for the prefix of the proposed command structure that was proposed using the proposal number or if it has not previously voted for any command structure proposed using the proposal number; and
    determining that the proposed command structure has been selected by the distributed computing system if the acceptance messages are received from a second quorum of devices.

2. The method of claim 1 further comprising:
    transmitting, to a third quorum of devices in the distributed computing system, a suggested next proposal number; and
    receiving a response message from a responding device that has not previously responded to a larger suggested proposal number than the suggested next proposal number, the response message acting as a promise by the responding device not to accept command structures associated with a smaller proposal number than the suggested proposal number, the response message comprising: (1) a largest device-accepted proposal number, wherein the largest device-accepted proposal number is larger than any other proposal number associated with a previously accepted command structure that was previously accepted by the responding device; (2) a previously accepted command structure associated with the largest device-accepted proposal number; and (3) a largest device-responded proposal number, wherein the largest device-responded proposal number is larger than any other suggested proposal number to which the device has responded.

3. The method of claim 2, wherein, if response messages were received from a fourth quorum of devices, the proposed command structure is either:
    any previously accepted command structure indicated in the response messages from the fourth quorum of devices; or
    a common command structure that has, as prefixes, all base command structures of a first set of quorums.

4. The method of claim 1, wherein the transmitting the proposed command structure comprises transmitting an identifier of a previously transmitted command structure and one or more functions, wherein appending the one or more functions to the previously transmitted command structure results in the proposed command structure.

5. The method of claim 1, wherein, if the proposed command structure concluded with a checkpoint command, the method further comprises:

informing the distributed computing system of the selection of the proposed command structure, whereupon each device can retain its state after executing the proposed command structure's constituent functions, retain command structures selected after the proposed command structure, and discard the proposed command structure.

6. A computer-readable storage medium having computer-executable instructions that when executed, cause acts to be performed for selecting a proposed command structure in a distributed computing system to synchronize execution of functions by a plurality of computing devices implementing the distributed computing system, the acts comprising:

transmitting a proposed command structure to a first quorum of devices in the distributed computing system, wherein the proposed command structure is a command structure that represents all equivalent sequence of functions, which is proposed for vote using an associated proposal number, the proposed command structure comprising one or more functions appended to a prefix, wherein the prefix is a smaller command structure from which the proposed command structure is derived;

receiving acceptance messages indicating an acceptance of the proposed command structure, wherein an accepting device can send an acceptance message if it has not responded to a suggested proposal number higher than the proposal number and if it has previously voted for the prefix of the proposed command structure that was proposed using the proposal number or if it has not previously voted for any command structure proposed using the proposal number; and determining that the proposed command structure has been selected by the distributed computing system if the acceptance messages are received from a second quorum of devices.

7. The computer-readable storage medium of claim 6, wherein the computer-executable instructions when executed, cause performance of further acts comprising:

transmitting, to a third quorum of devices in the distributed computing system, a suggested next proposal number; and receiving a response message from a responding device that has not previously responded to a larger suggested proposal number than the suggested next proposal number, the response message acting as a promise by the responding device not to accept command structures associated with a smaller proposal number than the suggested proposal number, the response message comprising: (1) a largest device-accepted proposal number, wherein the largest device-accepted proposal number is larger than any other proposal number associated with a previously accepted command structure that was previously accepted by the responding device; (2) a previously accepted command structure associated with the largest device-accepted proposal number; and (3) a largest device-responded proposal number, wherein the largest device-responded proposal number is larger than any other suggested proposal number to which the device has responded.

8. The computer-readable storage medium of claim 7, wherein, if response messages are received from a fourth quorum of devices, the proposed command structure is either:

any previously accepted command structure indicated in the response messages from the fourth quorum of devices; or a common command structure that has, as prefixes, all base command structures of a first set of quorums.

9. The computer-readable storage medium of claim 6, wherein appending a first function to a first command structure to which the first function was already appended does not change the first command structure.

10. The computer-readable storage medium of claim 6, wherein the computer-executable instructions for transmitting the proposed command structure comprise computer-executable instructions that when executed, cause performance of acts for transmitting an identifier of a previously transmitted command structure and one or more functions, wherein appending the one or more functions to the previously transmitted command structure results in the proposed command structure.

11. The computer-readable storage medium of claim 6, wherein, if the proposed command structure concluded with a checkpoint command, the computer-executable instructions when executed, cause performance of further acts comprising:

informing the distributed computing system of the selection of the proposed command structure, whereupon each device can retain its state after executing the proposed command structure's constituent functions, retain command structures selected after the proposed command structure, and discard the proposed command structure.

12. A computing device in a distributed computing system comprising:

a network interface for performing steps comprising:

transmitting, to a first quorum of devices in the distributed computing system, a proposed command structure, wherein the proposed command structure is a command structure that represents all equivalent sequence of functions, which is proposed for vote using an associated proposal number, the proposed command structure comprising one or more functions appended to a prefix, wherein the prefix is a smaller command structure from which the proposed command structure is derived; and receiving acceptance messages indicating an acceptance of the proposed command structure, wherein an accepting device can send an acceptance message if it has not responded to a suggested proposal number higher than the proposal number and if it has previously voted for the prefix of the proposed command structure that was proposed using the proposal number or if it has not previously voted for any command structure proposed using the proposal number; and a processing unit for performing steps comprising:

determining that the proposed command structure has been selected by the distributed computing system if the acceptance messages are received from a second quorum of devices.

13. The computing device of claim 12, wherein the network interface performs additional steps comprising:

transmitting, to a third quorum of devices in the distributed computing system, a suggested next proposal number; and receiving a response message from a responding device that has not previously responded to a larger suggested proposal number than the suggested next proposal number, the response message acting as a promise by the responding device not to accept command structures associated with a smaller proposal number than the suggested proposal number, the response message comprising: (1) a largest device-accepted proposal number, wherein the largest device-accepted proposal number is larger than any other proposal number associated with a previously accepted command structure that was previously accepted by the responding device; (2) a previously accepted command structure associated with the largest device-accepted proposal number; and (3) a largest device-responded proposal number, wherein the largest device-responded proposal number is larger than any other suggested proposal number to which the device has responded.

14. The computing device of claim 12, wherein, if response messages were received from a fourth quorum of devices, the proposed command structure is either:

any previously accepted command structure indicated in the response messages from the fourth quorum of devices; or a common command structure that has, as prefixes, all base command structures of a first set of quorums.

15. The computing device of claim 12, wherein, if the proposed command structure concluded with a checkpoint command, the network interface performing further steps comprising:

informing the distributed computing system of the selection of the proposed command structure, whereupon each device can retain its state after executing the proposed command structure's constituent functions, retain command structures selected after the proposed command structure, and discard the proposed command structure.

* * * * *